United States Patent
Horiguchi et al.

(10) Patent No.: US 11,639,471 B2
(45) Date of Patent: May 2, 2023

(54) COMPOUND, LIQUID CRYSTAL COMPOSITION AND HIGH-FREQUENCY PHASE SHIFTER

(71) Applicant: DIC Corporation, Tokyo (JP)

(72) Inventors: Masahiro Horiguchi, Kita-adachi-gun (JP); Masanao Hayashi, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 238 days.

(21) Appl. No.: 16/952,269

(22) Filed: Nov. 19, 2020

(65) Prior Publication Data
US 2021/0179943 A1    Jun. 17, 2021

(30) Foreign Application Priority Data
Dec. 12, 2019   (JP) .............................. JP2019-224547

(51) Int. Cl.
*G02F 1/1333*   (2006.01)
*C09K 19/34*    (2006.01)
*H01P 3/16*     (2006.01)
*H01P 1/18*     (2006.01)

(52) U.S. Cl.
CPC .......... *C09K 19/3491* (2013.01); *H01P 1/182* (2013.01); *H01P 3/16* (2013.01)

(58) Field of Classification Search
CPC .... C09K 19/34; C09K 19/3491; C09K 19/44; C09K 2019/0444; C09K 2019/161; C09K 2019/181; C09K 2219/11; G02F 1/1333
See application file for complete search history.

(56) References Cited

U.S. PATENT DOCUMENTS

| | | | | |
|---|---|---|---|---|
| 11,427,761 B2 * | 8/2022 | Brocke | .................. | C09K 19/12 |
| 2021/0179943 A1 * | 6/2021 | Horiguchi | .......... | C09K 19/3491 |

FOREIGN PATENT DOCUMENTS

| | | | | |
|---|---|---|---|---|
| CN | 103472116 A | | 12/2013 | |
| CN | 106518890 A | | 3/2017 | |
| CN | 106978192 A | * | 7/2017 | ............. C09K 19/18 |
| WO | 18212251 | * | 12/2018 | ............. C09K 19/34 |
| WO | WO2022/090098 A1 | * | 5/2022 | ............. C09K 19/04 |

OTHER PUBLICATIONS

Liu et al., "Novel High-Performance Liquid-Crystalline Organic Semiconductors for Thin-Film Transistors", Chemistry of Materials, 2009, vol. 21, No. 13, pp. 2727-2732, (6 pages).

* cited by examiner

*Primary Examiner* — Geraldina Visconti
(74) *Attorney, Agent, or Firm* — WHDA, LLP

(57) ABSTRACT

The present invention provides a compound represented by the following general formula (I), and provides a liquid crystal composition containing the compound and a device using the liquid crystal composition. The compound of the present invention has a large refractive index anisotropy Δn and a high compatibility with a liquid crystal composition, and exhibits a large dielectric constant anisotropy in a high frequency region; and therefore, it is useful as a material for a device of a high-frequency phase shifter, a phased array antenna, an image recognition device, distance measuring equipment, a liquid crystal display device, a liquid crystal lens, a birefringent lens for stereoscopic image display, or the like.

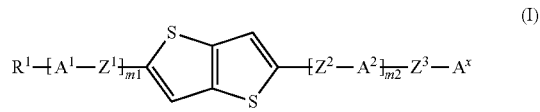

(I)

12 Claims, No Drawings

COMPOUND, LIQUID CRYSTAL COMPOSITION AND HIGH-FREQUENCY PHASE SHIFTER

TECHNICAL FIELD

The present invention relates to a compound, a liquid crystal composition containing the compound, and a device using the liquid crystal composition.

BACKGROUND ART

A liquid crystal composition is used for mobile terminals such as smartphones and tablet devices, and display applications such as TVs and window displays. As a new application of such a liquid crystal composition, an antenna for transmitting and receiving radio waves between a communication satellite and a mobile body such as a car is drawing attention.

Conventionally, satellite communications use a parabolic antenna; however, when used in a mobile body, the parabolic antenna must be directed toward a satellite at any time, and is required to have a large movable portion. However, an antenna using a liquid crystal composition is capable of changing transmission-reception directions of radio waves by operating liquid crystal, and therefore, movement of the antenna itself is not necessary and the antenna is allowed to have a planar shape.

A refractive index anisotropy Δn of liquid crystal compositions required for these applications is, for example, about 0.4, which is much larger than Δn required for display applications. Therefore, a compound to be added to and used in a liquid crystal composition is required to have a large Δn and a high compatibility with the liquid crystal composition. Conventionally, a compound having a thienothiophene structure has been reported as a compound having a large Δn. However, these compounds disadvantageously have low compatibility when added to a liquid crystal composition used for antennas and have precipitation caused by long-term storage (Non-Patent Literature 1 and Patent Literature 1). Further, compounds having a thienothiophene structure and a thioisocyano group have been reported, but these compounds have a low dielectric constant anisotropy in a high frequency region and insufficient phase modulation characteristics. Therefore, there has been a demand for the development of a compound having a large Δn and a high compatibility with a liquid crystal composition, and exhibiting a large dielectric constant anisotropy in a high frequency region.

CITATION LIST

Non-Patent Literature

[Non-Patent Literature 1] Chemistry of Materials, 2009, Vol. 21, No. 13, pp. 2727-2732

Patent Literature

[Patent Literature 1] CN103472116A
[Patent Literature 2] CN106518890A

SUMMARY OF INVENTION

Problems to be Solved by the Invention

The problem to be solved by the present invention is to provide: a compound that has a large refractive index anisotropy (Δn) and a high compatibility with a liquid crystal composition, and exhibits a large dielectric constant anisotropy (Δε) in a high frequency region; a liquid crystal composition containing the compound; and a device using the liquid crystal composition.

Means for Solving the Problems

As a result of intensive studies to solve the above problem, the present inventors have developed a specific compound. That is, the present invention provides a compound represented by the following general formula (I),

[Chemical formula 1]

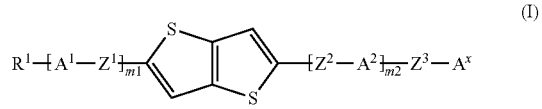

(in the formula, $R^1$ represents a hydrogen atom, or a linear or branched alkyl group having 1 to 20 carbon atoms, wherein an arbitrary hydrogen atom in the alkyl group may be substituted with a halogen atom, and one or two or more —$CH_2$—'s in the alkyl group may be each independently substituted with —O—, —S—, —CO—, —COO—, —OCO—, —CO—S—, —S—CO—, —O—CO—O—, —CO—NH—, —NH—CO—, —CH=CH—, —CF=CF— or —C≡C— with the proviso that oxygen atoms are not bonded to each other,
$A^1$ and $A^2$ each independently represent a hydrocarbon ring or a heterocycle having 3 to 16 carbon atoms which may be substituted with the proviso that: when multiple $A^1$s are present, they may be the same or different; and when multiple $A^2$s are present, they may be the same or different,
$Z^1$, $Z^2$ and $Z^3$ each independently represent a divalent linking group or a single bond with the proviso that: when multiple $Z^1$s are present, they may be the same or different; and when multiple $Z^2$s are present, they may be the same or different,
m1 and m2 each independently represent an integer from 0 to 3, and m1+m2 represents an integer from 1 to 3; and
$A^x$ represents a group selected from the following formula (Ax-1) and formula (Ax-2),

[Chemical formula 2]

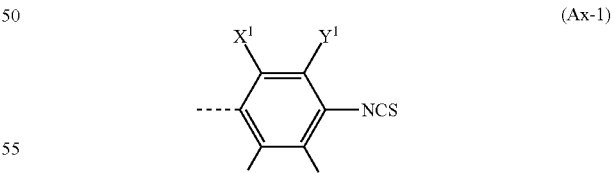

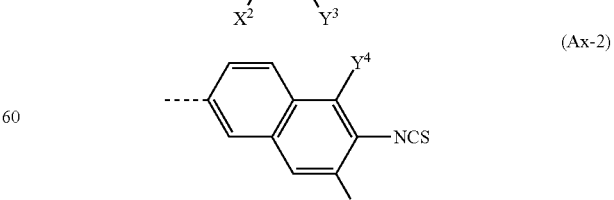

(in the formulas, the broken line represents a binding position, $X^1$ and $X^2$ each independently represent a hydrogen atom or an alkyl group having 1 to 8 carbon atoms, and $Y^1$, $Y^3$, $Y^4$ and $Y^6$ each independently represent a hydrogen atom, a fluorine atom, or a chlorine atom);
and provides a liquid crystal composition containing the compound and a device using the liquid crystal composition.

Advantageous Effect(s) of Invention

The compound of the present invention has a large refractive index anisotropy Δn and a high compatibility with a liquid crystal composition, and exhibits a large dielectric constant anisotropy in a high frequency region; and therefore, it is useful as a material for a device of a high-frequency phase shifter, a phased array antenna, an image recognition device, distance measuring equipment, a liquid crystal display device, a liquid crystal lens, a birefringent lens for stereoscopic image display, or the like.

EMBODIMENTS FOR CARRYING OUT THE INVENTION

The present invention provides a compound represented by the general formula (I), a liquid crystal composition containing the compound, and a device using the liquid crystal composition.

In the general formula (I), $R^1$ represents a hydrogen atom, or a linear or branched alkyl group having 1 to 20 carbon atoms wherein an arbitrary hydrogen atom in the alkyl group may be substituted with a halogen atom, and one or two or more —$CH_2$—'s in the alkyl group may be each independently substituted with —O—, —S—, —CO—, —COO—, —OCO—, —CO—S—, —S—CO—, —O—CO—O—, —CO—NH—, —NH—CO—, —CH=CH—, —CF=CF— or —C≡C— with the proviso that oxygen atoms are not bonded to each other. From the viewpoints of the compatibility with a liquid crystal composition, the refractive index anisotropy, the voltage holding ratio, the easiness of synthesis and the availability of raw materials, $R^1$ preferably represents a hydrogen atom, or a linear or branched alkyl group having 1 to 20 carbon atoms wherein an arbitrary hydrogen atom in the group may be substituted with a halogen atom and one or two or more —$CH_2$—'s in the group may be each independently substituted with —O—, —S—, —CH=CH—, —CF=CF— or —C≡C—; $R^1$ more preferably represents a linear or branched alkyl group having 1 to 12 carbon atoms wherein an arbitrary hydrogen atom in the group may be substituted with a fluorine atom and one or two or more —$CH_2$—'s in the group may be each independently substituted with —O—, —CH=CH— or —C≡C—; $R^1$ further preferably represents an alkyl group having 1 to 8 carbon atoms, an alkoxy group having 1 to 7 carbon atoms, an alkenyl group having 2 to 8 carbon atoms, an alkenyloxy group having 2 to 7 carbon atoms or an alkynyl group having 2 to 8 carbon atoms; and $R^1$ in particular preferably represents an alkyl group having 2 to 5 carbon atoms, an alkoxy group having 1 to 4 carbon atoms, an alkenyl group having 2 to 5 carbon atoms, or an alkynyl group having 3 to 7 carbon atoms.

In the general formula (I), $A^1$ and $A^2$ each independently represent a hydrocarbon ring or a heterocycle having 3 to 16 carbon atoms that may be substituted with the proviso that: when multiple $A^1$s are present, they may be the same or different; and when multiple $A^2$s are present, they may be the same or different. From the viewpoints of the compatibility with a liquid crystal composition, the refractive index anisotropy, the dielectric constant anisotropy, the voltage holding ratio, the easiness of synthesis, and the availability of raw materials, $A^1$ and $A^2$ may be each independently unsubstituted or substituted with one or more substituents $L^1$ and preferably represent a group selected from the group consisting of:

(a) a 1,4-cyclohexylene group (wherein one —$CH_2$— or two or more nonadjacent —$CH_2$—'s in the group may be substituted with —O— or —S—);

(b) a 1,4-phenylene group (wherein one —CH= or two or more nonadjacent —CH='s in the group may be substituted with —N=);

(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, or a phenanthrene-2,7-diyl group (wherein a hydrogen atom present in the groups may be substituted with a fluorine atom or a chlorine atom, and one —CH= or two or more —CH= present in a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, an anthracene-2,6-diyl group, an anthracene-1,4-diyl group, an anthracene-9,10-diyl group or a phenanthrene-2,7-diyl group may be substituted with —N=); and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, or a thieno[3,2-b]thiophene-2,5-diyl group (wherein one —CH= or two or more nonadjacent —CH=present in the group may be substituted with —N=). When multiple $A^1$s and $A^2$s are present, they may be the same or different, and they may be each independently unsubstituted or substituted with one or more substituents $L^1$; and they more preferably represent a group selected from the group consisting of a 1,4-phenylene group, a naphthalene-2,6-diyl group, a naphthalene-1,4-diyl group, a 5,6,7,8 tetrahydronaphthalene-1,4-diyl group, a phenanthrene-2,7-diyl group, a benzothiophene-2,5-diyl group, a benzothiophene-2,6-diyl group, a benzothiazole-2,5-diyl group, a benzothiazole-2,6-diyl group, a dibenzothiophene-3,7-diyl group, a dibenzothiophene-2,6-diyl group or a thieno[3,2-b]thiophene-2,5-diyl group. When multiple $A^1$s and $A^2$s are present, they may be the same or different; and further preferably, they each independently represent a group selected from the following formulas (A-1) to (A-17).

[Chemical formula 3]

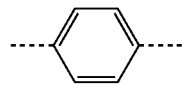

(A-1)

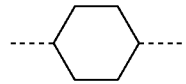

(A-2)

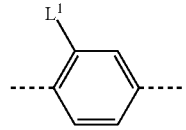

(A-3)

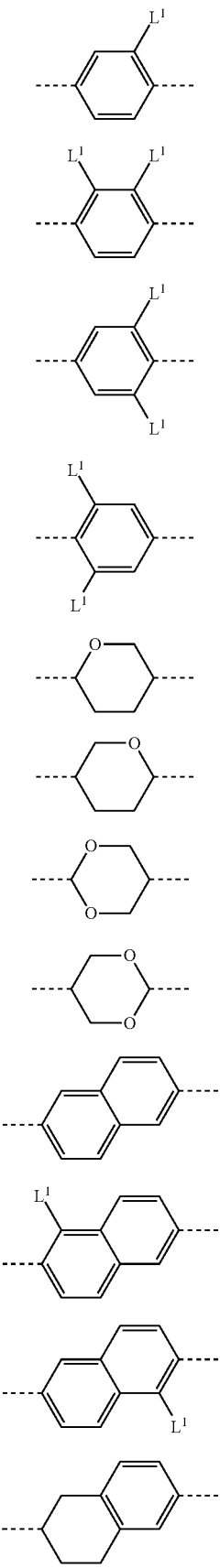
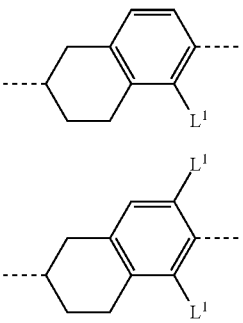

(in the formulas, the broken line represents a binding position, and when multiple Ls are present, they may be the same or different). When multiple $A^1$s and $A^2$s are present, they may be the same or different. Further more preferably, $A^1$ and $A^2$ each independently represent a group selected from the formulas (A-1) to (A-7), (A-12), (A-15) and (A-17). When multiple $A^1$s and $A^2$s are present, they may be the same or different. Particularly preferably, $A^1$ and $A^2$ each independently represent a group selected from the formulas (A-1), and (A-3) to (A-7).

$L^1$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear alkyl group having 1 to 20 carbon atoms or a branched or cyclic alkyl group having 3 to 20 carbon atoms wherein one —$CH_2$— or two or more —$CH_2$-'s may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF— or —C≡C— with the proviso that oxygen atoms are not directly bonded to each other, wherein an arbitrary hydrogen atom in the alkyl group represents a group that may be substituted with a fluorine atom. From the viewpoints of the compatibility with a liquid crystal composition, the refractive index anisotropy, the dielectric constant anisotropy, the voltage holding ratio, the easiness of synthesis and the availability of raw materials, $L^1$ preferably represents a fluorine atom, a chlorine atom, or a linear alkyl group having 1 to 20 carbon atoms or a branched or cyclic alkyl group having 3 to 20 carbon atoms wherein an arbitrary hydrogen atom in the group may be substituted with a fluorine atom and one —$CH_2$— or two or more —$CH_2$-'s in the group may be each independently substituted with —O—, —S—, —CH=CH, —CF=CF— or —C≡C—. More preferably, $L^1$ represents a fluorine atom or a linear alkyl group having 1 to 10 carbon atoms or a branched or cyclic alkyl group having 3 to 10 carbon atoms wherein an arbitrary hydrogen atom in the group may be substituted with a fluorine atom and —$CH_2$— in the group may be substituted with —O—. Further preferably, $L^1$ represents a fluorine atom or a linear alkyl group having 1 to 10 carbon atoms or a branched or cyclic alkyl group having 3 to 10 carbon atoms. Particularly preferably, $L^1$ represents a fluorine atom or a linear alkyl group having 1 to 8 carbon atoms.

In the general formula (I), $Z^1$, $Z^2$ and $Z^3$ each independently represent a divalent linking group or a single bond, but when multiple $Z^1$s are present, they may be the same or different; and when multiple $Z^2$s are present, they may be the same or different. From the viewpoints of the compatibility with a liquid crystal composition, the refractive index anisotropy, the dielectric constant anisotropy, the voltage holding ratio, the easiness of synthesis and the availability of raw materials, Z, $Z^2$ and $Z^3$, each independently, preferably represent a single bond, —CH=CH—, —CF=CF—, —C≡C—, —COO—, —OCO—, —OCOO—, —CH$_2$O—, —OCH$_2$—, —CF$_2$O—, —OCF$_2$—, —CH=CHCOO—, —OCOCH=CH—, —CH=C(CH$_3$)COO—, —OCOC(CH$_3$)=CH—, —CH$_2$—CH(CH$_3$)COO—, —OCOCH(CH$_3$)—CH$_2$—, —OCH$_2$CH$_2$O—, —N=N—, —C=N—N=C—, —CH=N—, —N=CH— or an alkylene group having 2 to 20 carbon atoms, wherein one —CH$_2$— or two or more —CH$_2$-'s in the alkylene group represent a group that may be substituted with —O—, —COO— or —OCO—. When multiple $Z^1$s, $Z^2$s and $Z^3$s are present, they may be the same or different; and more preferably, they each independently represent —OCH$_2$—, —CH$_2$O—, —CH$_2$CH$_2$—, —CF$_2$O—, —OCF$_2$—, —CH=CH—, —N=N—, —CH=N—, —N=CH—, —CH=N—N=CH—, —CF=CF—, —C≡C— or a single bond. When multiple $Z^1$s, $Z^2$s and $Z^3$s are present, they may be the same or different; and further preferably, they each independently represent —CF$_2$O—, —OCF$_2$—, —CH=CH—, —CF=CF—, —N=N—, —C≡C— or a single bond. When multiple $Z^1$s, $Z^2$s and $Z^3$s are present, they may be the same or different; and further more preferably, they each independently represent —CF$_2$O—, —OCF$_2$—, —N=N—, —C≡C— or a single bond. When multiple $Z^1$s, $Z^2$s and $Z^3$s are present, they may be the same or different; and particularly preferably, they each independently represent —C≡C— or a single bond.

In the general formula (I), m1 and m2 each independently represent an integer from 0 to 3 and m1+m2 represents an integer from 1 to 3. From the viewpoints of the compatibility with a liquid crystal composition, the refractive index anisotropy, the dielectric constant anisotropy, the voltage holding ratio, the easiness of synthesis, and the availability of raw materials, it is preferred that m1 and m2 each independently represent 0, 1, or 2 and m1+m2 preferably represents an integer from 1 to 3; it is more preferred that m1 and m2 each independently represent 0, 1 or 2 and m1+m2 represents 1 or 2; it is further preferred that m1 and m2 each independently represent 0 or 1 and m1+m2 represents 1 or 2; and it is particularly preferred that m1 and m2 each independently represent 0 or 1 and m1+m2 represents 1.

Since m1+m2 represents an integer from 1 to 3 as described above, the compound represented by the general formula (I) contains three or more ring structures (monocyclic or condensed rings) in the structure. In particular, when ring structures are linked to each other to form a rod-shaped molecular structure over the entire compound, the liquid crystallinity is improved and the Tai is increased. Therefore, addition to a liquid crystal composition can effectively expand a liquid crystal phase temperature range while maintaining a high compatibility. Further, the 7 electrons in the ring structure are conjugated and spread over the entire compound directly or via a linking group between the rings, and thereby, the compound exhibits excellent effects of effectively enhancing Δn and at the same time, exhibiting a large dielectric constant anisotropy in a high frequency region.

In the general formula (I), $A^x$ represents a group selected from the following formulas (Ax-1) and (Ax-2)

[Chemical formula 4]

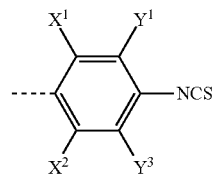

(Ax-1)

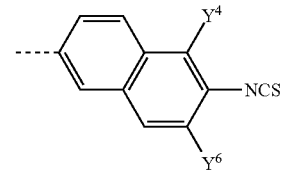

(Ax-2)

(in the formulas, the broken line represents a binding position, $X^1$ and $X^2$ each independently represent a hydrogen atom or an alkyl group having 1 to 8 carbon atoms, and $Y^1$, $Y^3$, $Y^4$ and $Y^6$ each independently represent a hydrogen atom, a fluorine atom or a chlorine atom). From the viewpoints of the compatibility with a liquid crystal composition, the refractive index anisotropy, the dielectric constant anisotropy, the voltage holding ratio, the easiness of synthesis and the availability of raw materials, $A^x$ preferably represents a group selected from the following formulas (Ax-1-i) and (Ax-2-i),

[Chemical formula 5]

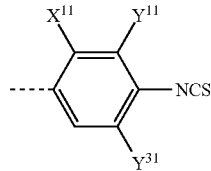

(Ax-1-i)

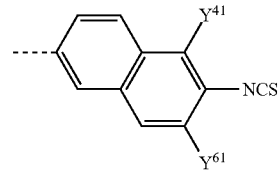

(Ax-2-i)

(in the formulas, the broken line represents a binding position, $X^{11}$ represents a hydrogen atom or an alkyl group having 1 to 8 carbon atoms, and $Y^{11}$, $Y^{31}$, $Y^{41}$ and $Y^{61}$ each independently represent a hydrogen atom, a fluorine atom or a chlorine atom); $A^x$ more preferably represents a group selected from the following formula (Ax-1-ii),

[Chemical formula 6]

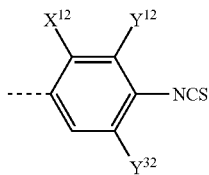
(Ax-1-ii)

(in the formula, the broken line represents a binding position, $X^{12}$ represents a hydrogen atom or an alkyl group having 1 to 5 carbon atoms.

$Y^{12}$ and $Y^{32}$ each independently represent a hydrogen atom, a fluorine atom or a chlorine atom); Ax further preferably represents a group selected from the following formula (Ax-1-iii),

[Chemical formula 7]

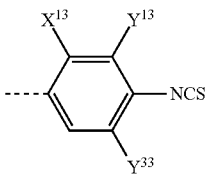
(Ax-1-iii)

(in the formula, the broken line represents a binding position, $X^{13}$ represents a hydrogen atom, a methyl group or an ethyl group, and $Y^{13}$ and $Y^{33}$ each independently represent a hydrogen atom, a fluorine atom or a chlorine atom); $A^x$ in particular preferably represents a group selected from the following formula (Ax-1-iv),

[Chemical formula 8]

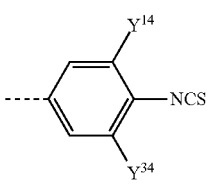
(Ax-1-iv)

(in the formula, the broken line represents a binding position, and $Y^{14}$ and $Y^{34}$ each independently represent a hydrogen atom or a fluorine atom).

From the viewpoints of the width of a temperature range exhibiting a liquid crystal phase, the dielectric constant anisotropy, the compatibility with a liquid crystal composition, the refractive index anisotropy, the voltage holding ratio, the easiness of synthesis and the availability of raw materials, the compound represented by the general formula (I) is preferably a compound represented by the following general formula (I-i),

[Chemical formula 9]

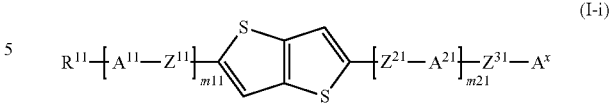
(I-i)

(in the formula, $R^1$ represents a hydrogen atom, or a linear or branched alkyl group having 1 to 20 carbon atoms wherein an arbitrary hydrogen atom in the group may be substituted with a halogen atom and one or two or more —$CH_2$—'s in the group is each independently substituted with —O—, —S—, —CH=CH—, —CF=CF— or —C≡C—;

$A^{11}$ and $A^{21}$ each independently represent a 1,4-phenylene group, a naphthalene-2,6-diyl group, a naphthalene-1,4-diyl group, a 5,6,7,8-tetrahydronaphthalene-1,4-diyl group, a phenanthrene-2,7-diyl group, a benzothiophene-2,5-diyl group, a benzothiophene-2,6-diyl group, a benzothiazole-2,5-diyl group, a benzothiazole-2,6-diyl group, a dibenzothiophene-3,7-diyl group, a dibenzothiophene-2,6-diyl group or a thieno[3,2-b]thiophene-2,5-diyl group with the proviso that: when multiple $A^{11}$s are present, they may be the same or different; when multiple $A^{21}$s are present, they may be the same or different; and these groups may be unsubstituted or substituted with one or more substituents $L^1$;

$L^{11}$ represents a fluorine atom, a chlorine atom, or a linear alkyl group having 1 to 20 carbon atoms or a branched or cyclic alkyl group having 3 to 20 carbon atoms wherein an arbitrary hydrogen atom in the group may be substituted with a fluorine atom and one —$CH_2$— or two or more —$CH_2$—'s in the group may be each independently substituted with —O—, —S—, —CH=CH—, —CF=CF— or —C≡C— with the proviso that when multiple $L^{11}$s are present, they may be the same or different;

$Z^{11}$, $Z^{21}$ and $Z^{31}$ each independently represent —$OCH_2$—, —$CH_2O$—, —$CH_2CH_2$—, —$CF_2O$—, —$OCF_2$—, —CH=CH—, —N=N—, —CH=N—, —N=CH—, —CH=N—N=CH—, —CF=CF—, —C≡C— or a single bond with the proviso that when multiple $Z^{21}$s are present, they may be the same or different; and when multiple $Z^{21}$s are present, they may be the same or different;

m11 and m21 each independently represent 0, 1 or 2 and m1+m2 represents an integer from 1 to 3; and $A^x$ represents a group selected from the following formulas (Ax-1-i) and (Ax-2-i),

[Chemical formula 10]

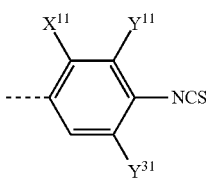
(Ax-2-i)

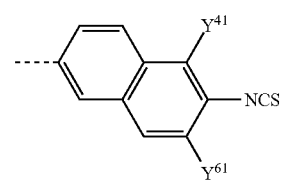
(Ax-2-i)

(in the formulas, the broken line represents a binding position, $X^{11}$ represents a hydrogen atom or an alkyl group having 1 to 8 carbon atoms, and $Y^{11}$, $Y^{31}$, $Y^{41}$ and $Y^{61}$ each independently represent a hydrogen atom, a fluorine atom or a chlorine atom). The compound represented by the general formula (I) is more preferably a compound represented by the following general formula (I-ii),

[Chemical formula 11]

(I-ii)

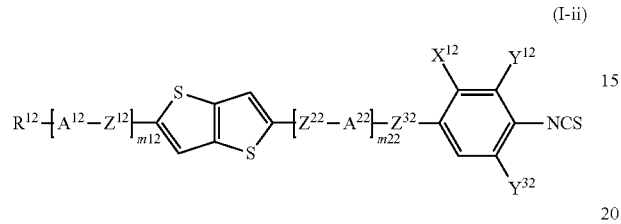

(in the formula, $R^{12}$ represents a linear or branched alky group having 1 to 12 carbon atoms wherein an arbitrary hydrogen atom in the group may be substituted with a fluorine atom, and one —$CH_2$— or two or more —$CH_2$—'s in the group are each independently substituted with —O—, —CH=CH— or —C≡C—;
$A^{12}$ and $A^{22}$ each independently represent a group selected from the following formulas (A-ii-1) to (A-ii-17),

[Chemical formula 12]

(A-ii-1)

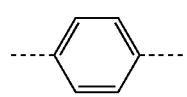

(A-ii-2)

(A-ii-3)

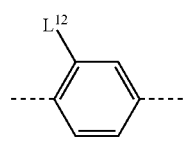

(A-ii-4)

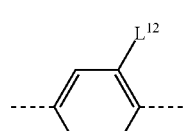

(A-ii-5)

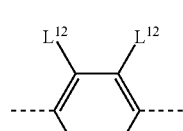

(A-ii-6)

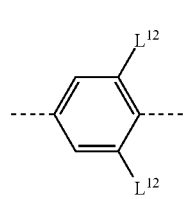

(A-ii-7)

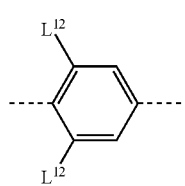

(A-ii-8)

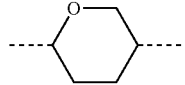

(A-ii-9)

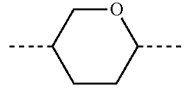

(A-ii-10)

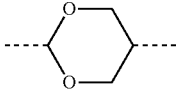

(A-ii-11)

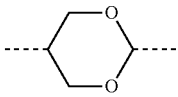

(A-ii-12)

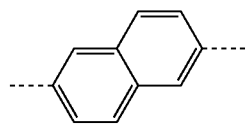

(A-ii-13)

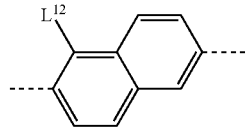

(A-ii-14)

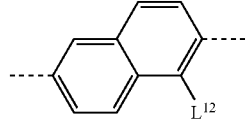

(A-ii-15)

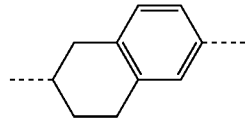

(A-ii-16)

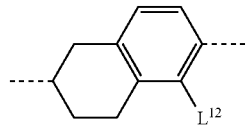

(A-ii-17)

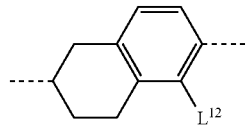

(in the formulas, the broken line represents a binding position with the proviso that when multiple $L^{12}$s are present, they may be the same or different) with the proviso that: when multiple $A^{12}$s are present, they may be the same or different; and when multiple $A^{22}$s are present, they may be the same or different;

$L^{12}$ represents a fluorine atom, or a linear alkyl group having 1 to 10 carbon atoms or a branched or cyclic alkyl group having 3 to 10 carbon atoms wherein an arbitrary hydrogen atom in the group may be substituted with a fluorine atom and —$CH_2$— in the group may be substituted with —O—;

$Z^{12}$, $Z^{22}$ and $Z^{32}$ each independently represent —$OCH_2$—, —$CH_2O$—, —$CH_2CH_2$—, —$CF_2O$—, —$OCF_2$—, —CH=CH—, —N=N—, —CH=N—, —N=CH—, —CH=N—N=CH—, —CF=CF—, —C≡C— or a single bond with the proviso that: when multiple $Z^{12}$s are present, they may be the same or different; and when multiple $Z^{22}$s are present, they may be the same or different;

m12 and m22 each independently represent 0, 1 or 2, and m12+m22 represents 1 or 2;

$X^{12}$ represents a hydrogen atom or an alkyl group having 1 to 5 carbon atoms; and $Y^{12}$ and $Y^{32}$ each independently represent a hydrogen atom, a fluorine atom or a chlorine atom). The compound represented by the general formula (I) is further preferably a compound represented by the following general formula (I-iii),

[Chemical formula 13]

(I-iii)

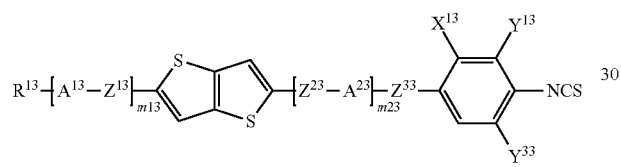

(in the formula, $R^{13}$ represents an alkyl group having 1 to 8 carbon atoms, an alkoxy group having 1 to 7 carbon atoms, an alkenyl group having 2 to 8 carbon atoms, an alkenyloxy group having 2 to 7 carbon atoms, or an alkynyl group having 2 to 8 carbon atoms;

$A^{13}$ and $A^{23}$ each independently represent a group selected from the following formulas (A-iii-1) to (A-iii-7), (A-iii-12), (A-iii-15) and (A-iii-17),

[Chemical formula 14]

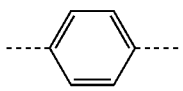 (A-iii-1)

 (A-iii-2)

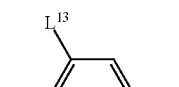 (A-iii-3)

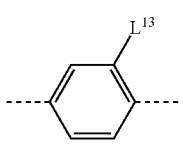 (A-iii-4)

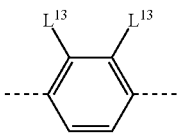 (A-iii-5)

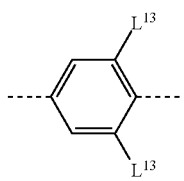 (A-iii-6)

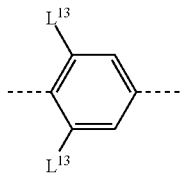 (A-iii-7)

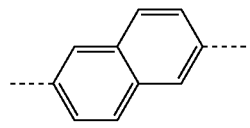 (A-iii-12)

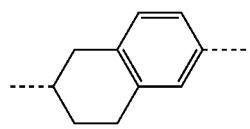 (A-iii-15)

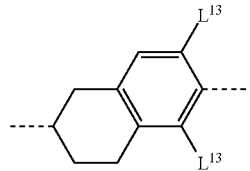 (A-iii-17)

(in the formulas, the broken line represents a binding position, and when multiple $L^{13}$s are present, they may be the same or different);

$L^{13}$ represents a fluorine atom or a linear alkyl group having 1 to 10 carbon atoms or a branched or cyclic alkyl group having 3 to 10 carbon atoms;

$Z^{13}$, $Z^{23}$ and $Z^{33}$ each independently represent —$CF_2O$—, —$OCF_2$—, —CH=CH—, —CF=CF—, —N=N—, —C≡C— or a single bond;

m13 and m23 each independently represent 0 or 1, and m13+m23 represents 1 or 2;

$X^{13}$ represents a hydrogen atom, a methyl group or an ethyl group; and $Y^{13}$ and $Y^{33}$ each independently represent a hydrogen atom, a fluorine atom or a chlorine atom). The compound represented by the general formula (I) in particular preferably is a compound represented by the following general formula (I-iv-1) or (I-iv-2),

[Chemical formula 15]

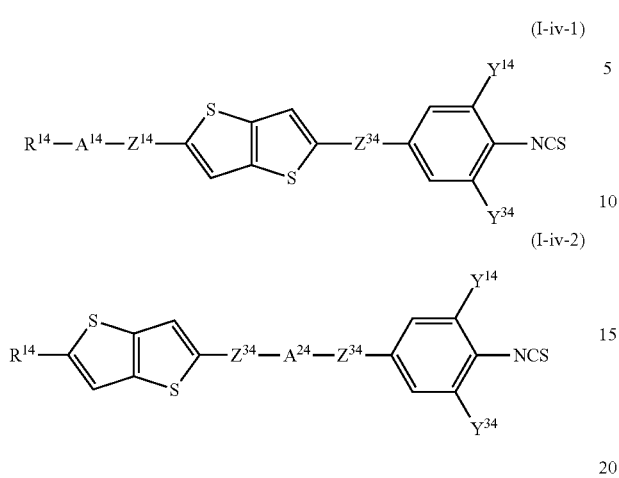

(I-iv-1)
(I-iv-2)

(in the formulas, $R^{14}$ represents an alkyl group having 2 to 5 carbon atoms, an alkoxy group having 1 to 4 carbon atoms, an alkenyl group having 2 to 5 carbon atoms or an alkynyl group having 3 to 7 carbon atoms;
$A^{14}$ and $A^{24}$ represent a group selected from the following formulas (A-iv-1) and (A-iv-3) to (A-iv-7),

[Chemical formula 16]

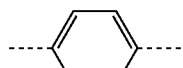
(A-iv-1)

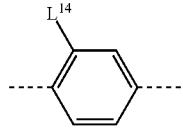
(A-iv-3)

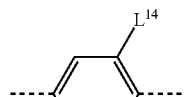
(A-iv-4)

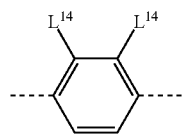
(A-iv-5)

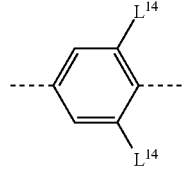
(A-iv-6)

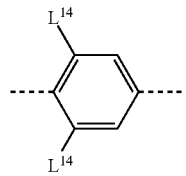
(A-iv-7)

(in the formulas, the broken line represents a binding position, and when multiple $L^{14}$s are present, they may be the same or different);
$L^{14}$ represents a fluorine atom or a linear alkyl group having 1 to 8 carbon atoms;
$Z^{14}$, $Z^{24}$ and $Z^{34}$ each independently represent —C≡C— or a single bond; and
$Y^{14}$ and $Y^{34}$ each independently represent a hydrogen atom or a fluorine atom).

Specific examples of the compound represented by the general formula (I) include compounds represented by the following formulas (I-1) to (I-29).

[Chemical formula 17]

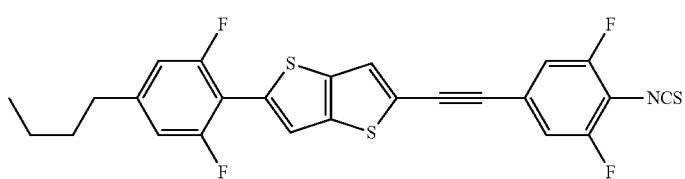
(I-1)

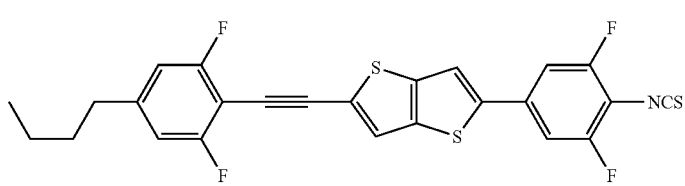
(I-2)

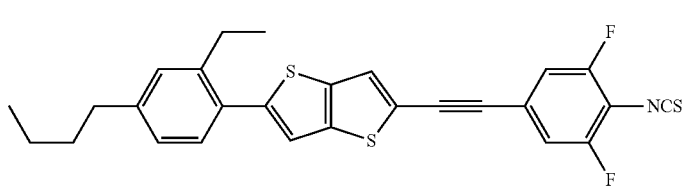
(I-3)

-continued
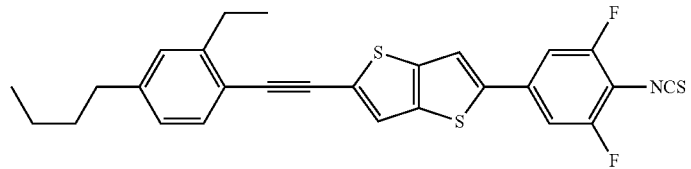
(I-4)
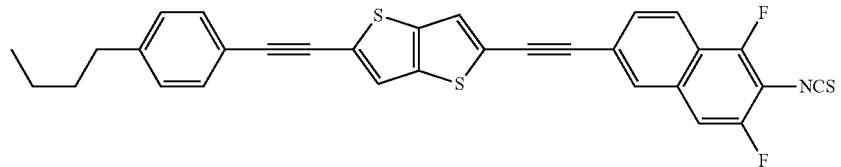
(I-5)
[Chemical formula 18]
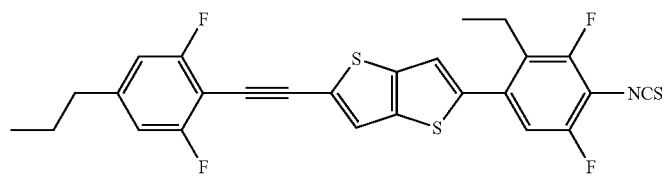
(I-6)
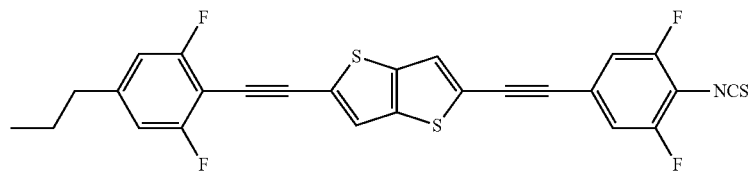
(I-7)
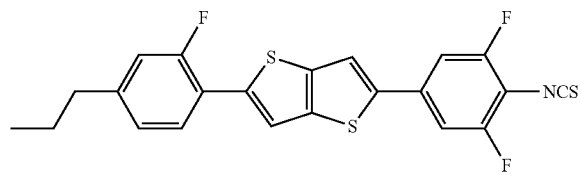
(I-8)
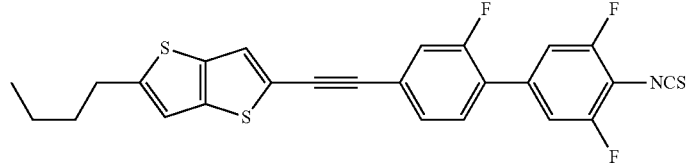
(I-9)
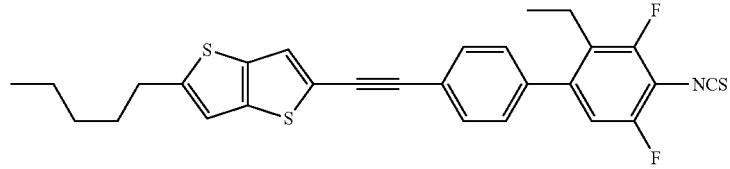
(I-10)
[Chemical formula 19]
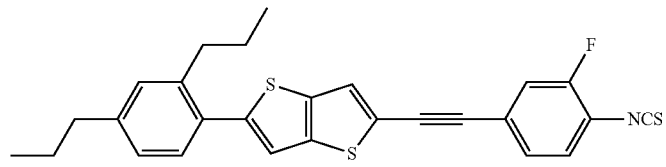
(I-11)

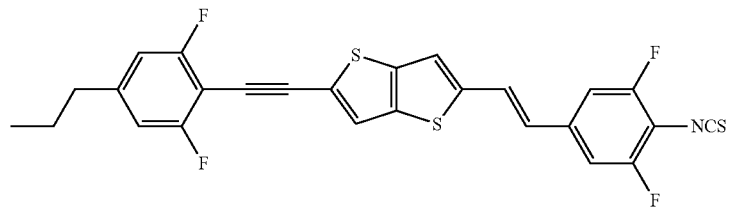
(I-12)
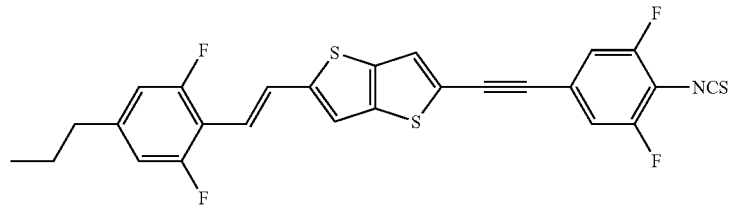
(I-13)
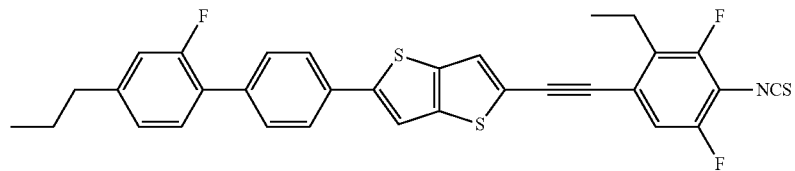
(I-14)
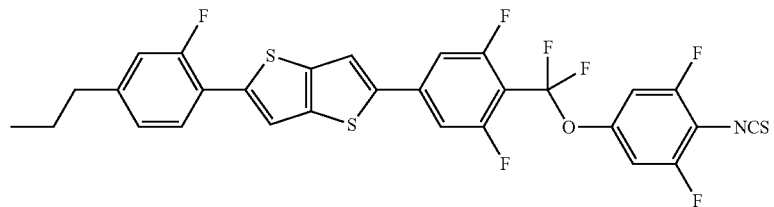
(I-15)
[Chemical formula 20]
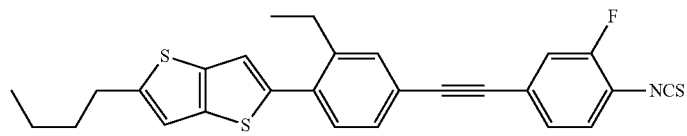
(I-16)
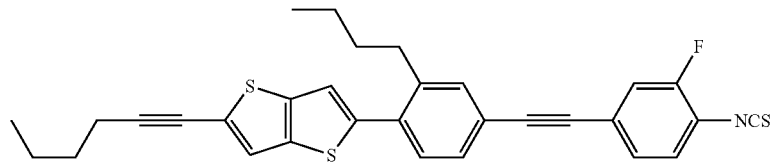
(I-17)
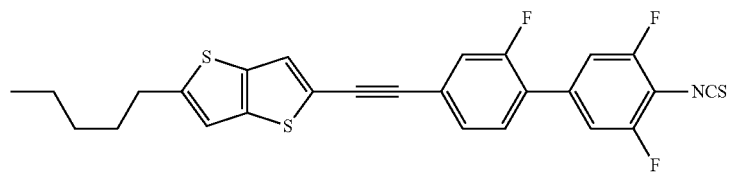
(I-18)
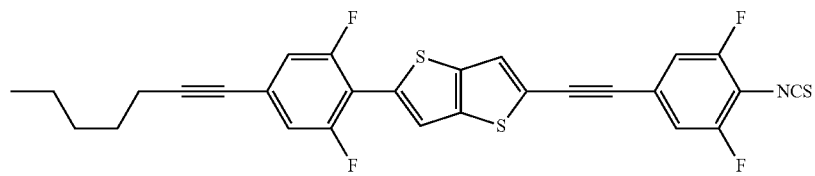
(I-19)

(I-20)
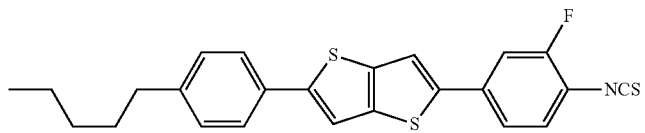
[Chemical formula 21]
(I-21)
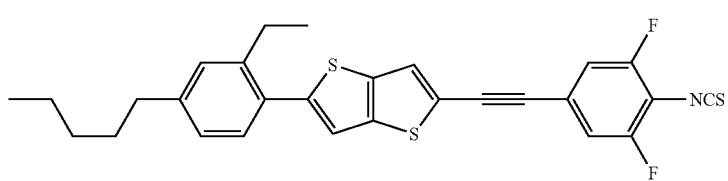
(I-22)
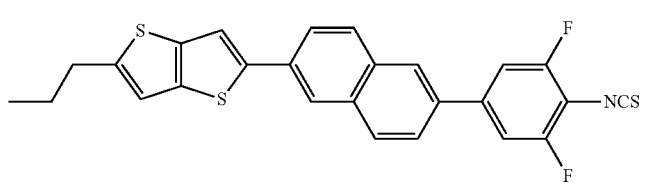
(I-23)
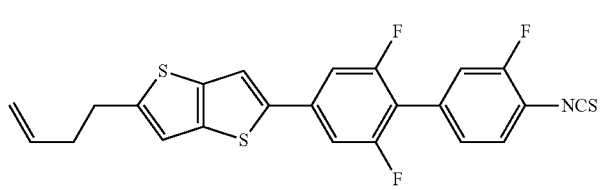
(I-24)
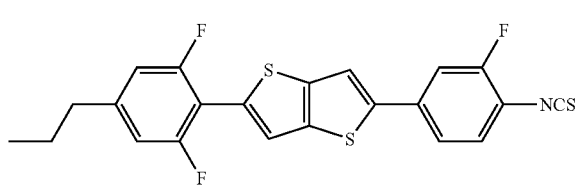
(I-25)
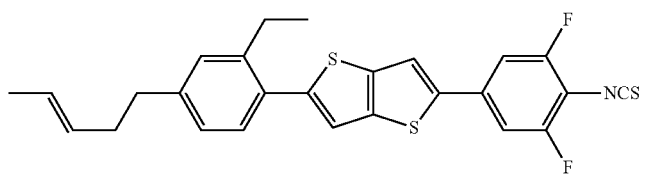
[Chemical formula 22]
(I-26)
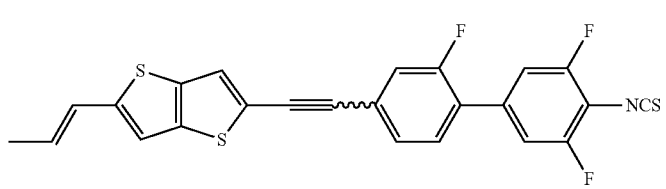
(I-27)
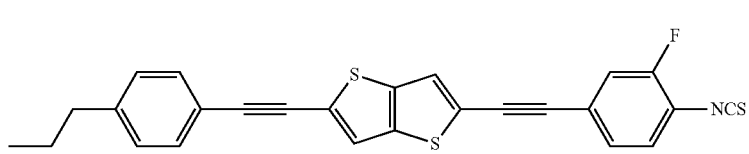
(I-28)
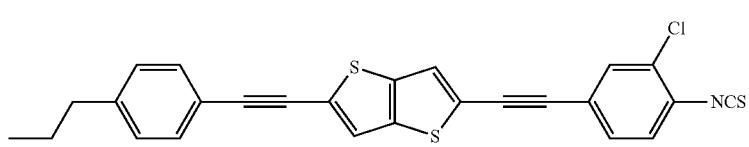

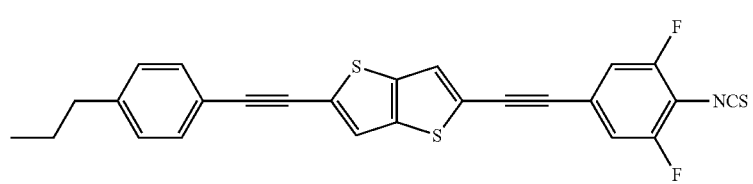
(I-29)
The compound of the present invention can be produced by the following production method.
(Production Method 1) Production of a Compound Represented by the Following Formula (s-10)
[Chemical formula 23]
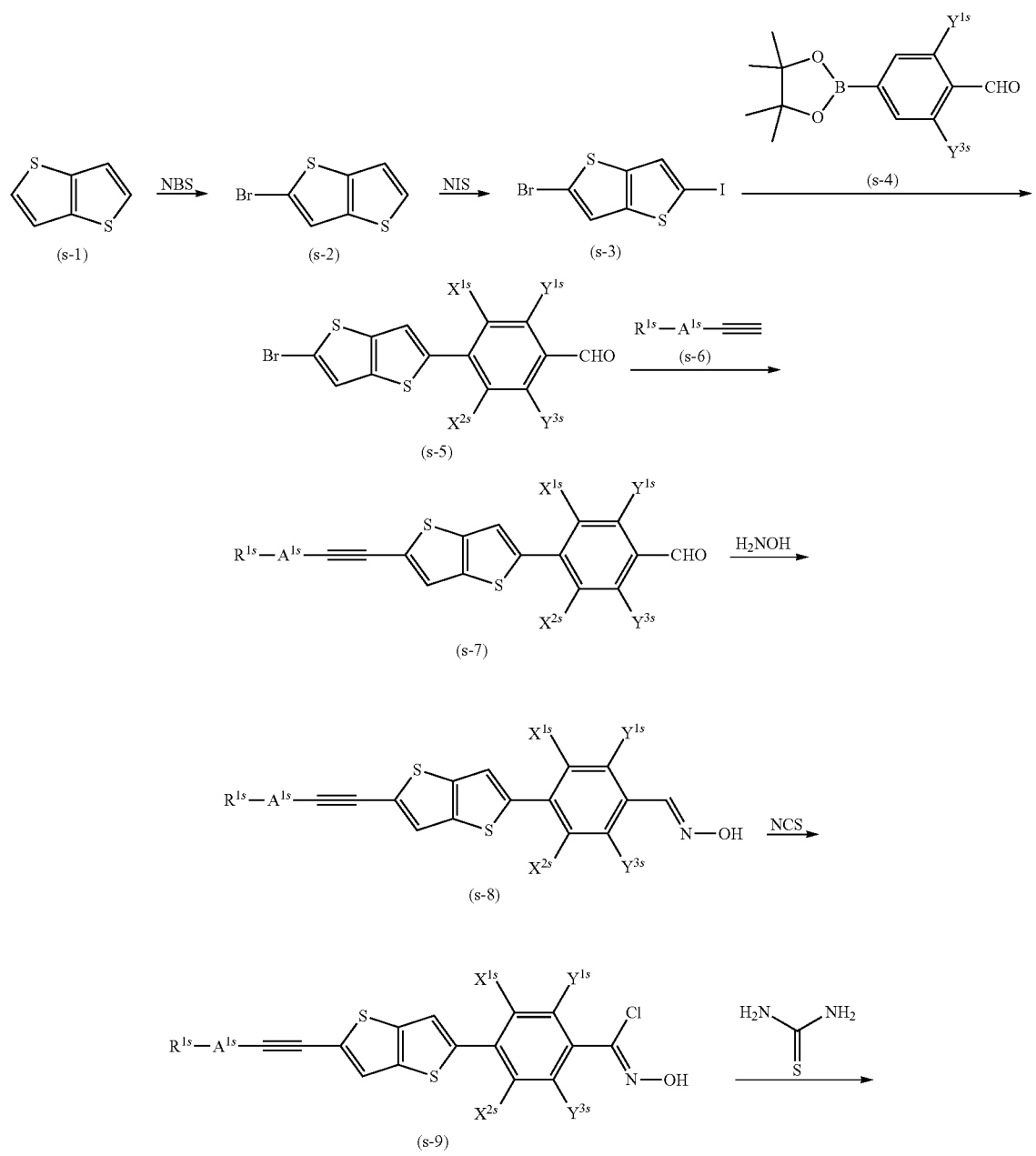

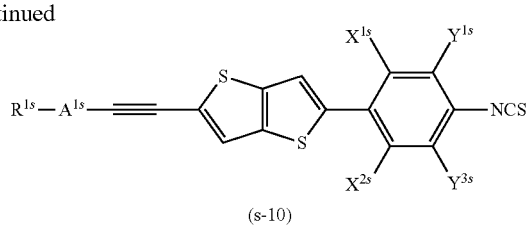

(In the formulas, $R^{1s}$, $A^{1s}$, $X^{1s}$, $X^{2s}$, $Y^{1s}$ and $Y^{3s}$ have the same meanings as $R^1$, $A^1$, $X^1$, $X^2$, $Y^1$ and $Y^3$ in the general formula (I).)

Reaction of the compound represented by the formula (s-1) with, for example, N-bromosuccinimide, provides a compound represented by the formula (s-2).

Reaction of the compound represented by the formula (s-2) with, for example, N-iodosuccinimide, provides a compound represented by the formula (s-3).

Reaction of the compound represented by the formula (s-3) with a compound represented by the general formula (s-4) provides a compound represented by the general formula (s-5). Examples of the reaction method include a method of causing cross-coupling in the presence of, for example, a metal catalyst and a base. Specific examples of the metal catalyst include [1,1'-bis(diphenylphosphino)ferrocene]palladium (II) dichloride, palladium (II) acetate, dichlorobis[di-tert-butyl(p-dimethylaminophenyl)phosphino]palladium (II), and tetrakis(triphenylphosphine)palladium (0). When palladium (II) acetate is used as the metal catalyst, a ligand such as triphenylphosphine and 2-dicyclohexylphosphino-2',4', 6'-triisopropylbiphenyl may be added. Specific examples of the base include potassium carbonate, potassium phosphate, and cesium carbonate.

Reaction of the compound represented by the general formula (s-5) with a compound represented by the general formula (s-6) provides a compound represented by the general formula (s-7). Examples of the reaction method include Sonogashira coupling reaction using a palladium catalyst, a copper catalyst and a base. Specific examples of the palladium catalyst include those described above. Specific examples of the copper catalyst include copper (I) iodide. Specific examples of the base include triethylamine.

Reaction of the compound represented by the general formula (s-7) with, for example, hydroxylamine, provides a compound represented by the general formula (s-8).

Reaction of the compound represented by the general formula (s-8) with, for example, N-chlorosuccinimide, provides a compound represented by the general formula (s-9).

Reaction of the compound represented by the general formula (s-9) with, for example, thiourea, provides a compound represented by the general formula (s-10).

Note that the above-mentioned Production Method 1 shows the production method of the compound wherein $A^x$ in the general formula (I) is represented by the formula (Ax-1), but the compound wherein $A^x$ in the general formula (I) is represented by the formula (Ax-2) can be synthesized by the same method as the compound represented by the general formula (s-10).

(Production Method 2) Production of a Compound Represented by the Following Formula (s-20)

[Chemical formula 24]

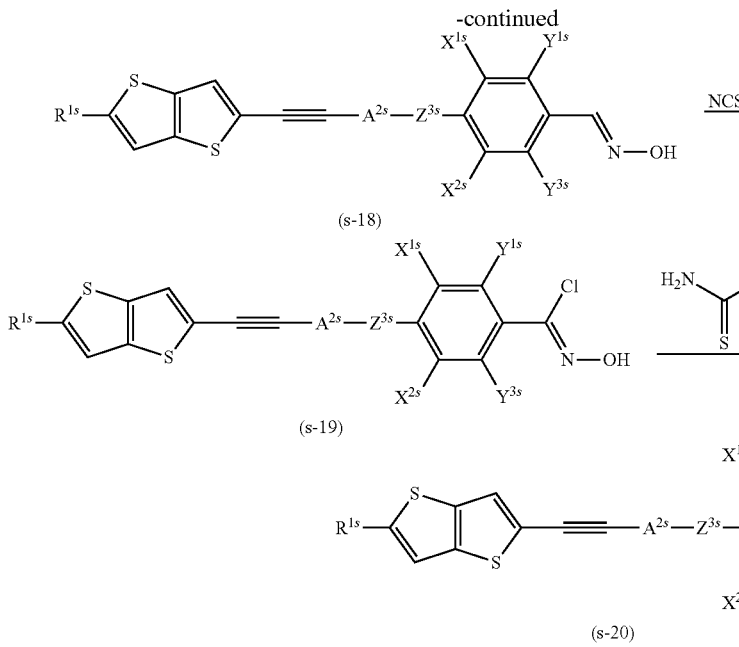

(In the formulas, $R^{1s}$, $A^{2s}$, $Z^{3s}$, $X^{1s}$, $X^{2s}$, $Y^{1s}$ and $Y^{3s}$ have the same meanings as $R^1$, $A^1$, $Z^3$, $X^1$, $X^2$, $Y^1$ and $Y^3$ in the general formula (I), and Alkyl represents a linear or branched alkyl group having 1 to 19 carbon atoms that may be substituted in the same manner as the general formula (I).)

Reaction of the compound represented by the formula (s-11) with the compound represented by the formula (s-12) in the presence of a Lewis acid provides a compound represented by the formula (s-13). Specific examples of the Lewis acid include aluminum (I) chloride.

A compound represented by the formula (s-14) can be obtained by reducing the carbonyl group of the compound represented by the formula (s-13). Examples of the reaction method include a method using aluminum (I) chloride and lithium aluminum hydride.

Reaction of the compound represented by the formula (s-14) with, for example, N-bromosuccinimide, provides the compound represented by the formula (s-15).

Reaction of the compound represented by the formula (s-15) with the compound represented by the general formula (s-16) provides a compound represented by the general formula (s-17). Examples of the reaction method include Sonogashira coupling reaction using a palladium catalyst, a copper catalyst and a base. Specific examples of the palladium catalyst, the copper catalyst and the base include those described above.

Reaction of the compound represented by the general formula (s-17) with, for example, hydroxylamine, provides a compound represented by the general formula (s-18).

Reaction of the compound represented by the general formula (s-18) with, for example, N-chlorosuccinimide, provides the compound represented by the general formula (s-19).

Reaction of the compound represented by the general formula (s-19) with, for example, thiourea, provides the compound represented by the general formula (s-20).

Note that the above-mentioned Production Method 2 shows the production method of the compound wherein $A^x$ in the general formula (I) is represented by the formula (Ax-1), but the compound wherein Ax in the general formula (I) is represented by the formula (Ax-2) can also be synthesized by the same method as the compound represented by the general formula (s-20).

Examples of reaction conditions other than those described in each step include those described in literature such as Experimental Chemistry Course (edited by the Chemical Society of Japan, published by Maruzen Co., Ltd.), Organic Syntheses (A John Wiley & Sons, Inc., Publication), Beilstein Handbook of Organic Chemistry (Beilstein-Institut fuer Literatur der Organischen Chemie, Springer-Verlag Berlin and Heidelberg GmbH & Co. K), Fiesers' Reagents for Organic Synthesis (John Wiley & Sons, Inc.) or the like, or those listed in databases such as SciFinder (Chemical Abstracts Service, American Chemical Society), Reaxys (Elsevier Ltd.) or the like.

In each step, a functional group can be protected as needed. Examples of a protective group include protective groups described in GREENE'S PROTECTIVE GROUPS IN ORGANIC SYNTHESIS ((Fourth Edition), co-authored by PETER G. M. WUTS and THEODORA W. GREENE, A John Wiley & Sons, Inc., Publication).

In addition, purification can be performed as needed in each step. Examples of the purification method include chromatography, recrystallization, distillation, sublimation, reprecipitation, adsorption, and liquid separation treatment. Specific examples of the purifying agent include silica gel, alumina, and activated carbon.

The compound represented by the general formula (I) is preferably used by addition to a liquid crystal composition. When a liquid crystal composition contains a compound represented by the general formula (I), it may contain one compound represented by the general formula (I), or it may contain a plurality of compounds represented by the general formula (I). When the liquid crystal composition of the present invention contains a compound represented by the general formula (I), the total content of the compounds represented by the general formula (I) in the liquid crystal composition is preferably 5% by mass or more, more preferably 10% by mass or more and 95% by mass or less, further preferably 15% by mass or more and 90% by mass or less, and particularly preferably 20% by mass or more and 85% by mass or less. When the liquid crystal composition contains one compound represented by the general formula (I), "the total content of the compounds represented by the general formula (I)" used herein means a content of the compound represented by the general formula (I); and when the liquid crystal composition contains a plurality of compounds represented by the general formula (I), it means a total of contents of the plurality of compounds represented by the general formula (I).

The liquid crystal composition containing the compound represented by the general formula (I) preferably has a refractive index anisotropy (Δn) of 0.15 or more and 1.00 or less. From the viewpoints of the liquid crystal phase temperature range, driving voltage, rotational viscosity and elastic modulus of the liquid crystal composition, the refractive index anisotropy (Δn) is preferably 0.20 or more and 0.95 or less, more preferably 0.25 or more and 0.90 or less, further preferably 0.30 or more and 0.85 or less, and particularly preferably 0.35 or more and 0.80 or less.

When the liquid crystal composition containing a compound represented by the general formula (I) is used for a high-frequency phase shifter, a phased array antenna, an image recognition device, distance measuring equipment, a liquid crystal display device, a liquid crystal lens, or a birefringent lens for displaying a stereoscopic image, the liquid crystal composition containing the compound represented by the general formula (I) preferably has a dielectric constant anisotropy at 1 kHz (Δε (1 kHz)) of 2 or more and 60 or less. From the viewpoints of the liquid crystal phase temperature range, the storage stability, the weather resistance, the driving voltage, the rotation viscosity and the elastic modulus of a liquid crystal composition, the dielectric constant anisotropy at 1 kHz (Δε (1 kHz)) is preferably 2.5 or more and 50 or less, more preferably 3 or more and 40 or less, and in particular preferably 3.5 or more and 30 or less.

The liquid crystal composition containing the compound represented by the general formula (I) is preferably used for a high frequency device. The frequency range is preferably 1 MHz or more and 1 THz or less, more preferably 1 GHz or more and 500 GHz or less, further preferably 2 GHz or more and 300 GHz or less, and in particular preferably 5 GHz or more and 150 GHz or less.

The liquid crystal composition containing the compound represented by the general formula (I) preferably contains a compound represented by the following general formula (VI).

[Chemical formula 25]

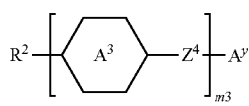
(VI)

(In the formula, $R^2$ represents an alkyl group having 1 to 8 carbon atoms, an alkoxy group having 1 to 7 carbon atoms, an alkenyl group having 2 to 8 carbon atoms, or an alkenyloxy group having 2 to 7 carbon atoms;

$A^3$ represents a group selected from the following formulas (A6-1) to (A6-8),

[Chemical formula 26]

(A6-1)

(A6-2)

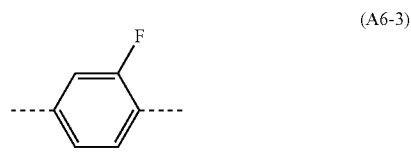
(A6-3)

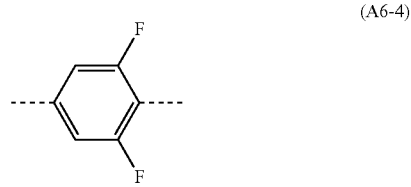
(A6-4)

(A6-5)

(A6-6)

(A6-7)

(A6-8)

(in the formulas, the broken line represents a binding position) with the proviso that when multiple $A^3$s are present, they may be the same or different;

$Z^4$ is —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C— or a single bond with the proviso that when multiple $Z^4$s are present, they may be the same or different;

m3 represents an integer from 1 to 4; and $A^y$ represents a group selected from the following formulas (Ay-1) and (Ay-2),

[Chemical formula 27]

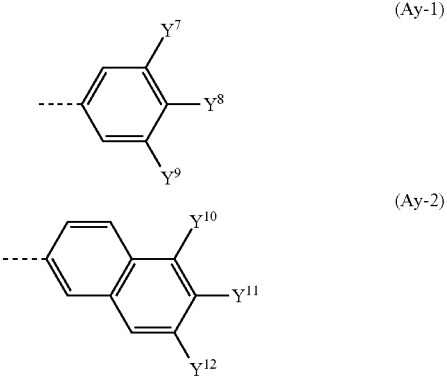

(in the formulas, the broken line represents a binding position, $Y^7$, $Y^9$, $Y^{10}$ and $Y^{12}$ each independently represent a hydrogen atom, a fluorine atom or a chlorine atom, and $Y^8$ and $Y^{11}$ each independently represent a fluorine atom, a chlorine atom, a cyano group, a thioisocyano group, a nitro group, a pentafluorosulfanyl group, an alkyl group having 1 to 8 carbon atoms in which an arbitrary hydrogen atom is substituted with a fluorine atom, an alkoxy group having 1 to 7 carbon atoms in which an arbitrary hydrogen atom is substituted with a fluorine atom, an alkenyl group having 2 to 8 carbon atoms in which an arbitrary hydrogen atom is substituted with a fluorine atom, or an alkenyloxy group having 2 to 7 carbon atoms in which an arbitrary hydrogen atom is substituted with a fluorine atom with the proviso that one —$CH_2$— or two or more —$CH_2$—'s may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF— or —C≡C—). From the viewpoints of the liquid crystal phase temperature range, the refractive index anisotropy, the dielectric constant anisotropy, the rotation viscosity and the elastic modulus of a liquid crystal composition, the compound represented by the general formula (VI) is preferably a compound represented by the following general formula (VI-i),

[Chemical formula 28]

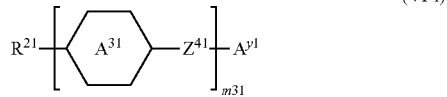

(in the formula, $R^{21}$ represents an alkyl group having 1 to 5 carbon atoms, an alkoxy group having 1 to 4 carbon atoms, an alkenyl group having 2 to 5 carbon atoms, or an alkenyloxy group having 2 to 4 carbon atoms;
$A^{31}$ represents a group selected from the above formulas (A6-1) to (A6-6) with the proviso that when multiple $A^{31}$s are present, they may be the same or different;
$Z^{41}$ represents —$OCH_2$—, —$CH_2O$—, —$CH_2CH_2$—, —COO—, —OCO—, —$CF_2O$—, —$OCF_2$—, —CH—CH—COO—, —OCO—CH=CH—, —CH=CH—, —CH=N—N=CH—, —CF=CF—, —N=N—, —C≡C— or a single bond with the proviso that when multiple $Z^{41}$s are present, they may be the same or different;
m31 represents an integer from 1 to 3; and
$A^{y1}$ represents a group selected from the following formulas (Ay-1-i) and (Ay-2-i),

[Chemical formula 29]

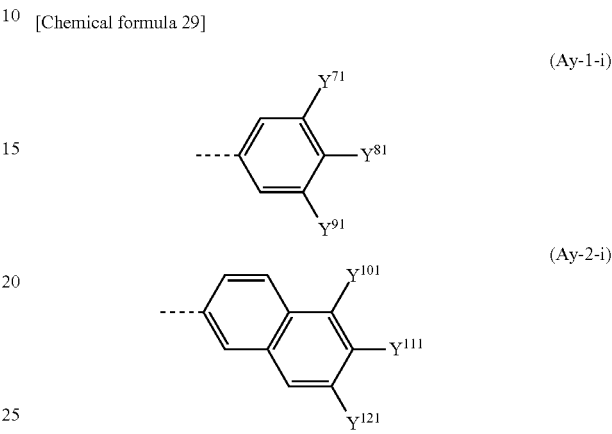

(in the formulas, the broken line represents a binding position, $Y^{71}$, $Y^{91}$, $Y^{101}$ and $Y^{121}$ each independently represent a hydrogen atom, a fluorine atom or a chlorine atom, and $Y^{81}$ and $Y^{111}$ each independently represent a fluorine atom, a chlorine atom, a cyano group, a thioisocyano group, a nitro group, a pentafluorosulfanyl group, an alkyl group having 1 to 8 carbon atoms in which an arbitrary hydrogen atom may be substituted with a fluorine atom, an alkoxy group having 1 to 7 carbon atoms in which an arbitrary hydrogen atom may be substituted with a fluorine atom, an alkenyl group having 2 to 8 carbon atoms in which an arbitrary hydrogen atom may be substituted with a fluorine atom or an alkenyloxy group having 2 to 7 carbon atoms in which an arbitrary hydrogen atom may be substituted with a fluorine atom). The compound represented by the general formula (VI) is more preferably a compound represented by the following general formula (VI-ii),

[Chemical formula 30]

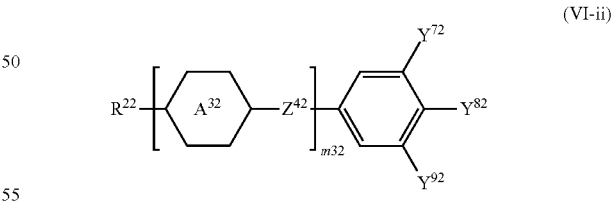

(in the formula, $R^{22}$ represents an alkyl group having 1 to 5 carbon atoms, an alkoxy group having 1 to 4 carbon atoms, an alkenyl group having 2 to 5 carbon atoms or an alkenyloxy group having 2 to 4 carbon atoms;
$A^{32}$ represents a group selected from the above formulas (A6-1) to (A6-5) with the proviso that when multiple $A^{32}$s are present, they may be the same or different;
$Z^{42}$ represents —$CF_2O$—, —$OCF_2$—, —CH=CH—, —CF=CF—, —N=N—, —C≡C— or a single bond with the proviso that when multiple $Z^{42}$s are present, they may be the same or different;

m32 represents 1, 2 or 3; and $Y^{72}$ and $Y^{92}$ each independently represent a hydrogen atom, a fluorine atom or a chlorine atom, and $Y^{82}$ represents a fluorine atom, a chlorine atom, a cyano group, a thioisocyano group, a nitro group, a pentafluorosulfanyl group, an alkyl group having 1 to 8 carbon atoms in which an arbitrary hydrogen atom may be substituted with a fluorine atom, an alkoxy group having 1 to 7 carbon atoms in which an arbitrary hydrogen atom may be substituted with a fluorine atom, an alkenyl group having 2 to 8 carbon atoms in which an arbitrary hydrogen atom may be substituted with a fluorine atom or an alkenyloxy group having 2 to 7 carbon atoms in which an arbitrary hydrogen atom may be substituted with a fluorine atom). The compound represented by the general formula (VI) is further preferably a compound represented by the following general formula (VI-iii),

[Chemical formula 31]

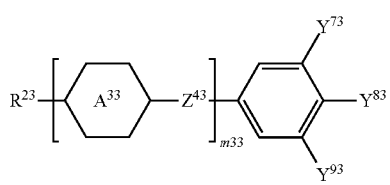

(VI-iii)

(in the formula, $R^{23}$ represents an alkyl group having 1 to 5 carbon atoms, an alkoxy group having 1 to 4 carbon atoms or an alkenyl group having 2 to 5 carbon atoms, $A^{33}$ represents a group selected from the above formulas (A6-1) to (A6-5) with the proviso that when multiple $A^{33}$s are present, they may be the same or different, $Z^{43}$ represents —$CF_2O$—, —$OCF_2$—, —N=N—, —C≡C— or a single bond with the proviso that when multiple $Z^{43}$s are present, they may be the same or different, m33 represents 1, 2 or 3, $Y^{73}$ and $Y^{93}$ each independently represent a hydrogen atom, a fluorine atom or a chlorine atom, and $Y^{83}$ represents a fluorine atom, a chlorine atom, a cyano group or a thioisocyano group). The compound represented by the general formula (VI) is in particular preferably a compound represented by the following general formulas (VI-iv-1) to (VI-iv-21),

[Chemical formula 32]

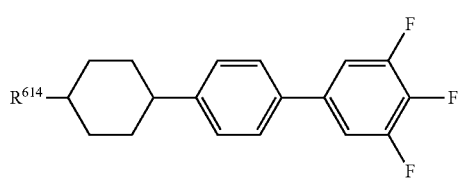

(VI-iv-1)

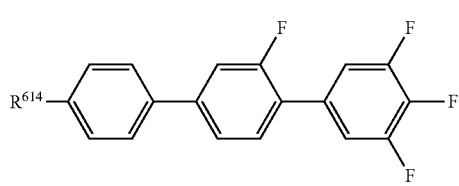

(VI-iv-2)

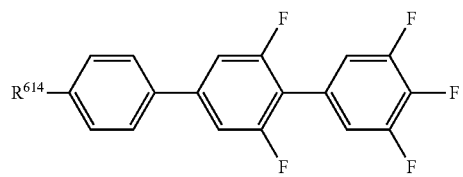

(VI-iv-3)

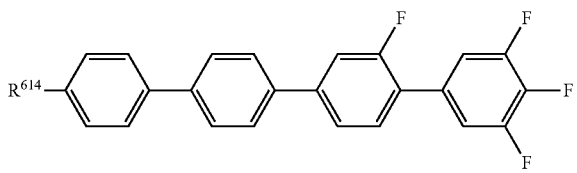

(VI-iv-4)

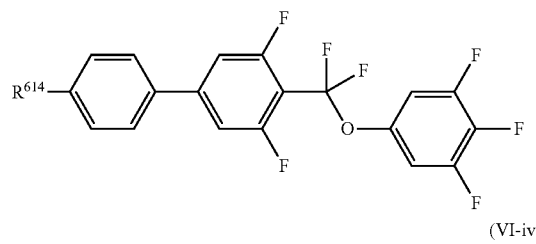

(VI-iv-5)

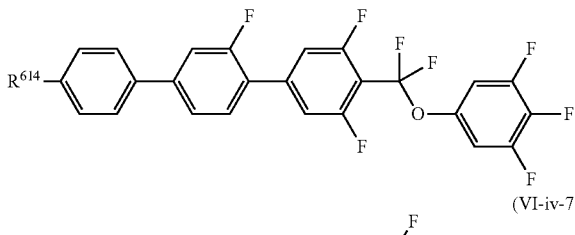

(VI-iv-6)

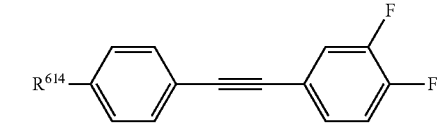

(VI-iv-7)

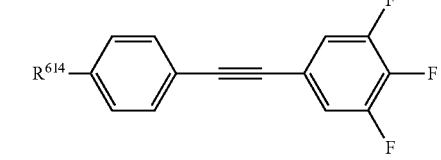

(VI-iv-8)

[Chemical formula 34]

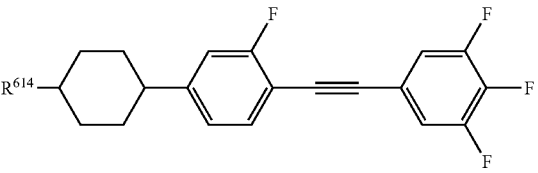

(VI-iv-9)

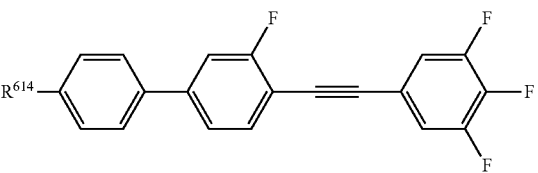

(VI-iv-10)

(VI-iv-11)
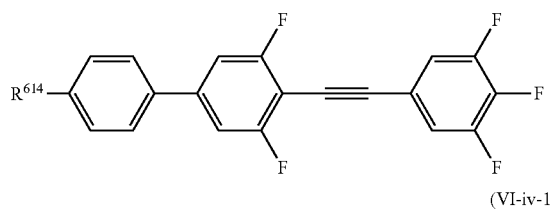

(VI-iv-12)
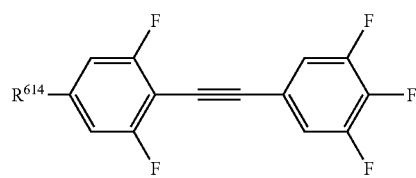

[Chemical formula 35]

(VI-iv-13)
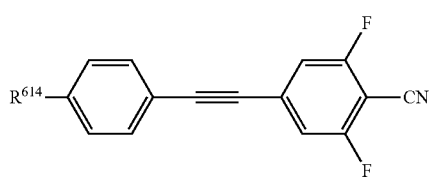

(VI-iv-14)
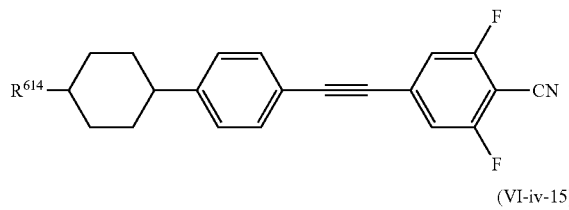

(VI-iv-15)
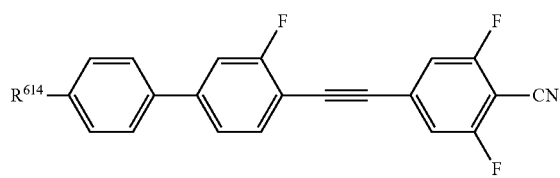

(VI-iv-16)
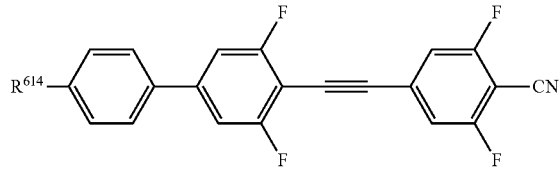

[Chemical formula 36]

(VI-iv-17)
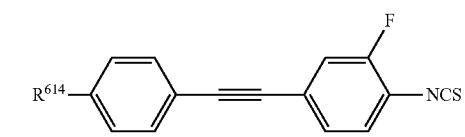

(VI-iv-18)
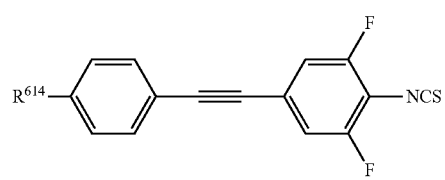

(VI-iv-19)
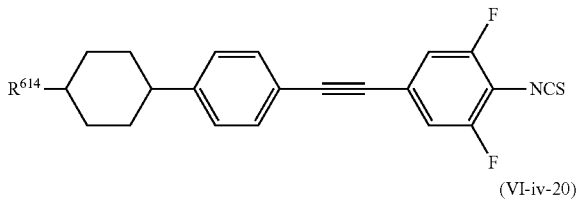

(VI-iv-20)
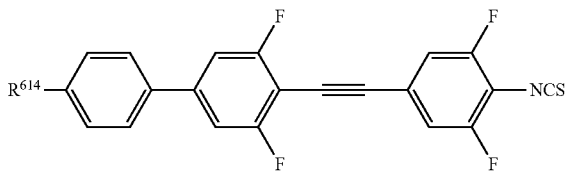

(VI-iv-21)
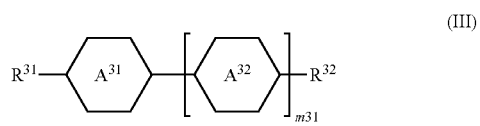

(in the formulas, $R^{614}$ represents an alkyl group having 1 to 5 carbon atoms, an alkoxy group having 1 to 4 carbon atoms or an alkenyl group having 2 to 5 carbon atoms).

The liquid crystal composition containing the compound represented by the general formula (I) may contain a compound represented by the following general formula (III),

[Chemical formula 37]

(III)

$$R^{31}-A^{31}-\left[A^{32}\right]_{m31}-R^{32}$$

(in the formula, $R^{31}$ and $R^{32}$ each independently represent an alkyl group having 1 to 8 carbon atoms, an alkoxy group having 1 to 7 carbon atoms, an alkenyl group having 2 to 8 carbon atoms or an alkenyloxy group having 2 to 7 carbon atoms;

$A^{31}$ and $A^{32}$ each independently represent a group selected from the following formulas (A3-1) to (A3-8),

[Chemical formula 38]

(A3-1)

(A3-2)
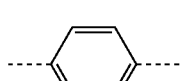

(A3-3)
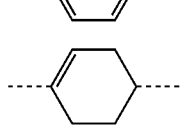

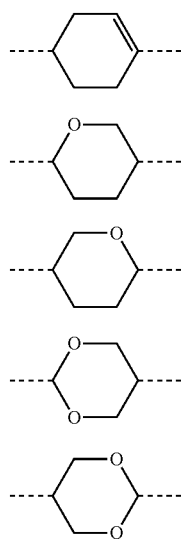

(A3-4)

(A3-5)

(A3-6)

(A3-7)

(A3-8)

(in the formulas, the broken line represents a binding position) with the proviso that when multiple $A^{32}$s are present, they may be the same or different; and
m31 represents an integer from 1 to 4). From the viewpoints of the liquid crystal phase temperature range, the refractive index anisotropy, the dielectric constant anisotropy, the rotation viscosity and the elastic modulus of a liquid crystal composition, the compound represented by the general formula (III) is preferably a compound represented by the following general formula (III-i),

[Chemical formula 39]

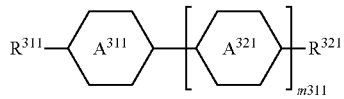

(III-i)

(in the formula, $R^{311}$ and $R^{321}$ each independently represent an alkyl group having 1 to 5 carbon atoms, an alkoxy group having 1 to 4 carbon atoms, an alkenyl group having 2 to 5 carbon atoms or an alkenyloxy group having 2 to 4 carbon atoms;
$A^{311}$ and $A^{321}$ each independently represent a group selected from the following formulas (A31-1) to (A31-6),

[Chemical formula 40]

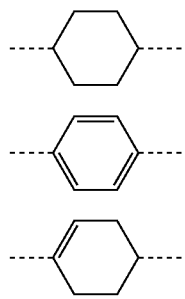

(A31-1)

(A31-2)

(A31-3)

(A31-4)

(A31-5)

(A31-6)

(in the formulas, the broken line represents a binding position) with the proviso that when multiple $A^{321}$s are present, they may be the same or different; and
m311 represents an integer from 1 to 3). The compound represented by the general formula (III) is more preferably a compound represented by the following general formula (III-ii),

[Chemical formula 41]

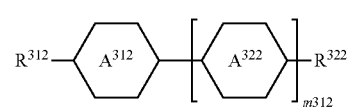

(III-ii)

(in the formula, $R^{312}$ and $R^{322}$ each independently represent an alkyl group having 1 to 5 carbon atoms, an alkoxy group having 1 to 4 carbon atoms, an alkenyl group having 2 to 5 carbon atoms or an alkenyloxy group having 2 to 4 carbon atoms;
$A^{312}$ and $A^{322}$ each independently represent a group selected from the following formulas (A32-1) to (A32-4),

[Chemical formula 42]

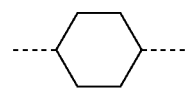

(A32-1)

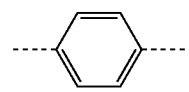

(A32-2)

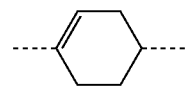

(A32-3)

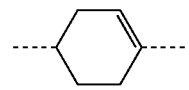

(A32-4)

(in the formulas, the broken line represents a binding position) with the proviso that when multiple $A^{322}$s are present, they may be the same or different; and
m312 represents an integer of 1 or 2). The compound represented by the general formula (III) is further preferably a compound represented by the following general formula (III-iii),

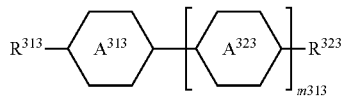
(III-iii)

(in the formula, $R^{313}$ and $R^{323}$ each independently represent an alkyl group having 1 to 5 carbon atoms, an alkoxy group having 1 to 4 carbon atoms or an alkenyl group having 2 to 5 carbon atoms;

$A^{313}$ and $A^{323}$ each independently represent a group selected from the following formulas (A33-1) and (A33-2),

[Chemical formula 43]

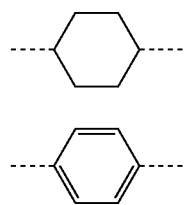

(A33-1)

(A33-2)

(in the formulas, the broken line represents a binding position) with the proviso that when multiple $A^{323}$s are present, they may be the same or different; and m313 represents 1 or 2). The compound represented by the general formula (III) is in particular preferably a compound represented by the following general formulas (III-iv-1) to (III-iv-10),

[Chemical formula 44]

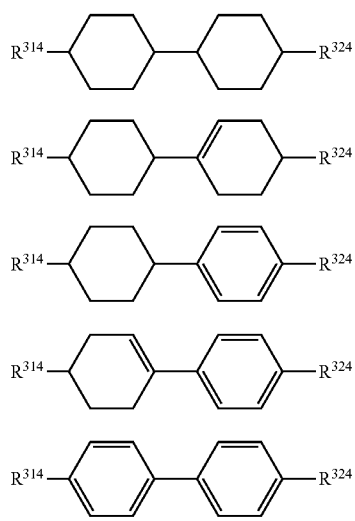

(III-iv-1)

(III-iv-2)

(III-iv-3)

(III-iv-4)

(III-iv-5)

[Chemical formula 45]

(III-iv-6)

(III-iv-7)

(III-iv-8)

(III-iv-9)

(III-iv-10)

(in the formulas, $R^{314}$ and $R^{324}$ each independently represent an alkyl group having 1 to 5 carbon atoms, an alkoxy group having 1 to 4 carbon atoms, or an alkenyl group having 2 to 5 carbon atoms).

Further, the compound represented by the general formula (I) may be added to and used for a liquid crystal composition having a neutral or negative dielectric constant anisotropy ($\Delta\varepsilon$). In that case, the liquid crystal composition containing the compound represented by the general formula (I) preferably has a dielectric constant anisotropy ($\Delta\varepsilon$) of −20 or more and 2 or less. From the viewpoints of the liquid crystal phase temperature range, the storage stability, the weather resistance, the driving voltage, the rotation viscosity and the elastic modulus of a liquid crystal composition, the dielectric constant anisotropy ($\Delta\varepsilon$) is preferably −15 or more and 1.5 or less, more preferably −10 or more and 1 or less, and in particular preferably −5 or more and 0.5 or less.

When a liquid crystal composition containing the compound represented by the general formula (I) has a neutral or negative dielectric constant anisotropy ($\Delta\varepsilon$), the liquid crystal composition may contain a compound represented by the following general formula (IV),

[Chemical formula 46]

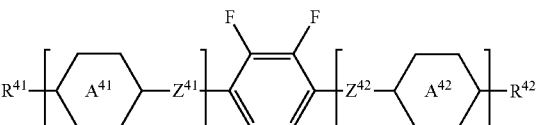

(IV)

(in the formula, $R^{41}$ and $R^{42}$ each independently represent an alkyl group having 1 to 8 carbon atoms, an alkoxy group having 1 to 7 carbon atoms, an alkenyl group having 2 to 8 carbon atoms or an alkenyloxy group having 2 to 7 carbon atoms;

$A^{41}$ and $A^{42}$ each independently represent a group selected from the following formulas (A4-1) to (A4-11),

[Chemical formula 47]

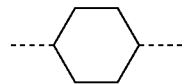 (A4-1)

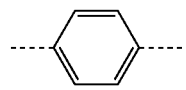 (A4-2)

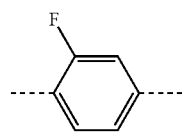 (A4-3)

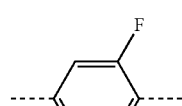 (A4-4)

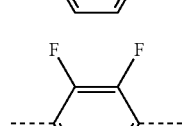 (A4-5)

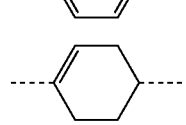 (A4-6)

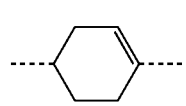 (A4-7)

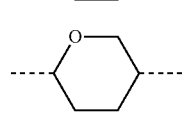 (A4-8)

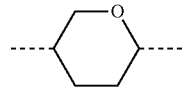 (A4-9)

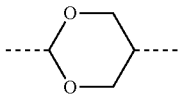 (A4-10)

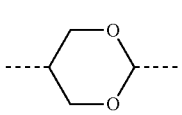 (A4-11)

(in the formulas, the broken line represents a binding position) with the proviso that when multiple $A^{41}$s are present, they may be the same or different, and when multiple $A^{42}$s are present, they may be the same or different;
$Z^{41}$ and $Z^{42}$ each independently represent —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C— or a single bond with the proviso that: when multiple $Z^4$s are present, they may be the same or different; and when multiple $Z^{42}$s are present, they may be the same or different; and
m41 and m42 each independently represent an integer from 0 to 3, and m41+m42 represents an integer from 1 to 3). From the viewpoints of the liquid crystal phase temperature range, the refractive index anisotropy, the dielectric constant anisotropy, the rotation viscosity and the elastic modulus of a liquid crystal composition, the compound represented by the general formula (IV) is preferably a compound represented by the following general formula (IV-i),

[Chemical formula 48]

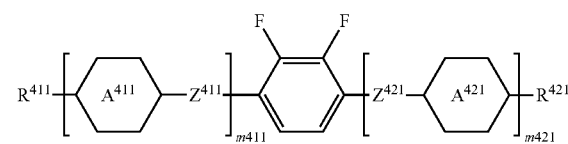

(IV-i)

(in the formula, $R^{411}$ and $R^{421}$ each independently represent an alkyl group having 1 to 5 carbon atoms, an alkoxy group having 1 to 4 carbon atoms, an alkenyl group having 2 to 5 carbon atoms or an alkenyloxy group having 2 to 4 carbon atoms:
$A^{411}$ and $A^{421}$ each independently represent a group selected from the above formulas (A4-1) to (A4-9) with the proviso that: when multiple $A^{411}$s are present, they may be the same or different; and when multiple $A^{421}$s are present, they may be the same or different;
$Z^{411}$ and $Z^{421}$ each independently represent —OCH$_2$—, —CH$_2$O—, —CH$_2$CH$_2$—, —COO—, —OCO—, —CF$_2$O—, —OCF$_2$—, —CH=CH—COO—, —OCO—CH=CH—, —CH=CH—, —CH=N—N=CH—, —CF=CF—, —C≡C— or a single bond with the proviso that: when multiple $Z^{411}$s are present, they may be the same or different; and when multiple $Z^{421}$s are present, they may be the same or different; and
m411 and m421 each independently represent an integer from 0 to 3 and m411+m421 represents an integer from 1 to 3). The compound represented by the general formula (IV) is more preferably a compound represented by the following general formula (IV-ii),

[Chemical formula 49]

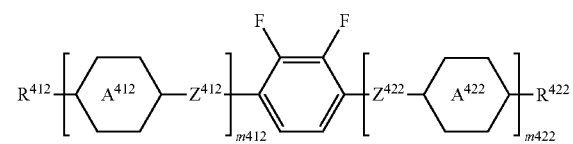

(IV-ii)

(in the formula, $R^{412}$ and $R^{422}$ each independently represent an alkyl group having 1 to 5 carbon atoms, an alkoxy group having 1 to 4 carbon atoms, an alkenyl group having 2 to 5 carbon atoms or an alkenyloxy group having 2 to 4 carbon atoms;

$A^{412}$ and $A^{422}$ each independently represent a group selected from the above formulas (A4-1) to (A4-7) with the proviso that: when multiple $A^{412}$s are present, they may be the same or different; and when multiple $A^{422}$s are present, they may be the same or different;

$Z^{412}$ and $Z^{422}$ each independently represent —OCH$_2$—, —CH$_2$O—, —CH$_2$CH$_2$—, —COO—, —OCO—, —CF$_2$O—, —OCF$_2$— or a single bond with the proviso that: when multiple $Z^{412}$s are present, they may be the same or different; and when multiple $Z^{422}$s are present, they may be the same or different; and m412 and m422 each independently represent 0, 1 or 2, and m412+m422 represents 1 or 2). The compound represented by the general formula (V) is further preferably a compound represented by the following general formula (IV-iii),

[Chemical formula 50]

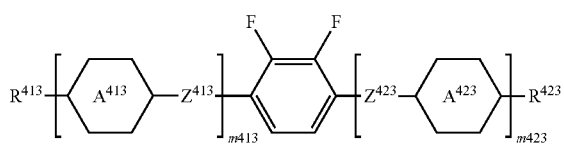

(IV-iii)

(in the formula, $R^{413}$ and $R^{423}$ each independently represent an alkyl group having 1 to 5 carbon atoms, an alkoxy group having 1 to 4 carbon atoms or an alkenyl group having 2 to 5 carbon atoms;

$A^{413}$ and $A^{423}$ each independently represent a group selected from the above formulas (A4-1) to (A4-5) with the proviso that: when multiple $A^{413}$s are present, they may be the same or different; and when multiple $A^{423}$s are present, they may be the same or different;

$Z^{413}$ and $Z^{423}$ each independently represent —OCH$_2$—, —CH$_2$O—, —CH$_2$CH$_2$— or a single bond with the proviso that: when multiple $Z^{413}$s are present, they are the same or different; and when multiple $Z^{423}$s are present, they may be the same or different; and m413 and m423 each independently represent 0, 1 or 2, and m413+m423 represents 1 or 2). The compound represented by the general formula (IV) is in particular preferably a compound represented by the following general formulas (IV-iv-1) to (IV-iv-8),

[Chemical formula 51]

(IV-iv-1)

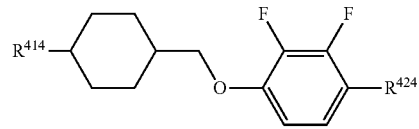

(IV-iv-2)

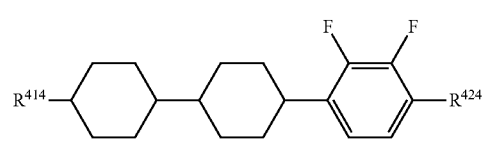

(IV-iv-3)

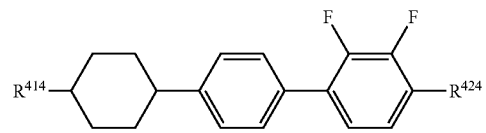

(IV-iv-4)

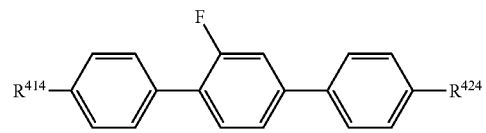

[Chemical formula 52]

(IV-iv-5)

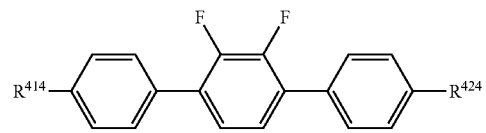

(IV-iv-6)

(IV-iv-7)

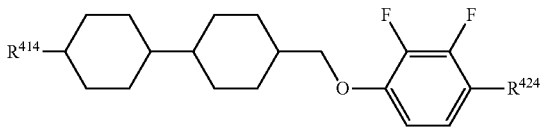

(IV-iv-8)

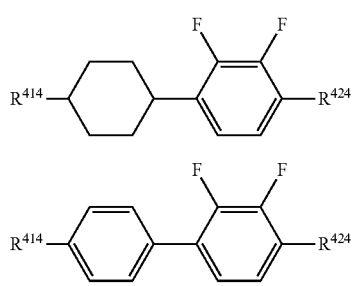

(in the formulas, $R^{414}$ and $R^{424}$ each independently represent an alkyl group having 1 to 5 carbon atoms, an alkoxy group having 1 to 4 carbon atoms, or an alkenyl group having 2 to 5 carbon atoms).

A stabilizer may be added to the liquid crystal composition containing the compound represented by the general formula (I) in order to improve its storage stability. Examples of stabilizers usable therefor include hydroquinones, hydroquinone monoalkyl ethers, tert-butylcatechols, pyrogallols, thiophenols, nitro compounds, β-naphthylamines, β-naphthols and nitroso compounds. When a stabilizer is used, the amount to be added relative to the composition is in the range of preferably 0.005% by mass to 1% by mass, more preferably 0.02% by mass to 0.8% by mass, and further preferably 0.03% by mass to 0.5% by mass. Further, one kind of stabilizer may be used, or two or more kinds of stabilizers may be used in combination. Examples of the stabilizer include a compound represented by the following general formula (X1),

[Chemical formula 53]

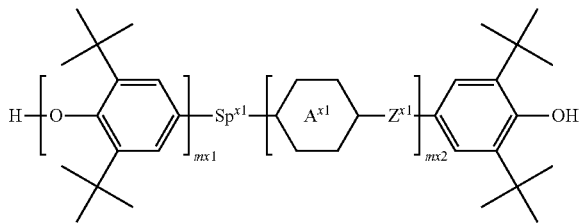
(X1)

(in the formula, $Sp^{x1}$ represents an alkylene group having 1 to 20 carbon atoms in which one —$CH_2$— or two or more nonadjacent —$CH_2$—'s may be each independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF— or —C≡C—, or a single bond;

$A^{x1}$ represents a group selected from the following formulas (Ax1-1) to (Ax1-8),

[Chemical formula 54]

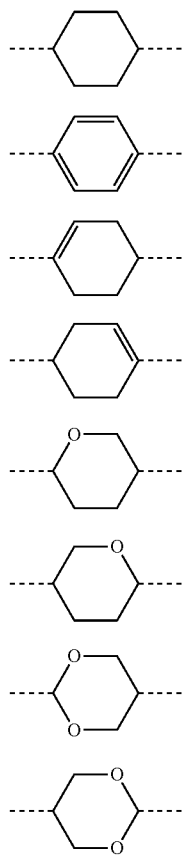

(Ax1-1)
(Ax1-2)
(Ax1-3)
(Ax1-4)
(Ax1-5)
(Ax1-6)
(Ax1-7)
(Ax1-8)

(in the formulas, the broken line represents a binding position) with the proviso that when multiple $A_{x1}$s are present, they may be the same or different;

$Z^{x1}$ represents —O—, —S—, —$OCH_2$—, —$CH_2O$—, —$CH_2CH_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—, —N=CH—, —CH=N—N=CH—, —CF=CF—, —C≡C— or a single bond with the proviso that when multiple $Z^{x1}$s are present, they may be the same or different; and mx1 represents 0 or 1 and mx2 represents an integer from 0 to 4). From the viewpoints of the voltage holding ratio and the compatibility with a liquid crystal composition, the compound represented by the general formula (X1) is preferably a compound represented by the following general formula (X1-i),

[Chemical formula 55]

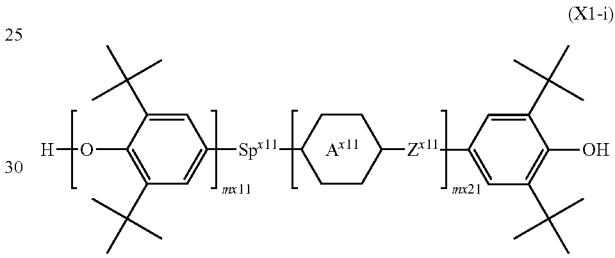
(X1-i)

(in the formula, $Sp^{x11}$ represents an alkylene group having 1 to 20 carbon atoms in which one —$CH_2$— or two or more nonadjacent-$CH_2$-'s may be each independently substituted with —O—, —COO— or —OCO—, or a single bond;

$A^{x11}$ represents a group selected from the following formulas (Ax11-1) and (Ax11-2),

[Chemical formula 56]

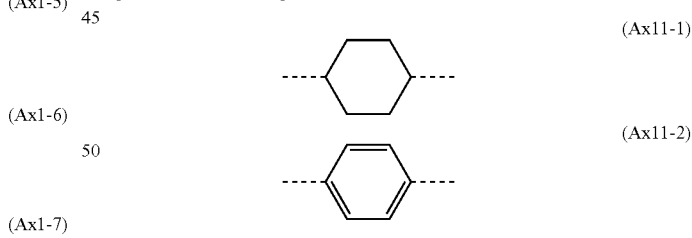

(Ax11-1)
(Ax11-2)

(in the formulas, the broken line represents a binding position) with the proviso that when multiple $A^{x11}$s are present, they may be the same or different;

$Z^{x11}$ represents —COO—, —OCO—, —OCO—$CH_2CH_2$—, —$CH_2CH_2$—COO— or a single bond with the proviso that when multiple $Z^{x11}$s are present, they may be the same or different; and mx11 represents 0 or 1, and mx21 represents 0 or 1). The compound represented by the general formula (X1) is in particular preferably a compound represented by the following general formulas (X1-ii-1) to (X1-ii-4),

[Chemical formula 57]

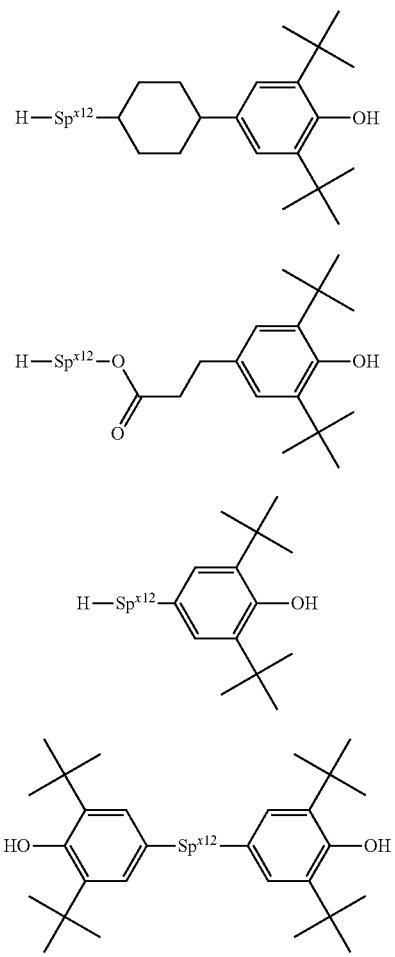

(X1-ii-1)

(X1-ii-2)

(X1-ii-3)

(X1-ii-4)

(in the formulas, $Sp^{x12}$ represents an alkylene group having 1 to 20 carbon atoms or a single bond).

Examples of the liquid crystal composition containing the compound represented by the general formula (I) include a compound represented by the following general formula (X2),

[Chemical formula 58]

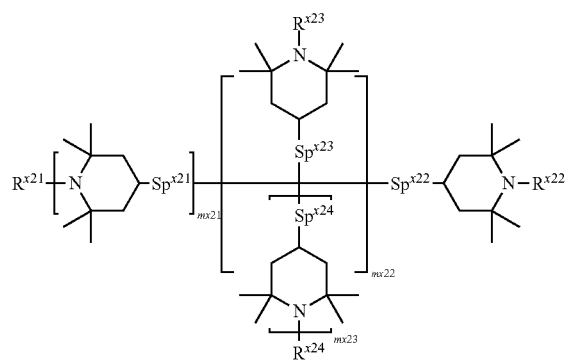

(X2)

(in the formula, $R^{x21}$, $R^{x22}$, $R^{x23}$ and $R^{x24}$ each independently represent a hydrogen atom, an oxygen atom, a hydroxyl group, an alkyl group having 1 to 20 carbon atoms or an alkoxy group having 1 to 20 carbon atoms;

$Sp^{x21}$, $Sp^{x22}$, $Sp^{x23}$ and $Sp^{x24}$ each independently represent a spacer group or a single bond; and mx21 represents 0 or 1,
mx22 represents 0 or 1, and
mx23 represents 0 or 1). From the viewpoints of the voltage holding ratio and the compatibility with a liquid crystal composition, the compound represented by the general formula (X2) is preferably a compound represented by the following general formula (X2-i),

[Chemical formula 59]

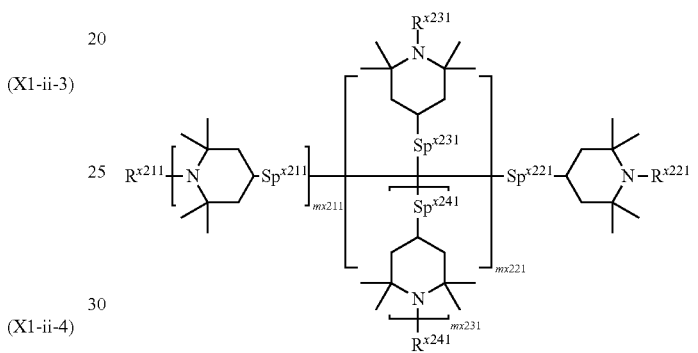

(X2-i)

(in the formula, $R^{x211}$, $R^{x221}$, $R^{x231}$ and $R^{x241}$ each independently represent a hydrogen atom, an oxygen atom, a hydroxyl group, an alkyl group having 1 to 10 carbon atoms or an alkoxy group having 1 to 10 carbon atoms;

$Sp^{x211}$, $Sp^{x221}$, $Sp^{x231}$ and $Sp^{x241}$ each independently represent a linear or branched alkylene group having 1 to 20 carbon atoms in which an arbitrary hydrogen atom in the group may be substituted with a fluorine atom, and one —$CH_2$— or two or more nonadjacent —$CH_2$—'s may be each independently substituted with —O—, —S—, —CO—, —COO—, —OCO—, —CO—S—, —S—CO—, —O—CO—O—, —CO—NH—, —NH—CO—, —CH=CH—, —CF=CF— or —C≡C—, or a single bond; and mx211 represents 0 or 1,
mx221 represents 0 or 1, and
mx231 represents 0 or 1). The compound represented by the general formula (X2) is more preferably a compound represented by the following general formula (X2-ii),

[Chemical formula 60]

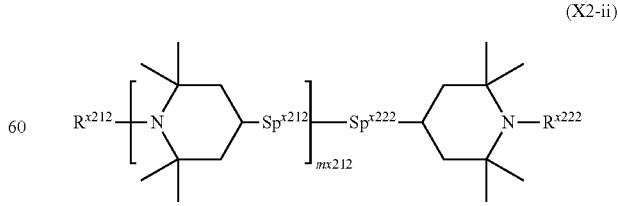

(X2-ii)

(in the formula, $R^{x212}$ and $R^{x222}$ each independently represent a hydrogen atom, an alkyl group having 1 to 10 carbon atoms or an alkoxy group having 1 to 10 carbon atoms;

$Sp^{x212}$ and $Sp^{x222}$ each independently represent a linear alkylene group having 1 to 10 carbon atoms in which one —CH$_2$— or two or more nonadjacent —CH$_2$—'s may be each independently substituted with —O—, —COO— or —OCO—, or a single bond; and mx212 represents 0 or 1). The compound represented by the general formula (X2) is in particular preferably a compound represented by the following general formula (X2-iii),

[Chemical formula 61]

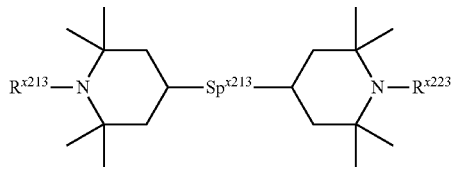

(X2-iii)

(in the formula, $R^{x213}$ and $R^{x223}$ each independently represent a hydrogen atom, an alkyl group having 1 to 10 carbon atoms or an alkoxy group having 1 to 10 carbon atoms; and $Sp^{x23}$ represents a linear alkylene group having 1 to 10 carbon atoms in which one —CH$_2$— or two or more nonadjacent —CH$_2$—'s may be each independently substituted with —COO— or —OCO—).

In the present invention, ring structures contained in a 1,4-cyclohexylene group, a decahydronaphthalene-2,6-diyl group and a 1,3-dioxane-2,5-diyl group each may be either of a trans form and a cis form. However, from the viewpoint of the liquid crystallinity, the content of trans form is preferably higher than that of the cis form for each of the above groups, the content of the trans form in the ring structure is more preferably 80% or more; the content of the trans form in the ring structure is further preferably 90% or more; the content of the trans form in the ring structure is further more preferably 95% or more; and the content of the trans form in the ring structure is in particular preferably 98% or more. Further, in the present invention, the following notation (CY-1) signifies trans form and/or cis form of a 1,4-cyclohexylene group.

[Chemical formula 62]

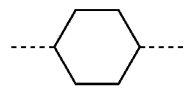

(CY-1)

(In the formula, the broken line represents a binding position.)

Further, in the present invention, each element may be substituted with an isotope of the element.

EXAMPLES

Hereinafter, the present invention will be further described with reference to examples, but the present invention is not limited to these examples. In addition, "%" used for the compositions of Examples and Comparative Examples described below means "mass %." When a substance unstable to oxygen and/or water is handled in each process, it is preferred to carry out operations in an inert gas such as nitrogen gas or argon gas. The purity of each compound was determined by UPLC (Waters ACQUITY UPLC, BEH C$_{18}$ (100×2.1 mm×1.7 µm), acetonitrile/water or 0.1% formic acid-containing acetonitrile/water, PDA, column temperature: 40° C.), GPC (Shimadzu Corporation, HPLC Prominence, Shodex KF-801 (300 mm×8 mm×6 µm)+KF-802 (300 mm×8 mm×6 µm), tetrahydrofuran, RI, UV (254 nm), column temperature: 40° C.), GC (Agilent 6890A, J&W DB-1, 30 m×0.25 mm×0.25 µm, carrier gas He, FID, 100° C. (1 minute)→temperature increase 10° C./min→300° C. (12 minutes)) or $^1$H NMR (JEOL, 400 MHz).

(Example 1) Production of a Compound Represented by the Formula (I-1)

[Chemical formula 63]

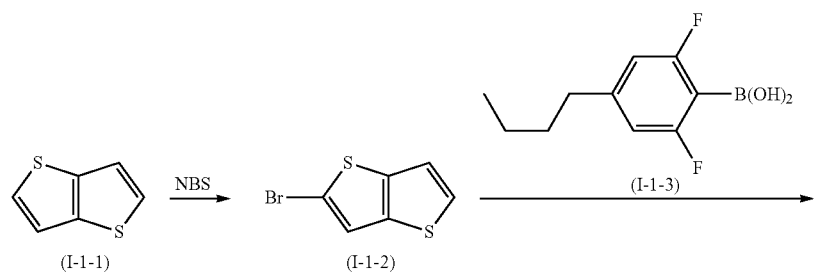

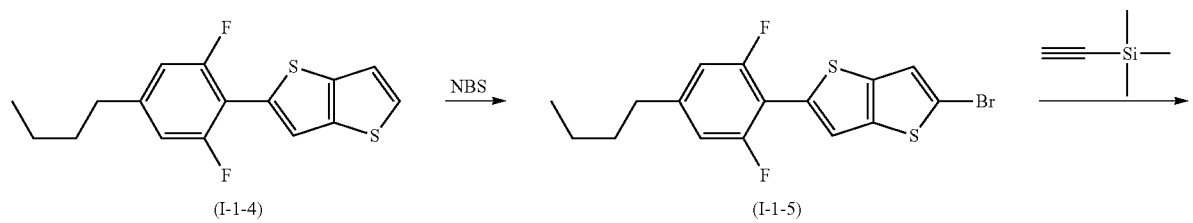

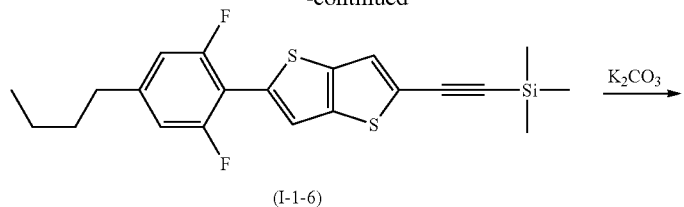

(I-1-6)

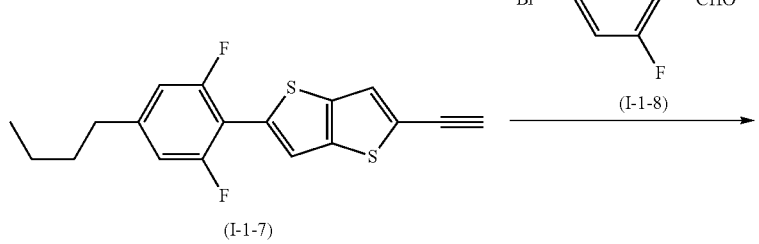

(I-1-7)

[Chemical formula 64]

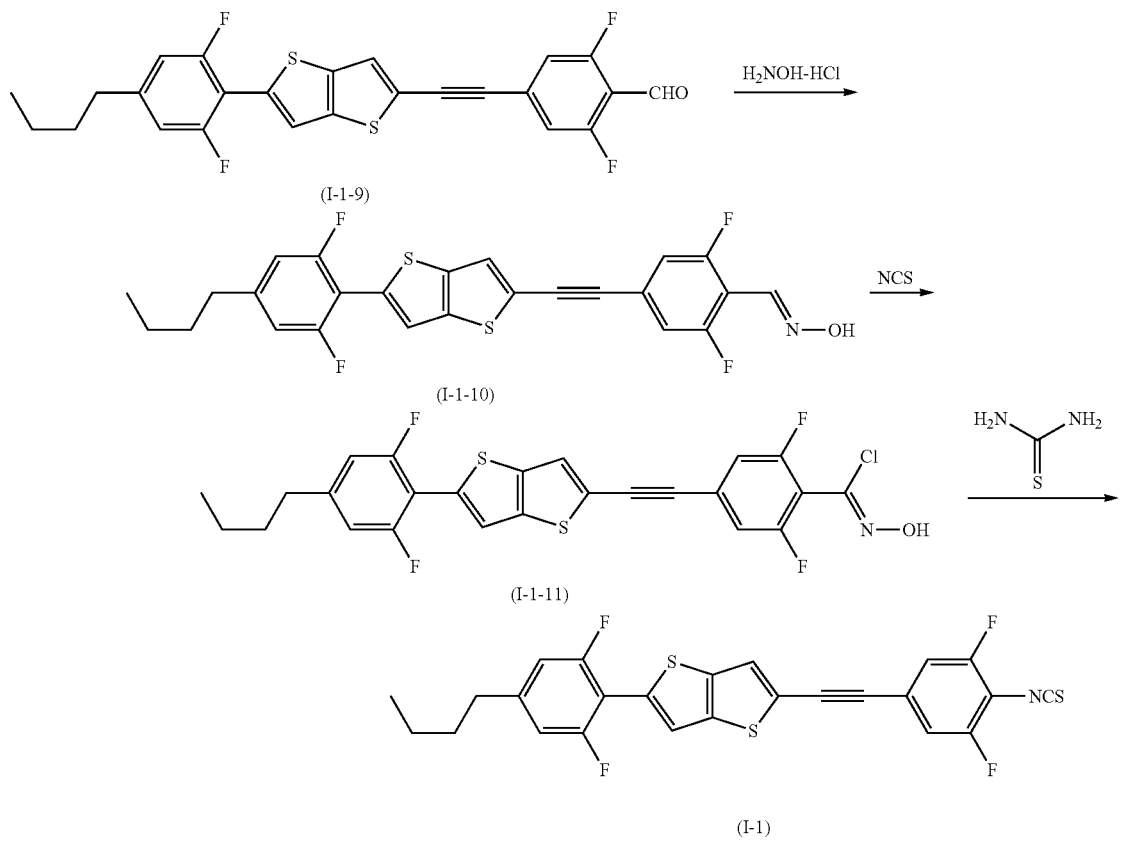

Into a reaction vessel, 7.0 g of the compound represented by the formula (I-1-1) and 70 mL of dichloromethane were charged. With ice-cooling, 9.3 g of N-bromosuccinimide was added little by little, and the mixture was stirred at room temperature for 5 hours. The reaction solution was poured into water and subjected to liquid separation treatment. An organic layer was washed with brine and purified by column chromatography (silica gel, dichloromethane/hexane), and thereby, 8.8 g of a compound represented by the formula (I-1-2) was obtained.

Under a nitrogen atmosphere, 8.8 g of the compound represented by the formula (I-1-2), 8.3 g of potassium carbonate, 8.6 g of a compound represented by the formula (I-1-3), 88 mL of toluene, 44 mL of ethanol, 44 mL of water and 0.3 g of [1,1'-bis(diphenylphosphino)ferrocene]palladium (II) dichloride dichloromethane adduct were charged into a reaction vessel, and the mixture was heated and refluxed for 6 hours. The reaction solution was poured into water and extraction was carried out with toluene. An organic layer was washed with water and brine, successively, and purified by column chromatography (silica gel, toluene/hexane) and recystallization (toluene/ethanol), and thereby, 9.9 g of a compound represented by the formula (I-1-4) was obtained.

Into a reaction vessel, 9.9 g of the compound represented by the formula (I-1-4) and 99 mL of dichloromethane were charged. With ice-cooling, 6.9 g of N-bromosuccinimide was added little by little, and the mixture was stirred at room temperature for 5 hours. The reaction solution was poured into water and subjected to liquid separation treatment. An organic layer was washed with brine and purified by column chromatography (silica gel, dichloromethane/hexane), and thereby, 10.6 g of a compound represented by the formula (I-1-5) was obtained.

Under a nitrogen atmosphere, 10.6 g of the compound represented by the formula (I-1-5), 0.2 g of copper (I) iodide, 0.3 g of 2-dicyclohexylphosphino-2',4',6'-triisopropylbiphenyl [XPhos], 0.1 g of palladiumn (I) acetate, 53 mL of diisopropylamine, and 106 mL of N,N-dimethylformamide were charged into a reaction vessel. With heating at 90° C., 4.0 g of trimethylsilylacetylene was added dropwise, and the mixture was heated and stirred at 90° C. for 5 hours. The reaction solution was poured into water and extraction was carried out with toluene. An organic layer was washed with water and brine, successively, and then purified by column chromatography (silica gel, toluene/hexane) and activated charcoal treatment, and thereby, 8.8 g of a compound represented by the formula (I-1-6) was obtained.

Into a reaction vessel, 8.6 g of the compound represented by the formula (I-1-6), 129 mL of methanol and 4.5 g of potassium carbonate were charged, and the mixture was stirred at room temperature for 8 hours. Water was added to the reaction solution, and extraction was carried out with toluene. An organic layer was washed with water and brine, successively, and then purified by column chromatography (silica gel, toluene/hexane), and thereby, 6.5 g of a compound represented by the formula (I-1-7) was obtained.

Under a nitrogen atmosphere, 4.3 g of a compound represented by the formula (I-1-8), 0.1 g of copper (I) iodide, 0.1 g of 2-dicyclohexylphosphino-2',4',6'-triisopropylbiphenyl [XPhos], 0.1 g of palladium (I) acetate, 43 mL of diisopropylamine, and 86 mL of N,N-dimethylformamide were charged into a reaction vessel. A solution prepared by dissolving 6.5 g of the compound represented by the formula (I-1-7) in 20 mL of N,N-dimethylformamide was added dropwise with heating at 90° C., and the mixture was heated and stirred at 90° C. for 5 hours. The reaction solution was poured into water and extraction was carried out with toluene. An organic layer was washed with water and brine, successively, and then purified by column chromatography (silica gel, toluene/hexane) and activated charcoal treatment, and thereby, 7.4 g of a compound represented by the formula (I-1-9) was obtained.

Into a reaction vessel, 7.4 g of the compound represented by the formula (I-1-9), 2.6 g of sodium acetate, and 74 mL of methanol were charged. At room temperature, 2.2 g of hydroxylamine hydrochloride was added, and the mixture was stirred for 10 hours. The reaction solution was poured into water and extraction was carried out with dichloromethane. An organic layer was washed with water, a saturated aqueous sodium hydrogen carbonate solution and brine, successively, and the solvent was distilled off and dried, and thereby, 6.9 g of a compound represented by the formula (I-1-10) was obtained.

Into a reaction vessel, 6.9 g of the compound represented by the formula (I-1-10) and 69 mL of N,N-dimethylformamide were charged. With ice-cooling, 2.3 g of N-chlorosuccinimide was added, and the mixture was heated and stirred at 40° C. for 2 hours. The reaction solution was cooled and poured into water and extraction was carried out with dichloromethane. An organic layer was washed with water and brine, successively, and the solvent was distilled off and dried, and thereby, 6.7 g of a compound represented by the formula (I-1-11) was obtained.

Into a reaction vessel, 6.7 g of the compound represented by the formula (I-1-11), 1.5 g of thiourea and 67 mL of tetrahydrofuran were charged. With ice-cooling, 3.9 g of triethylamine was added dropwise, and the mixture was heated and stirred at 40° C. for 5 hours. The reaction solution was cooled and poured into water, and extraction was carried out with toluene. An organic layer was washed with water and brine, successively, and then purified by column chromatography (silica gel, toluene/hexane), activated charcoal treatment and recrystallization (toluene/ethanol), and thereby, 4.5 g of a compound represented by the formula (I-1) was obtained.

MS(EI): m/z=501

Extrapolated value of refractive index anisotropy Δn=0.47

(Example 2) Production of a Compound Represented by the Formula (I-2)

[Chemical formula 65]

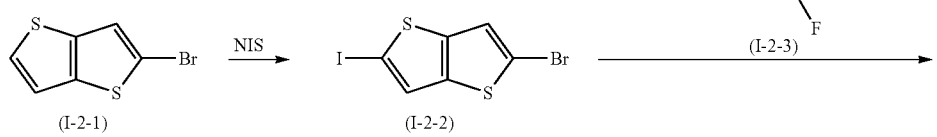

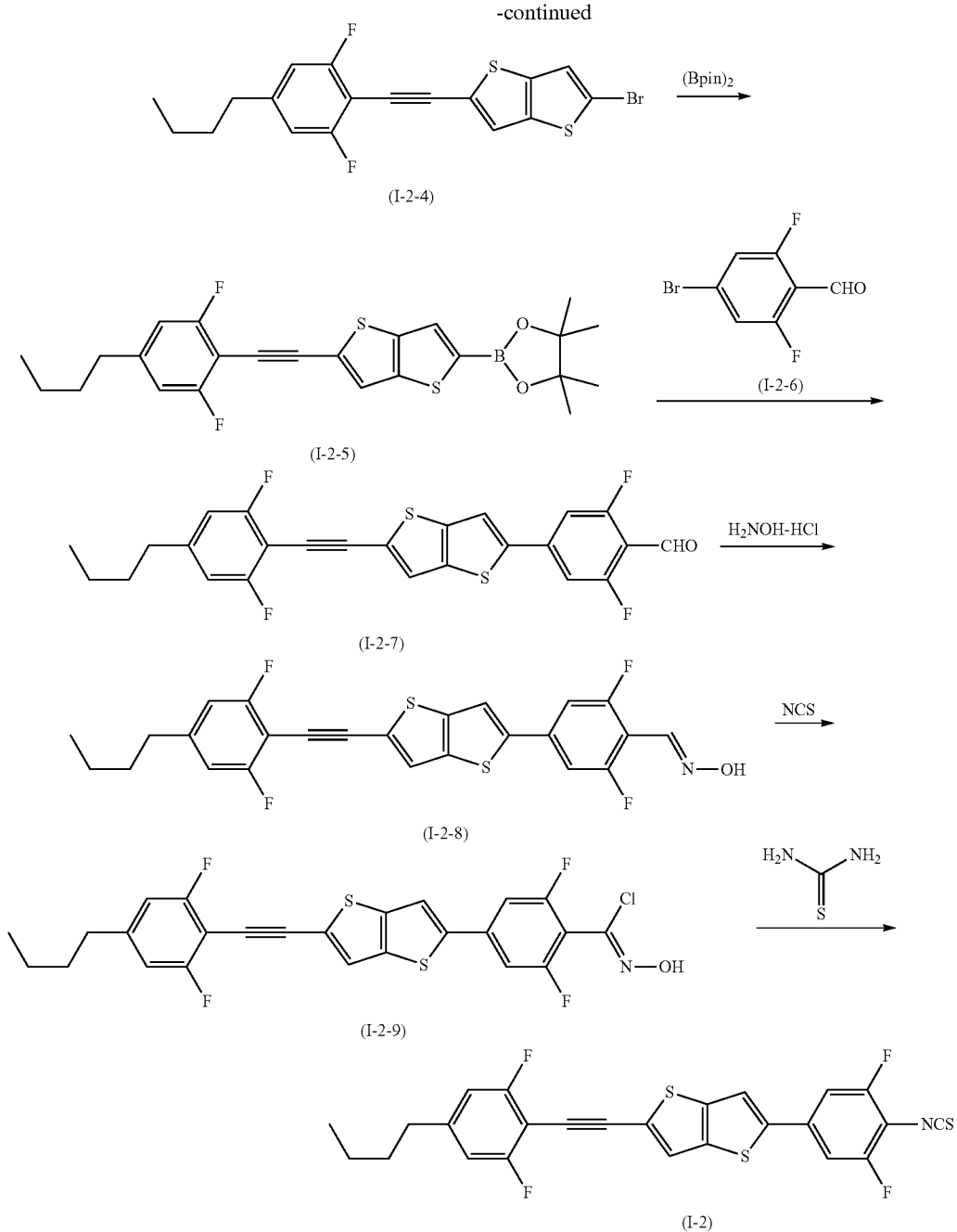

Into a reaction vessel, 7.0 g of a compound represented by the formula (I-2-1) and 70 mL of dichloromethane were charged. With ice-cooling, 7.9 g of N-iodosuccinimide was added little by little, and the mixture was stirred at room temperature for 5 hours. The reaction solution was poured into water and subjected to liquid separation treatment. An organic layer was washed with brine and purified by column chromatography (silica gel, dichloromethane/hexane), and thereby, 8.8 g of a compound represented by the formula (I-2-2) was obtained.

Under a nitrogen atmosphere, 8.8 g of the compound represented by the formula (I-2-2), 0.2 g of copper (I) iodide, 0.2 g of 2-dicyclohexylphosphino-2',4',6'-triisopropylbiphenyl [XPhos], 0.2 g of palladium (II) acetate, 88 mL of diisopropylamine, and 176 mL of N,N-dimethylformamide were charged into a reaction vessel. A solution prepared by dissolving 5.4 g of a compound represented by the formula (I-2-3) in 11 mL of N,N-dimethylformamide was added dropwise with heating at 90° C., and the mixture was heated and stirred at 90° C. for 5 hours. The reaction solution was poured into water and extraction was carried out with toluene. An organic layer was washed with 5% hydrochloric acid and brine, successively, and then purified by column chromatography (silica gel, dichloromethane/hexane), activated carbon treatment and recrystallization (acetone/methanol), and thereby 7.3 g of a compound represented by the formula (I-2-4) was obtained.

Under a nitrogen atmosphere, 7.3 g of the compound represented by the formula (I-2-4), 2.8 g of potassium acetate, 4.0 g of bis(pinacolato)diboron, 56 mL of dimethyl sulfoxide, and 0.1 g of [1,1'-bis(diphenylphosphino)ferrocene]palladium (II) dichloride dichloromethane adduct were charged into a reaction vessel, and the mixture was heated and stirred at 80° C. for 6 hours. The reaction solution was poured into water and extraction was carried out with toluene. An organic layer was washed with water and brine, successively, and then purified by column chromatography (alumina, dichloromethane), and thereby, 6.5 g of a compound represented by the formula (I-2-5) was obtained.

Under a nitrogen atmosphere, 6.5 g of the compound represented by the formula (I-2-5), 3.0 g of potassium carbonate, 3.2 g of a compound represented by the formula (I-2-6), 65 mL of toluene, 33 mL of ethanol, 33 mL of water, and 0.2 g of bis(triphenylphosphine)palladium (II) dichloride were charged into a reaction vessel and the mixture was heated and refluxed for 6 hours. The reaction solution was poured into water and extraction was carried out with toluene. An organic layer was washed with water and brine, successively, and then, purified by column chromatography (silica gel, toluene/hexane) and recrystallization (toluene/hexane), and thereby, 5.4 g of a compound represented by the formula (I-2-7) was obtained.

A compound represented by the formula (I-2) was produced by the same method as in Example 1 except that the compound represented by the formula (I-1-9) was replaced with the compound represented by the formula (I-2-7).

MS(EI): m/z=501

Extrapolated value of refractive index anisotropy Δn=0.49

(Example 3) Production of a Compound Represented by the Formula (I-3)

[Chemical formula 66]

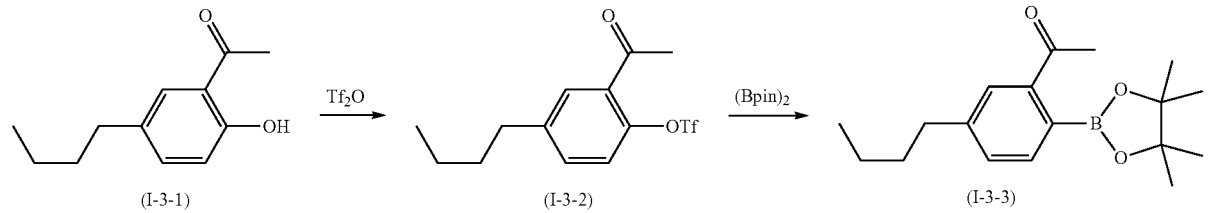

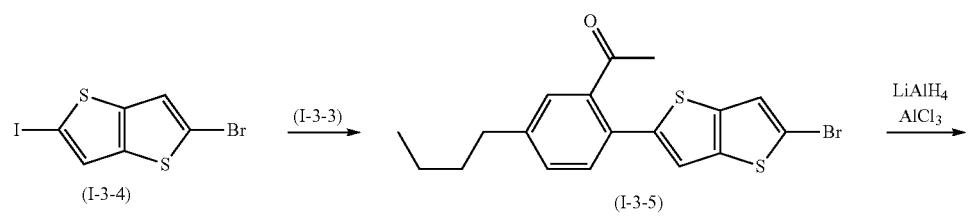

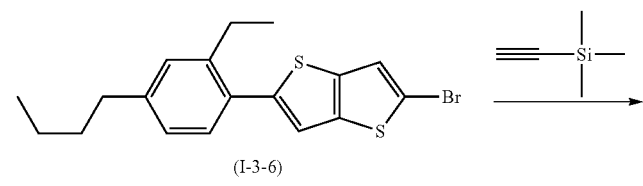

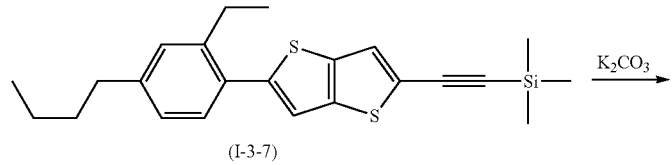

[Chemical formula 67]

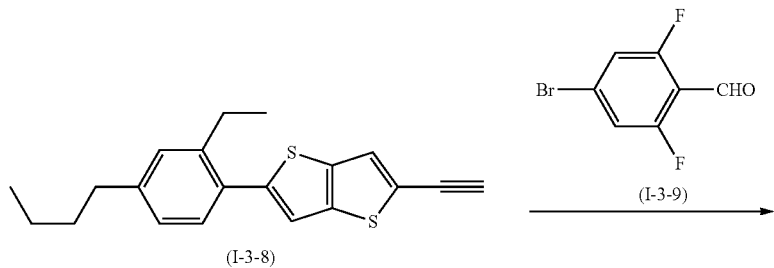

-continued

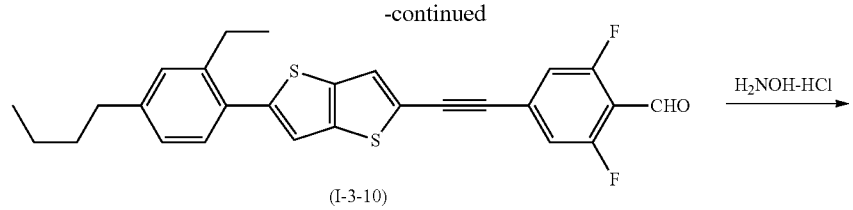

(I-3-10)

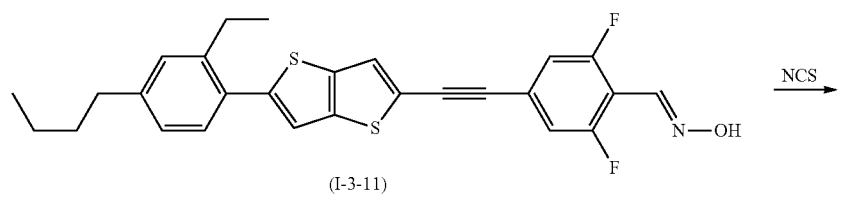

(I-3-11)

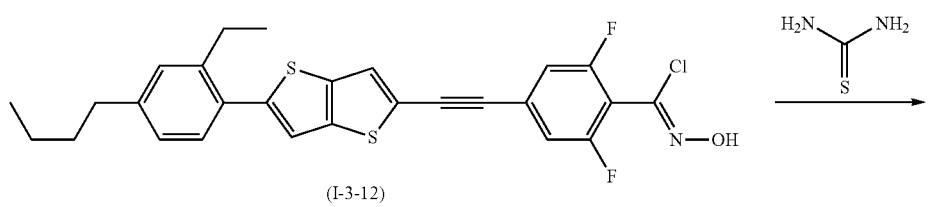

(I-3-12)

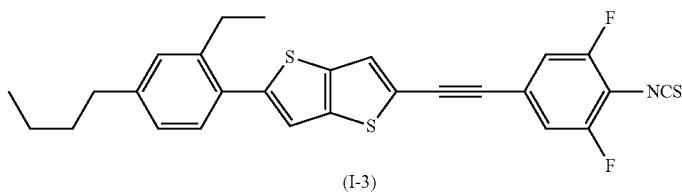

(I-3)

Under a nitrogen atmosphere, 7.0 g of a compound represented by the formula (I-3-1), 4.3 g of pyridine, and 70 mL of dichloromethane were charged into a reaction vessel. With ice-cooling, 11.3 g of trifluoromethanesulfonic anhydride was added dropwise, and the mixture was stirred at room temperature for 4 hours. The reaction solution was poured into a 5% aqueous sodium hydrogen carbonate solution and subjected to liquid separation treatment. An organic layer was washed with 5% hydrochloric acid, water and brine, successively, and then purified by column chromatography (silica gel, dichloromethane/hexane), and thereby, 10.6 g of a compound represented by the formula (I-3-2) was obtained.

Under a nitrogen atmosphere, 10.6 g of the compound represented by the formula (I-3-2), 9.6 g of potassium acetate, 10.0 g of bis(pinacolato)diboron, 106 mL of dimethyl sulfoxide, and 0.4 g of [1,1'-bis(diphenylphosphino) ferrocene]palladium (II) dichloride dichloromethane adduct were charged into a reaction vessel, and the mixture was heated and stirred at 80° C. for 6 hours. The reaction solution was poured into water and extraction was carried out with toluene. An organic layer was washed with water and brine, successively, and then purified by column chromatography (alumina, dichloromethane), and thereby, 7.9 g of a compound represented by the formula (I-3-3) was obtained.

Under a nitrogen atmosphere, 7.9 g of the compound represented by the formula (I-3-3), 5.4 g of potassium carbonate, 9.0 g of the compound represented by the formula (I-3-4), 90 mL of toluene, 45 mL of ethanol, 45 mL of water, and 0.4 g of bis(triphenylphosphine)palladium (II) dichloride were charged into a reaction vessel, and the mixture was heated and refluxed for 6 hours. The reaction solution was poured into water and extraction was carried out with toluene. An organic layer was washed with water and brine, successively, and then purified by column chromatography (silica gel, dichloromethane/hexane) and recrystallization (dichloromethane/methanol), and thereby, 8.2 g of a compound represented by the formula (I-3-5) was obtained.

Under a nitrogen atmosphere, 5.4 g of lithium aluminum hydride and 54 mL of tetrahydrofuran were charged into a reaction vessel. With ice-cooling, 5.6 g of aluminum (II) chloride was added little by little. A solution prepared by dissolving 8.2 g of the compound represented by the formula (I-3-5) in 16 mL of tetrahydrofuran was added dropwise with ice-cooling, and the mixture was stirred at room temperature for 5 hours. With ice-cooling, 10% hydrochloric acid was added dropwise, and a precipitate was removed by filtration. Purification by column chromatography (silica gel, dichloromethane/hexane) and recrystallization (dichloromethane/methanol) provided 6.4 g of a compound represented by the formula (I-3-6).

A compound represented by the formula (I-3) was produced by the same method as in Example 1 except that the compound represented by the formula (I-1-5) was replaced with the compound represented by the formula (I-3-6).

MS(EI): m/z=493

Extrapolated value of refractive index anisotropy $\Delta n$=0.45

(Example 4) Production of a Compound Represented by the Formula (I-4)
[Chemical formula 68]
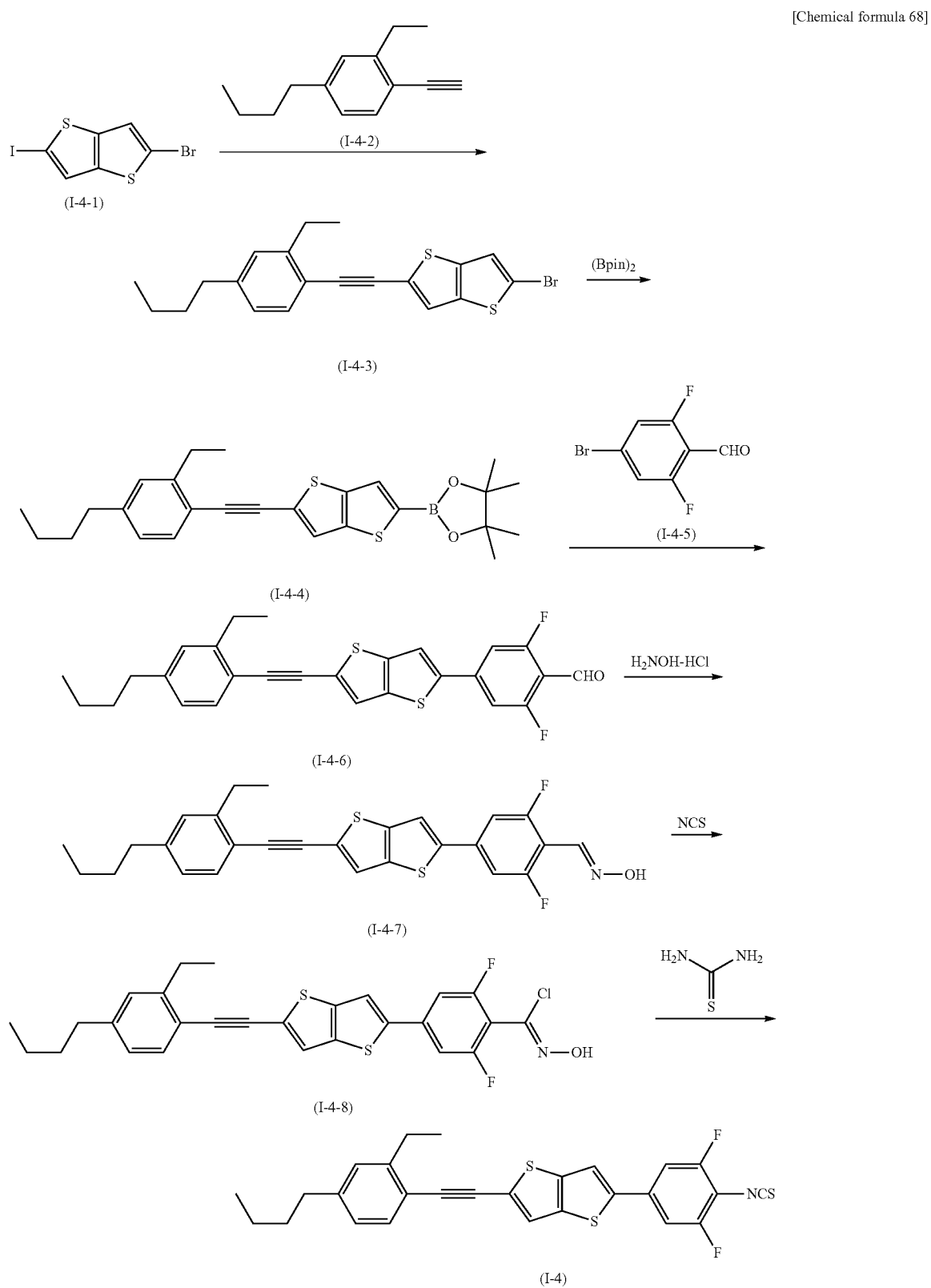

A compound represented by the formula (I-4) was produced by the same method as in Example 2 except that the compound represented by the formula (I-2-3) was replaced with the compound represented by the formula (I-4-2).
MS(EI): m/z=493
Extrapolated value of refractive index anisotropy Δn=0.47
(Example 5) Production of a Compound Represented by the Formula (I-5)
[Chemical formula 69]
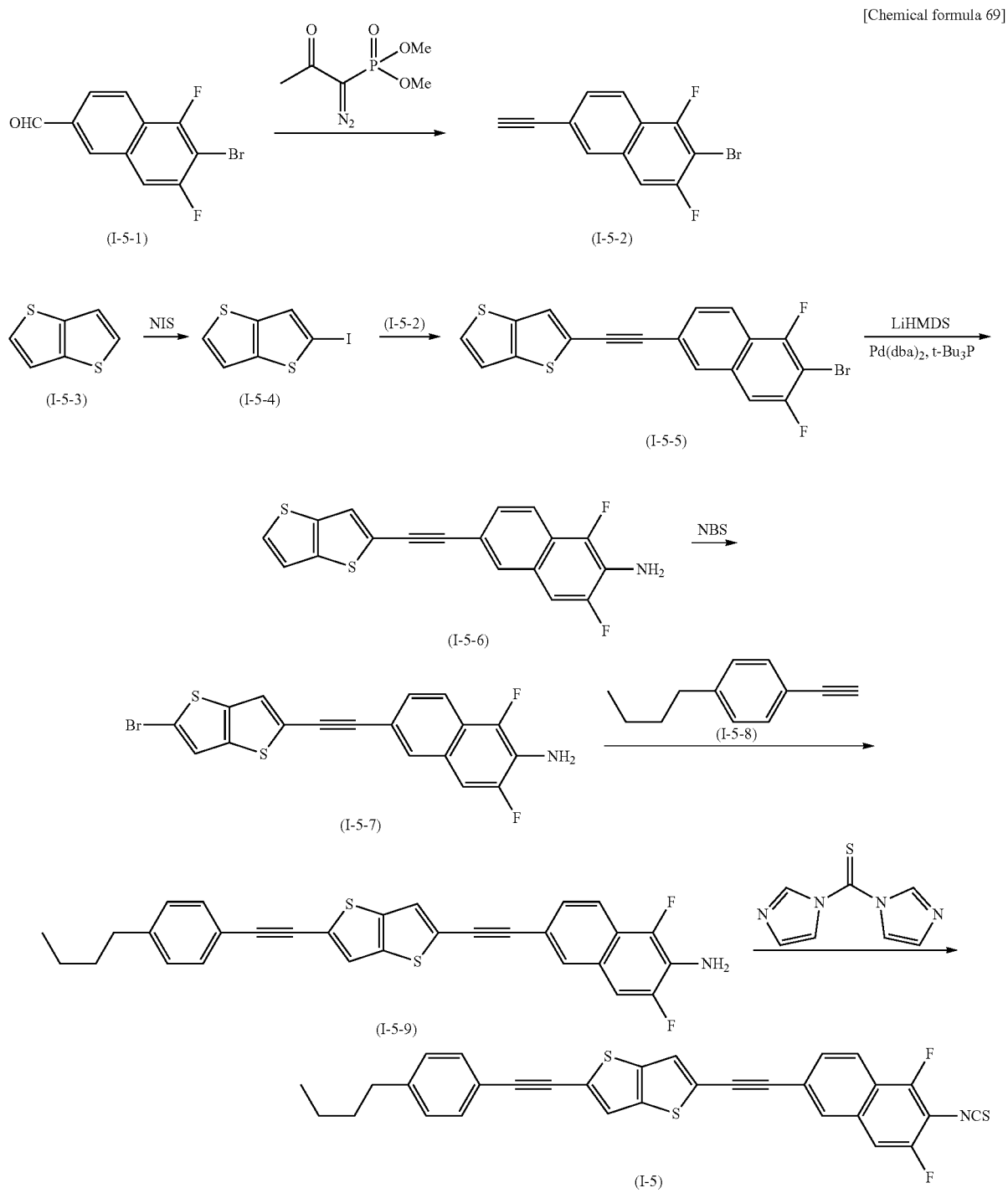

A compound represented by the formula (I-5-1) was produced by the method described in Bioorganic & Medicinal Chemistry Letters, 2015, Vol. 25, No. 21, pp. 4824 to 4827. Under a nitrogen atmosphere, 8.0 g of the compound represented by the formula (I-5-1), 160 mL of methanol, and 8.1 g of potassium carbonate were charged into a reaction vessel. With ice-cooling, 7.4 g of (1-diazo-2-oxopropyl) dimethyl phosphonate was added dropwise, and the mixture was stirred at room temperature for 5 hours. The reaction solution was poured into water and extraction was carried out with toluene. An organic layer was washed with water and brine, successively, and then purified by column chromatography (silica gel, toluene/hexane), and thereby, 6.3 g of a compound represented by the formula (I-5-2) was obtained.

Into a reaction vessel, 7.0 g of a compound represented by the formula (I-5-3) and 70 mL of dichloromethane were charged. With ice-cooling, 12.4 g of N-iodosuccinimide was added little by little, and the mixture was stirred at room temperature for 5 hours. The reaction solution was poured into water and subjected to liquid separation treatment. An organic layer was washed with brine and purified by column chromatography (silica gel, dichloromethane/hexane), and thereby, 10.6 g of a compound represented by the formula (I-5-4) was obtained.

Under a nitrogen atmosphere, 6.3 g of the compound represented by the formula (I-5-4), 0.2 g of copper (I) iodide, 0.2 g of 2-dicyclohexylphosphino-2',4',6'-triisopropylbiphenyl [XPhos], 0.2 g of palladium (II) acetate, 32 mL of diisopropylamine, and 64 mL of N,N-dimethylformamide were charged into a reaction vessel. A solution prepared by dissolving 6.3 g of the compound represented by the formula (I-5-2) in 12 mL of N,N-dimethylformamide was added dropwise with heating at 90° C., and the mixture was heated and stirred at 90° C. for 5 hours. The reaction solution was poured into water and extraction was carried out with toluene. An organic layer was washed with 5% hydrochloric acid and brine, successively, and then purified by column chromatography (silica gel, dichloromethane/hexane), activated carbon treatment and recrystallization (acetone/methanol), and thereby, 7.6 g of a compound represented by the formula (I-5-5) was obtained.

Under a nitrogen atmosphere, 7.6 g of the compound represented by the formula (I-5-5), 0.2 g of tri-t-butylphosphine, 0.5 g of bis(dibenzylideneacetone) palladium (0), and 76 mL of toluene were charged into a reaction vessel. 16 mL of lithium bis(trimethylsilyl) amide (26% tetrahydrofuran solution) was added dropwise at room temperature, and the mixture was heated and stirred at 70° C. for 15 hours. After cooling to room temperature, 10 mL of 10% hydrochloric acid was added dropwise. An organic layer was washed with a saturated aqueous sodium hydrogen carbonate solution, water and brine, successively, and purified by column chromatography (silica gel, toluene/ethyl acetate), and thereby, 5.2 g of a compound represented by the formula (I-5-6) was obtained.

Into a reaction vessel, 5.2 g of the compound represented by the formula (I-5-6) and 52 mL of dichloromethane were charged. With ice-cooling, 3.2 g of N-bromosuccinimide was added little by little, and the mixture was stirred at room temperature for 5 hours. The reaction solution was poured into water and subjected to liquid separation treatment. An organic layer was washed with brine and purified by column chromatography (silica gel, dichloromethane/ethyl acetate), and thereby, 5.1 g of a compound represented by the formula (I-5-7) was obtained.

Under a nitrogen atmosphere, 5.1 g of the compound represented by the formula (I-5-7), 0.2 g of copper (I) iodide, 0.2 g of 2-dicyclohexylphosphino-2',4',6'-triisopropylbiphenyl [XPhos], 0.2 g of palladium (II) acetate, 25 mL of diisopropylamine, and 50 mL of N,N-dimethylformamide were charged into a reaction vessel. A solution prepared by dissolving 2.1 g of the compound represented by the formula (I-5-8) in 4 mL of N,N-dimethylformamide was added dropwise with heating at 90° C., and the mixture was heated and stirred at 90° C. for 5 hours. The reaction solution was poured into water and extraction was carried out with dichloromethane. An organic layer was washed with water and brine, successively, and then purified by column chromatography (silica gel, dichloromethane/ethyl acetate) and activated charcoal treatment, and thereby, 4.2 g of a compound represented by the formula (I-5-9) was obtained.

Under a nitrogen atmosphere, 4.2 g of the compound represented by the formula (I-5-9) and 42 mL of dichloromethane were charged into a reaction vessel. At room temperature, 1.8 g of 1,1'-thiocarbonyldiimidazole was added, and the mixture was stirred for 5 hours. The reaction solution was poured into water and extraction was carried out with dichloromethane. An organic layer was washed with water and brine, successively, and then, purified by column chromatography (silica gel, dichloromethane/hexane) and recrystallization (dichloromethane/methanol), and thereby, 3.6 g of a compound represented by the formula (I-5) was obtained.

MS(EI): m/z=539

Extrapolated value of refractive index anisotropy $\Delta n=0.58$ (Example 6) Production of a Compound Represented by the Formula (I-6)

[Chemical formula 70]

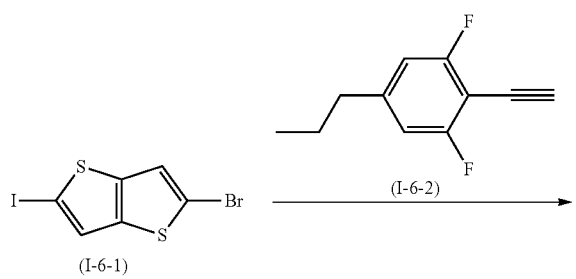

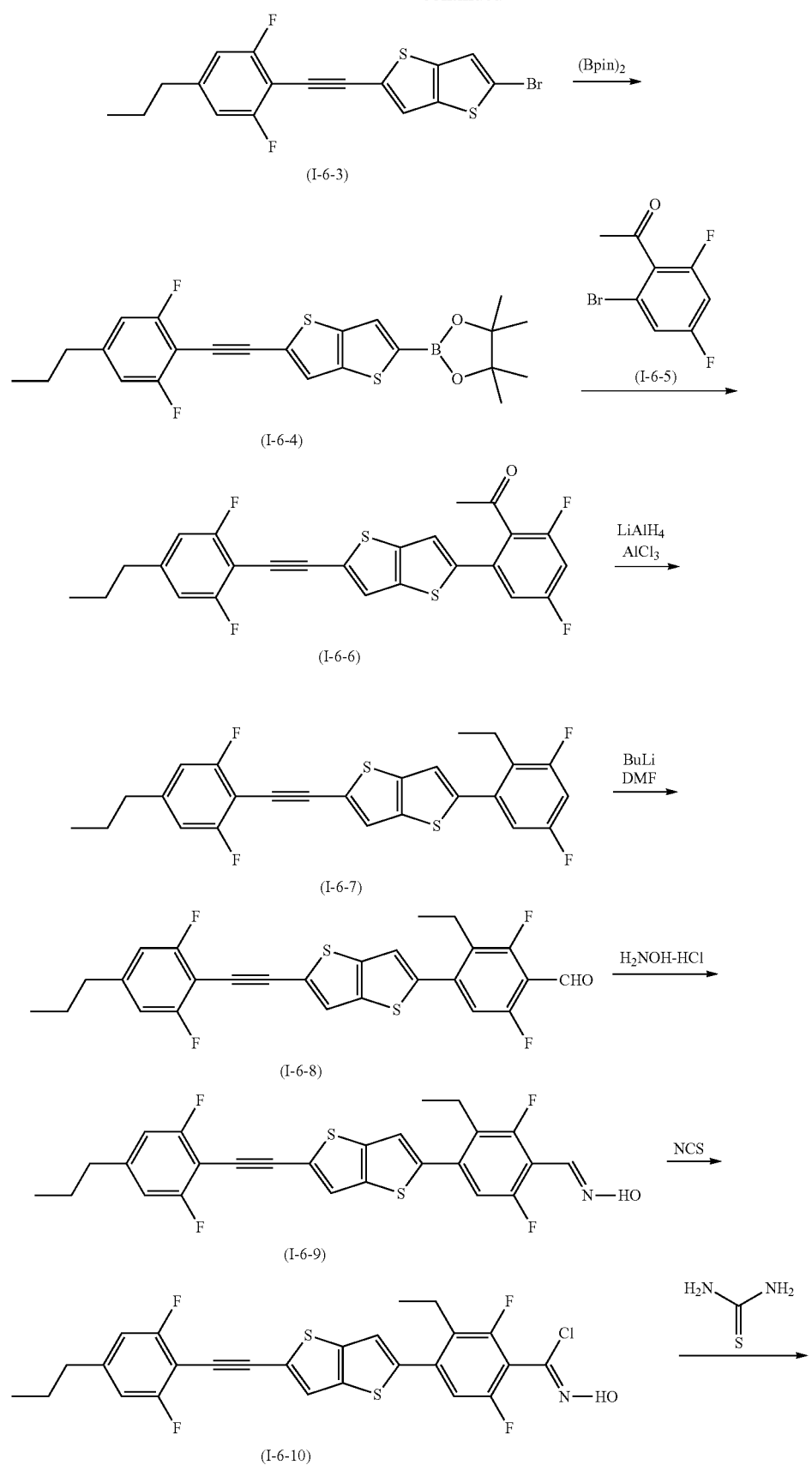

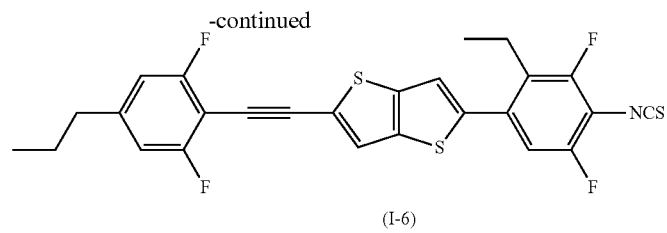

(I-6)

A compound represented by the formula (I-6-6) was produced by the same method as in Example 2 except that the compound represented by the formula (I-2-3) and the compound represented by the formula (I-2-6) were replaced with the compound represented by the formula (I-6-2) and the compound represented by the formula (I-6-5), respectively.

Under a nitrogen atmosphere, 4.5 g of lithium aluminum hydride and 45 mL of tetrahydrofuran were charged into a reaction vessel. With ice-cooling, 3.9 g of aluminum (I) chloride was added little by little. A solution prepared by dissolving 7.0 g of the compound represented by the formula (I-6-6) in 21 mL of tetrahydrofuran was added dropwise with ice-cooling, and the mixture was stirred at room temperature for 10 hours. With ice-cooling, 10% hydrochloric acid was added dropwise, and a precipitate was removed by filtration. Purification by column chromatography (silica gel, dichloromethane/hexane) and recrystallization (dichloromethane/methanol) was carried out, and thereby, 5.4 g of a compound represented by the formula (I-6-7) was obtained.

Under a nitrogen atmosphere, 5.4 g of the compound represented by the formula (I-6-7) and 54 mL of tetrahydrofuran were charged into a reaction vessel. At −70° C., 7.4 mL of a butyllithium/hexane solution (1.6 M) was added dropwise, and the mixture was stirred for 1 hour. At −70° C., 1.3 mL of N,N-dimethylformamide was added dropwise, and the mixture was stirred for 1 hour. 50 mL of 10% hydrochloric acid was added dropwise at 0° C., and the mixture was stirred at room temperature for 30 minutes. Toluene was added to the reaction solution for liquid separation treatment. An organic layer was washed with water and brine, successively, and then purified by column chromatography (silica gel, dichloromethane), and thereby, 4.6 g of a compound represented by the formula (I-6-8) was obtained.

A compound represented by the formula (I-6) was produced by the same method as in Example 1 except that the compound represented by the formula (I-1-9) was replaced with the compound represented by the formula (I-6-8).

MS(EI): m/z=515

Extrapolated value of refractive index anisotropy Δn=0.44

(Example 7) Production of a Compound Represented by the Formula (I-7)

[Chemical formula 71]

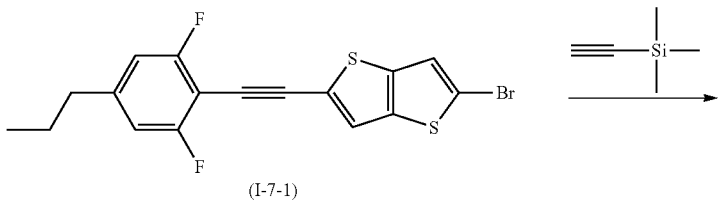

(I-7-1)

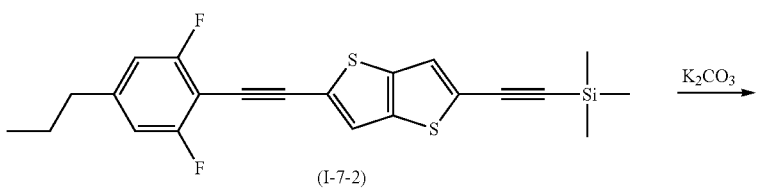

(I-7-2)

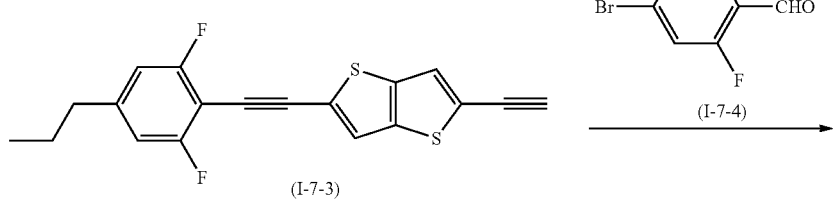

(I-7-3)

-continued
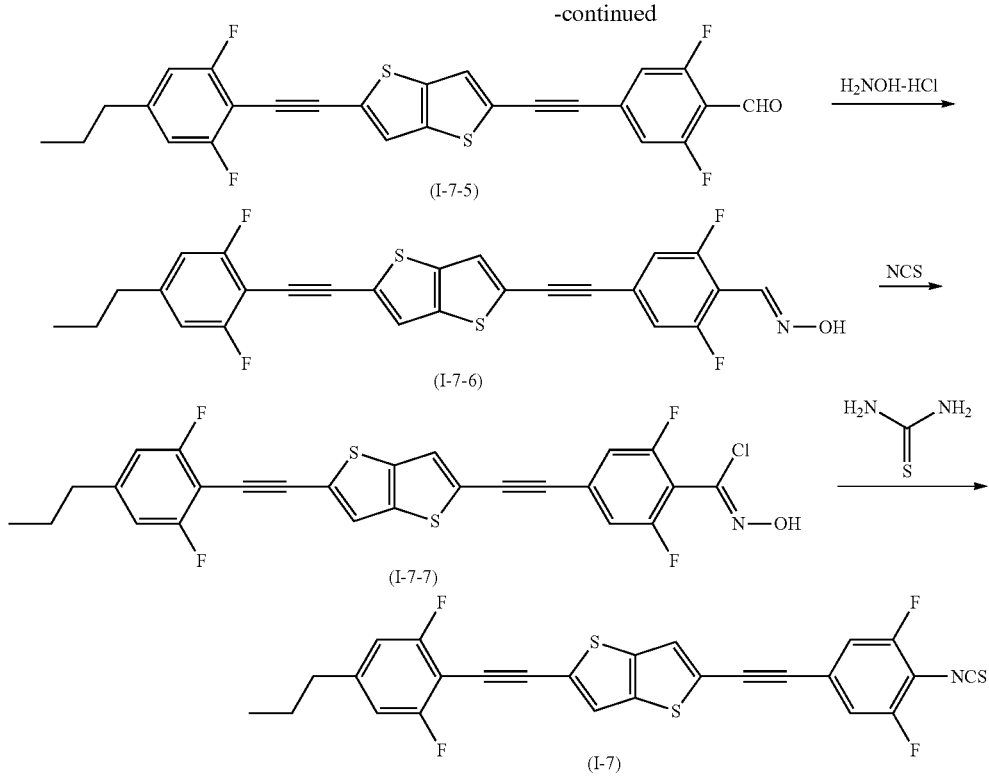
A compound represented by the formula (I-7) was produced by the same method as in Example 1 except that the compound represented by the formula (I-1-5) was replaced with the compound represented by the formula (I-7-1).
MS(EI): m/z=511
Extrapolated value of refractive index anisotropy Δn=0.56
(Example 8) Production of a Compound Represented by the Formula (I-8)
[Chemical formula 72]
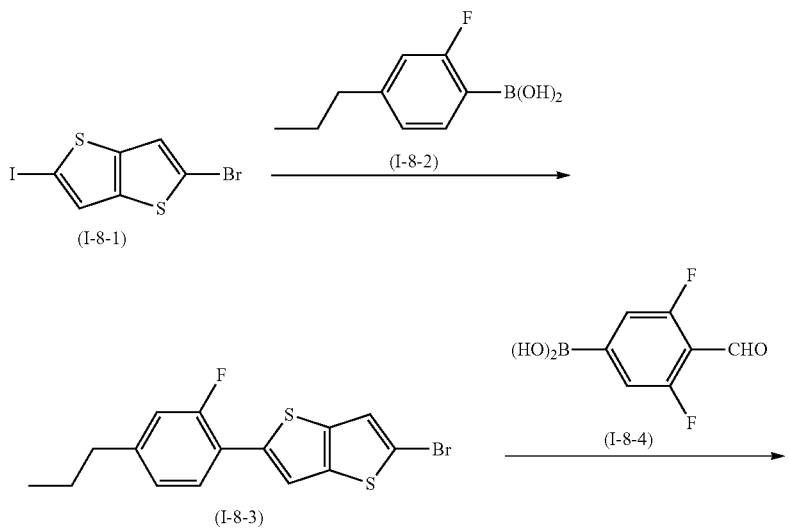

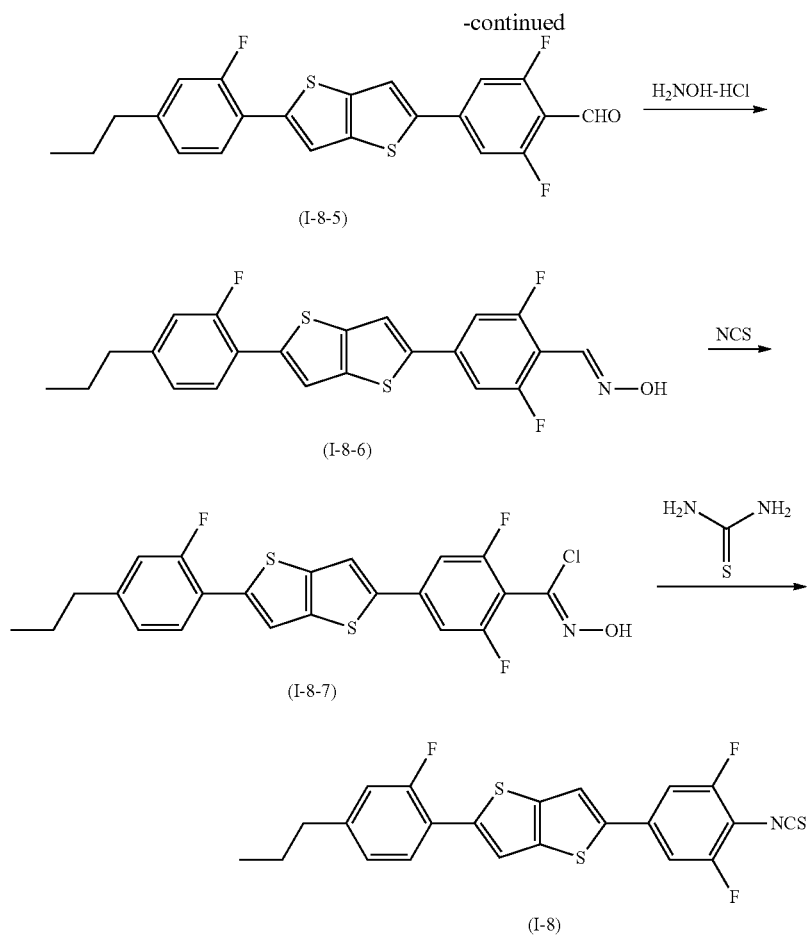

Under a nitrogen atmosphere, 7.0 g of a compound represented by the formula (I-8-1), 4.2 g of potassium carbonate, 4.1 g of a compound represented by the formula (I-8-2), 56 mL of toluene, 28 mL of ethanol, 28 mL of water, and 0.4 g of bis(triphenylphosphine)palladium(II) dichloride were charged into a reaction vessel, and the mixture was heated and refluxed for 6 hours. The reaction solution was poured into water and extraction was carried out with toluene. An organic layer was washed with water and brine, successively, and then, purified by column chromatography (silica gel, dichloromethane/hexane) and recrystallization (dichloromethane/methanol), and thereby, 5.0 g of a compound represented by the formula (I-8-3) was obtained.

Under a nitrogen atmosphere, 5.0 g of the compound represented by the formula (I-8-3), 2.9 g of potassium carbonate, 2.7 g of a compound represented by the formula (I-8-4), 40 mL of toluene, 20 mL of ethanol, 20 mL of water, and 0.3 g of bis(triphenylphosphine)palladium (II) dichloride were charged into a reaction vessel, and the mixture was heated and refluxed for 6 hours. The reaction solution was poured into water and extraction was carried out with toluene. An organic layer was washed with water and brine, successively, and then, purified by column chromatography (silica gel, toluene/hexane) and recrystallization (toluene/hexane), and thereby, 4.7 g of a compound represented by the formula (I-8-5) was obtained.

A compound represented by the formula (I-8) was produce by the same method as in Example 1 except that the compound represented by the formula (I-1-9) was replaced with the compound represented by the formula (I-8-5).

MS(EI): m/z=445

Extrapolated value of refractive index anisotropy Δn=0.43

(Example 9) Production of a Compound Represented by the Formula (I-9)

[Chemical formula 73]

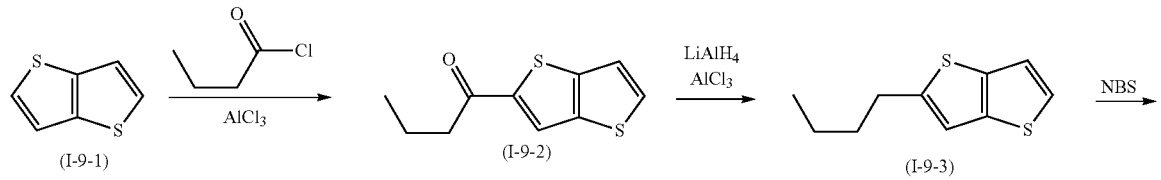

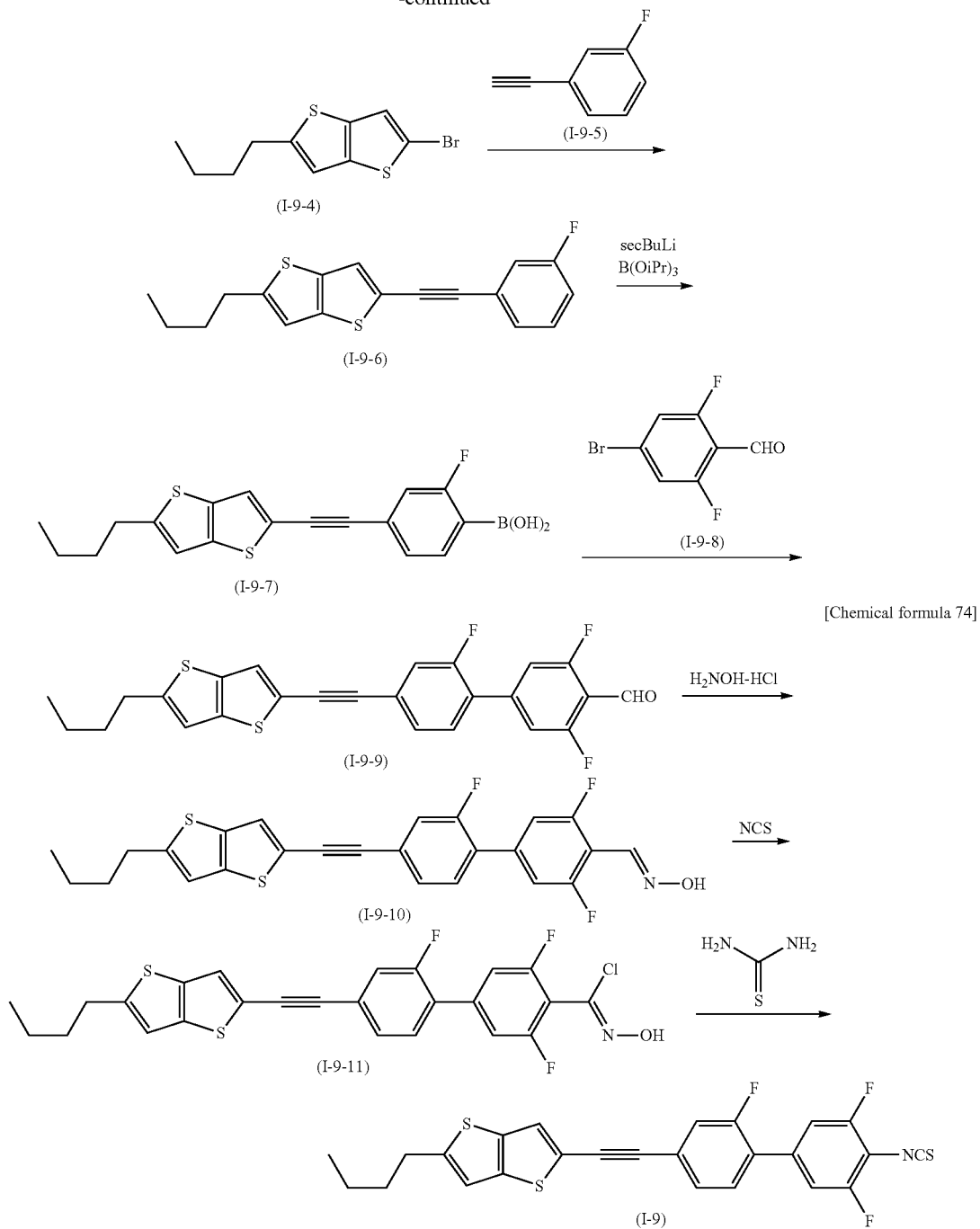

Under a nitrogen atmosphere, 12.6 g of aluminum (III) chloride and 38 mL of dichloromethane were charged into a reaction vessel. A solution prepared by dissolving 10.0 g of butyryl chloride in 10 mL of dichloromethane was added dropwise with ice-cooling, and the mixture was stirred at room temperature for 2 hours. A solution prepared by dissolving 12.0 g of a compound represented by the formula (I-9-1) in 48 mL of dichloromethane was added dropwise with ice-cooling, and the mixture was stirred at room temperature for 2 hours. The reaction solution was poured into ice water and subjected to liquid separation treatment. An organic layer was washed with brine and purified by column chromatography (silica gel, dichloromethane/hexane), and thereby, 10.0 g of a compound represented by the formula (I-9-2) was obtained.

Under a nitrogen atmosphere, 7.2 g of lithium aluminum hydride and 58 mL of tetrahydrofuran were charged into a reaction vessel. With ice-cooling, 12.7 g of aluminum (III) chloride was added little by little. A solution prepared by dissolving 10.0 g of the compound represented by the formula (I-9-2) in 30 mL of tetrahydrofuran was added dropwise with ice-cooling, and the mixture was stirred at room temperature for 5 hours. With ice-cooling, 10% hydrochloric acid was added dropwise, and a precipitate was removed by filtration. Purification was carried out by column chromatography (silica gel, dichloromethane/hexane), and thereby, 7.0 g of the compound represented by the formula (I-9-3) was obtained.

Into a reaction vessel, 7.0 g of the compound represented by the formula (I-9-3) and 70 mL of dichloromethane were charged. With ice-cooling, 7.6 g of N-bromosuccinimide was added little by little, and the mixture was stirred at room temperature for 5 hours. The reaction solution was poured into water and subjected to liquid separation treatment. An organic layer was washed with brine and purified by column chromatography (silica gel, dichloromethane/hexane), and thereby, 10.0 g of a compound represented by the formula (I-9-4) was obtained.

Under a nitrogen atmosphere, 7.0 g of the compound represented by the formula (I-9-4), 0.2 g of copper (I) iodide, 0.2 g of 2-dicyclohexylphosphino-2',4',6'-triisopropylbiphenyl [XPhos], 0.2 g of palladium (II) acetate, 70 mL of diisopropylamine, and 140 mL of N,N-dimethylformamide were charged into a reaction vessel. A solution prepared by dissolving 3.4 g of the compound represented by the formula (I-9-5) in 7 mL of N,N-dimethylformamide was added dropwise with heating at 90° C., and the mixture was heated and stirred at 90° C. for 5 hours. The reaction solution was poured into water and extraction was carried out with toluene. An organic layer was washed with 5% hydrochloric acid, water and brine, successively, and then purified by column chromatography (silica gel, toluene/hexane), activated carbon treatment and recrystallization (acetone/ethanol), and thereby, 5.6 g of a compound represented by the formula (I-9-6) was obtained.

Under a nitrogen atmosphere, 5.6 g of the compound represented by the formula (I-9-6) and 56 mL of tetrahydrofuran were charged into a reaction vessel. At −60° C., 20 mL of a sec-butyllithium/cyclohexane and hexane solution (1.0 mol/L) was added dropwise, and the mixture was stirred at −60° C. for 1 hour. At −60° C., 4.0 g of triisopropyl borate was added dropwise, and the temperature was raised to 0° C. With ice-cooling, 20 mL of 10% hydrochloric acid was added dropwise, and the mixture was stirred at room temperature for 1 hour. Water was added and extraction was carried out with ethyl acetate. An organic layer was washed with water and brine, successively, and then purified by column chromatography (alumina, ethyl acetate), and thereby, 5.1 g of a compound represented by the formula (I-9-7) was obtained.

Under a nitrogen atmosphere, 5.1 g of the compound represented by the formula (I-9-7), 3.1 g of a compound represented by the formula (I-9-8), 3.0 g of potassium carbonate, 0.2 g of dichlorobis[di-t-butyl(p-dimethylaminophenyl)phosphino]palladium (II), 40 mL of toluene, 20 mL of ethanol, and 20 mL of water were charged into a reaction vessel, and the mixture was heated and refluxed for 6 hours. The reaction solution was poured into water and extraction was carried out with toluene. An organic layer was washed with water and brine, successively, and then, purified by column chromatography (silica gel, toluene/hexane) and recrystallization (toluene/ethanol), and thereby, 5.2 g of a compound represented by the formula (I-9-9) was obtained.

A compound represented by the formula (I-9) was produced by the same method as in Example 1 except that the compound represented by the formula (I-1-9) was replaced with the compound represented by the formula (I-9-9).

MS(EI): m/z=483

Extrapolated value of refractive index anisotropy Δn=0.47

(Example 10) Production of a Compound Represented by the Formula (I-10)

[Chemical formula 75]

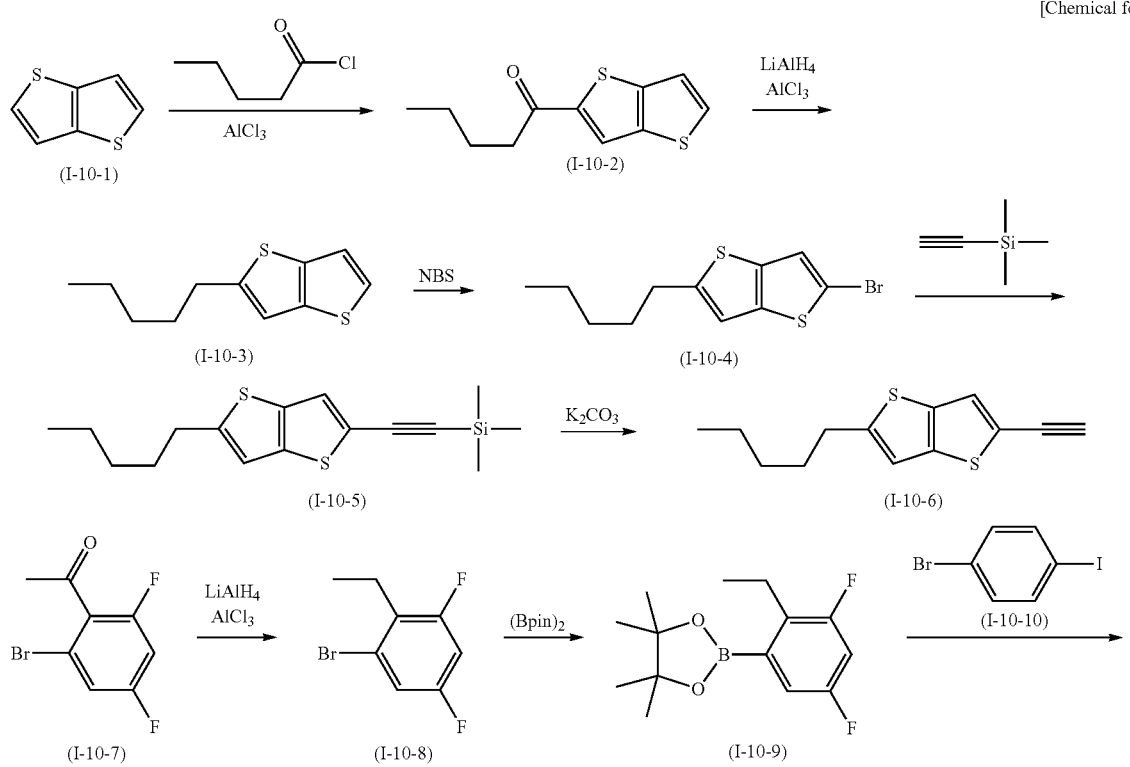

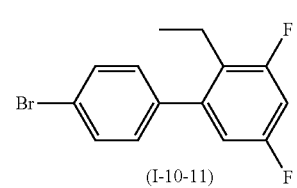
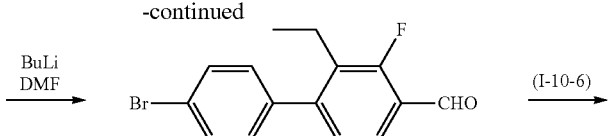
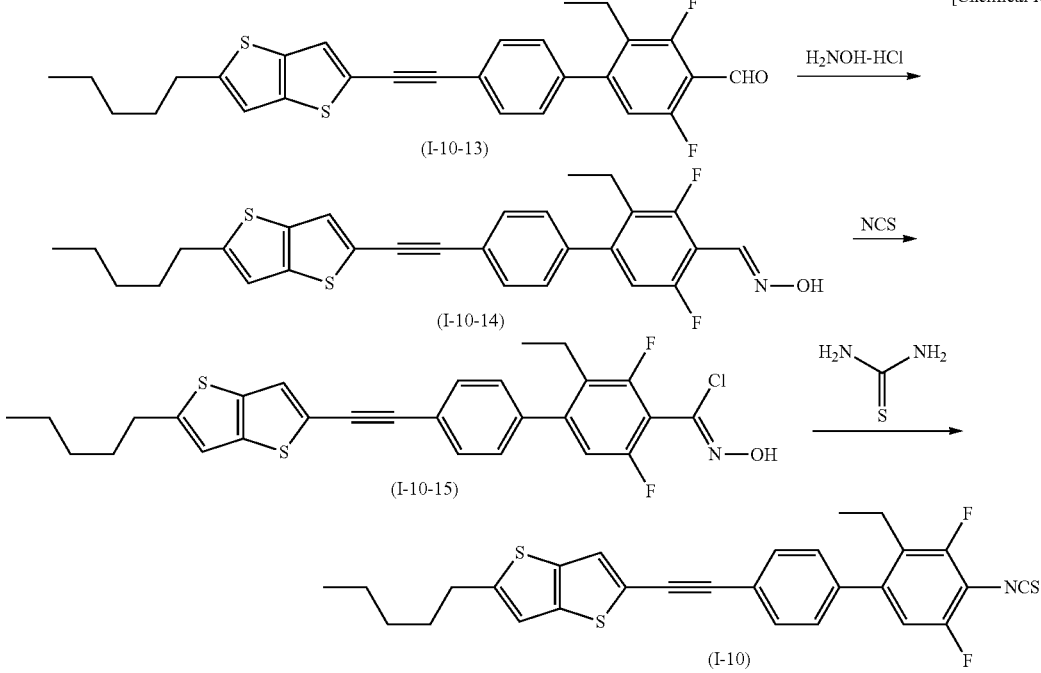

A compound represented by the formula (I-10-4) was produced by the same method as in Example 9 except that butyryl chloride was replaced with valeryl chloride.

A compound represented by the formula (I-10-6) was produced by the same method as in Example 1 except that the compound represented by the formula (I-1-5) was replaced with the compound represented by the formula (I-10-4).

Under a nitrogen atmosphere, 10.3 g of lithium aluminum hydride and 50 mL of tetrahydrofuran were charged into a reaction vessel. With ice-cooling, 9.1 g of aluminum (III) chloride was added little by little. A solution prepared by dissolving 8.0 g of a compound represented by the formula (I-10-7) in 24 mL of tetrahydrofuran was added dropwise with ice-cooling, and the mixture was stirred at room temperature for 5 hours. With ice-cooling, 10% hydrochloric acid was added dropwise, and a precipitate was removed by filtration. Purification was carried out by column chromatography (silica gel, toluene/hexane) and vacuum distillation, and thereby, 6.0 g of a compound represented by the formula (I-10-8) was obtained.

Under a nitrogen atmosphere, 6.0 g of the compound represented by the formula (I-10-8), 8.0 g of potassium acetate, 10.4 g of bis(pinacolato)diboron, 90 mL of dimethyl sulfoxide, and 0.4 g of [1,1'-bis(diphenylphosphino)ferrocene]palladium (II) dichloride dichloromethane adduct were charged into a reaction vessel, and the mixture was heated and stirred at 80° C. for 6 hours. The reaction solution was poured into water and extraction was carried out with toluene. An organic layer was washed with water and brine, successively, and then purified by column chromatography (alumina, dichloromethane), and thereby, 5.8 g of a compound represented by the formula (I-10-9) was obtained.

Under a nitrogen atmosphere, 5.8 g of the compound represented by the formula (I-10-9), 6.2 g of the compound represented by the formula (I-10-10), 4.5 g of potassium carbonate, and 0.2 g of dichlorobis[di-t-butyl(p-dimethylaminophenyl)phosphino]palladium (II), 58 mL of toluene, 29 mL of ethanol, and 29 mL of water were charged into a reaction vessel, and the mixture was heated and refluxed for 6 hours. The reaction solution was poured into water and extraction was carried out with toluene. An organic layer was washed with water and brine, successively, and then purified by column chromatography (silica gel, toluene/hexane), and thereby, 5.2 g of a compound represented by the formula (I-10-11) was obtained.

Under a nitrogen atmosphere, 5.2 g of the compound represented by the formula (I-10-11) and 52 mL of tetrahydrofuran were charged into a reaction vessel. At −70° C., 16.3 mL of a butyllithium/hexane solution (1.6 M) was added dropwise, and the mixture was stirred for 1 hour. At −70° C., 2.0 mL of N,N-dimethylformamide was added dropwise, and the mixture was stirred for 1 hour. 50 mL of 10% hydrochloric acid was added dropwise at 0° C., and the mixture was stirred at room temperature for 30 minutes. Toluene was added to the reaction solution for liquid separation treatment. An organic layer was washed with water and brine, successively, and then purified by column chromatography (silica gel, toluene/hexane), and thereby, 4.5 g of a compound represented by the formula (I-10-12) was obtained.

Under a nitrogen atmosphere, 4.5 g of the compound represented by the formula (I-10-12), 0.2 g of copper (I) iodide, 0.2 g of 2-dicyclohexylphosphino-2',4',6'-triisopropylbiphenyl [XPhos], 0.2 g of palladium (II) acetate, 25 mL of diisopropylamine, and 50 mL of N,N-dimethylformamide were charged into a reaction vessel. A solution prepared by dissolving 3.3 g of the compound represented by the formula (I-10-6) in 10 mL of N,N-dimethylformamide was added dropwise with heating at 90° C., and the mixture was heated and stirred at 90° C. for 5 hours. The reaction solution was poured into water and extraction was carried out with toluene. An organic layer was washed with 5% hydrochloric acid, water and brine, successively, and purified by column chromatography (silica gel, toluene/hexane) and activated charcoal treatment, and thereby, 5.3 g of a compound represented by the formula (I-10-13) was obtained.

A compound represented by the formula (I-10) was produced by the same method as in Example 1 except that the compound represented by the formula (I-1-9) was replaced with the compound represented by the formula (I-10-13).

MS(EI): m/z=507

Extrapolated value of refractive index anisotropy $\Delta n = 0.44$ (Example 11) Production of a Compound Represented by the Formula (I-11)

[Chemical formula 77]

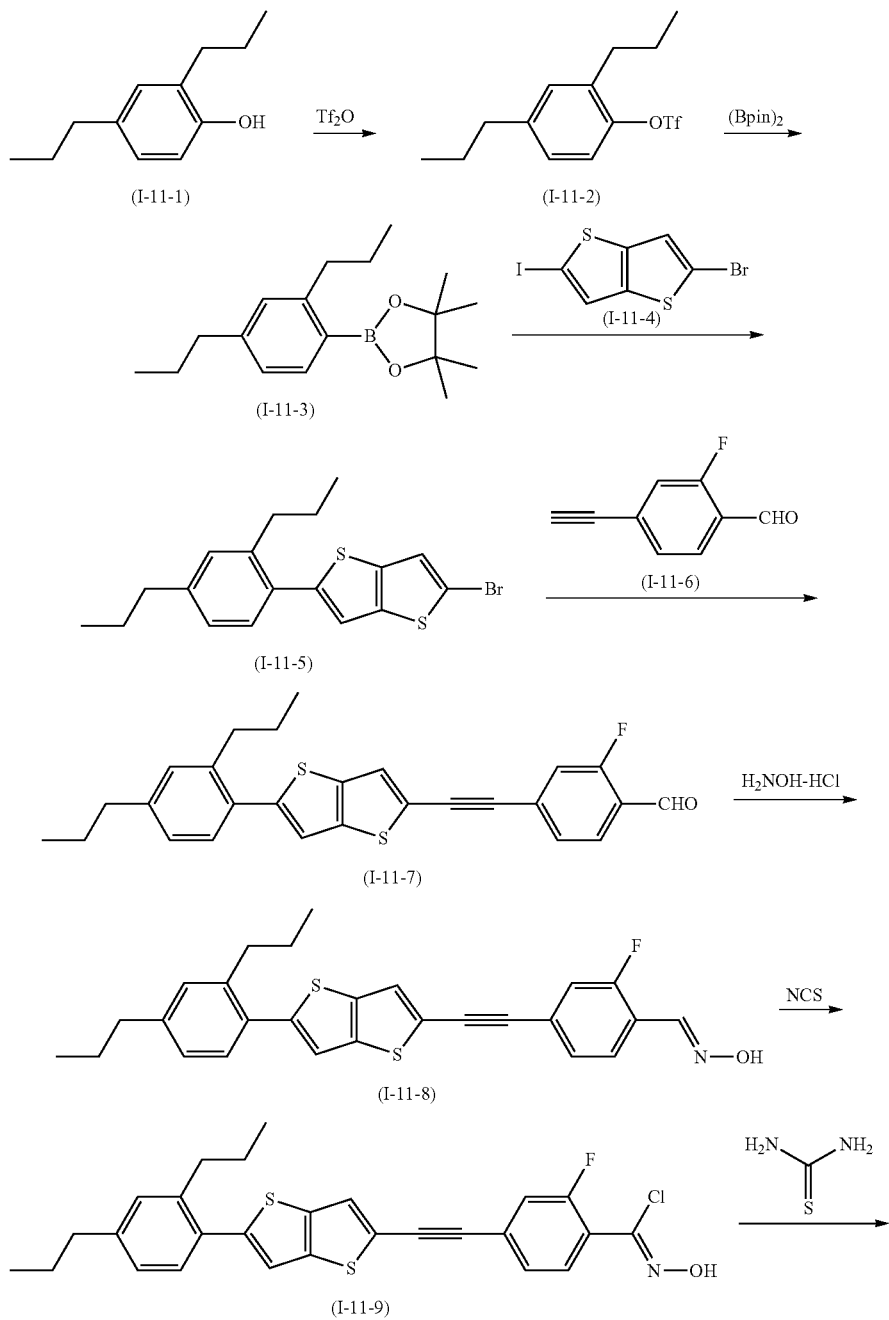

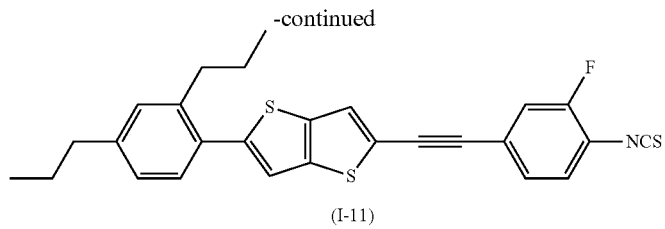

(I-11)

Under a nitrogen atmosphere, 7.0 g of the compound represented by the formula (I-11-1), 6.2 g of pyridine, and 70 mL of dichloromethane were charged into a reaction vessel. With ice-cooling, 12.2 g of trifluoromethanesulfonic anhydride was added dropwise, and the mixture was stirred at room temperature for 4 hours. The reaction solution was poured into a 5% aqueous sodium hydrogen carbonate solution and subjected to liquid separation treatment. An organic layer was washed with 5% hydrochloric acid, water and brine, successively, and then purified by column chromatography (silica gel, dichloromethane/hexane), and thereby, 11.0 g of a compound represented by the formula (I-11-2) was obtained.

Under a nitrogen atmosphere, 11.0 g of the compound represented by the formula (I-11-2), 10.4 g of potassium acetate, 10.8 g of bis(pinacolato)diboron, 110 mL of dimethyl sulfoxide, 0.4 g of [1,1'-bis(diphenylphosphino)ferrocene]palladium (II) dichloride dichloromethane adduct were charged into a reaction vessel, and the mixture was heated and stirred at 80° C. for 6 hours. The reaction solution was poured into water and extraction was carried out with toluene. An organic layer was washed with water and brine, successively, and then purified by column chromatography (alumina, toluene), and thereby, 9.2 g of a compound represented by the formula (I-11-3) was obtained.

Under a nitrogen atmosphere, 9.2 g of the compound represented by the formula (I-11-3), 6.6 g of potassium carbonate, 11.0 g of a compound represented by the formula (I-11-4), 110 mL of toluene, 55 mL of ethanol, 55 mL of water, and 0.4 g of bis(triphenylphosphine)palladium (II) dichloride were charged into a reaction vessel, and the mixture was heated and refluxed for 6 hours. The reaction solution was poured into water and extraction was carried out with toluene. An organic layer was washed with water and brine, successively, and then purified by column chromatography (silica gel, toluene/hexane), and thereby, 9.6 g of a compound represented by the formula (I-11-5) was obtained.

Under a nitrogen atmosphere, 9.6 g of the compound represented by the formula (I-11-5), 0.2 g of copper (I) iodide, 0.2 g of 2-dicyclohexylphosphino-2',4',6'-triisopropylbiphenyl [XPhos], 0.2 g of palladium (II) acetate, 70 mL of diisopropylamine, and 140 mL of N,N-dimethylformamide were charged into a reaction vessel. A solution prepared by dissolving 3.8 g of a compound represented by the formula (I-11-6) in 8 mL of N,N-dimethylformamide was added dropwise with heating at 90° C., and the mixture was heated and stirred at 90° C. for 5 hours. The reaction solution was poured into water and extraction was carried out with toluene. An organic layer was washed with 5% hydrochloric acid, water and brine, successively, and then purified by column chromatography (silica gel, toluene/hexane), activated carbon treatment and recrystallization (acetone/ethanol), and thereby, 9.1 g of a compound represented by (I-11-7) was obtained.

A compound represented by the formula (I-11) was produced by the same method as in Example 1 except that the compound represented by the formula (I-1-9) was replaced with the compound represented by the formula (I-11-7).

MS(EI): m/z=475

Extrapolated value of refractive index anisotropy Δn=0.42

(Example 12) Production of a Compound Represented by the Formula (I-12)

[Chemical formula 78]

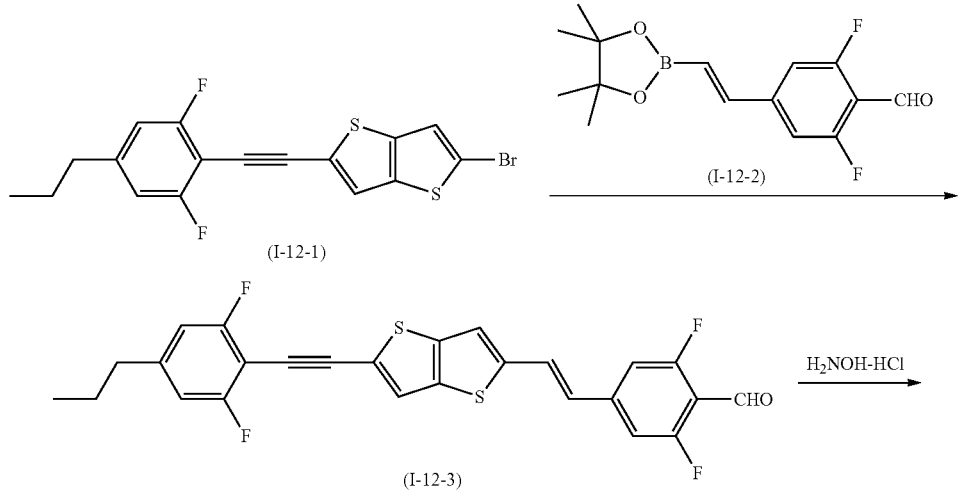

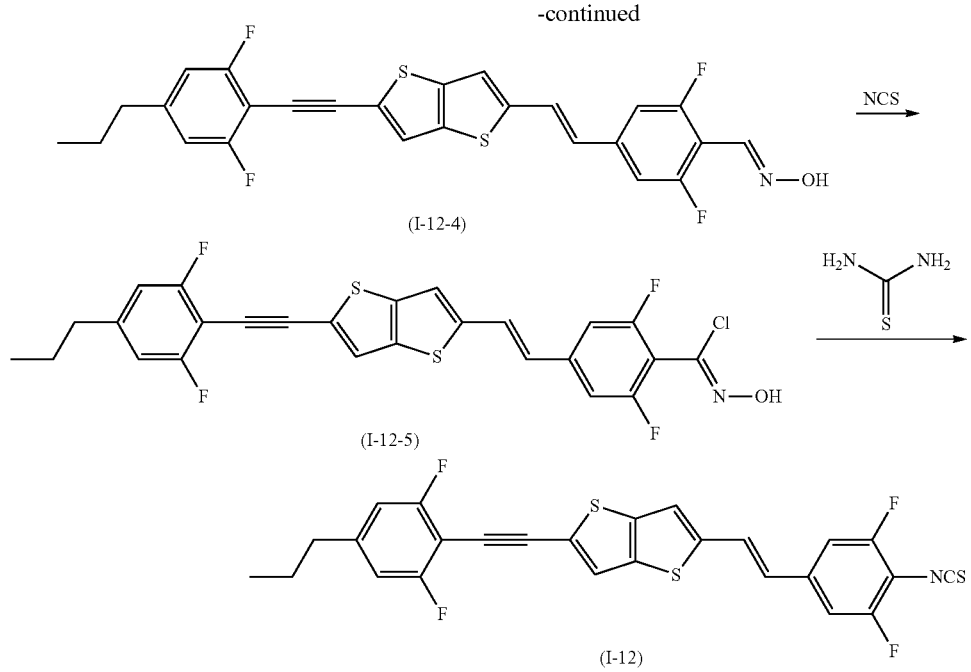

A compound represented by the formula (I-12-2) was produced by the method described in WO2010/115279A1. Under a nitrogen atmosphere, 7.0 g of the compound represented by the formula (I-12-1), 6.2 g of a compound represented by the formula (I-12-2), 3.6 g of potassium carbonate, 0.4 g of dichlorobis[di-t-butyl(p-dimethylaminophenyl)phosphino]palladium (II), 70 mL of toluene, 35 mL of ethanol, and 35 mL of water were charged into a reaction vessel, and the mixture was heated and refluxed for 6 hours. The reaction solution was poured into water and extraction was carried out with toluene. An organic layer was washed with water and brine, successively, and then, purified by column chromatography (silica gel, toluene/hexane) and recrystallization (toluene/ethanol), and thereby, 6.8 g of a compound represented by the formula (I-12-3) was obtained.

A compound represented by the formula (I-12) was produced by the same method as in Example 1 except that the compound represented by the formula (I-1-9) was replaced with the compound represented by the formula (I-12-3).

MS(EI): m/z=513

Extrapolated value of refractive index anisotropy Δn=0.52

(Example 13) Production of a Compound Represented by the Formula (I-13)

[Chemical formula 79]

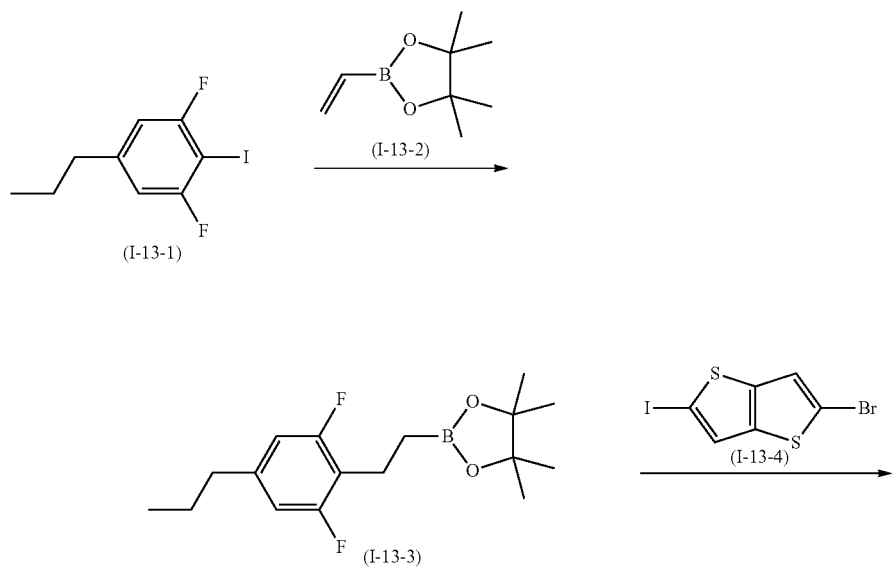

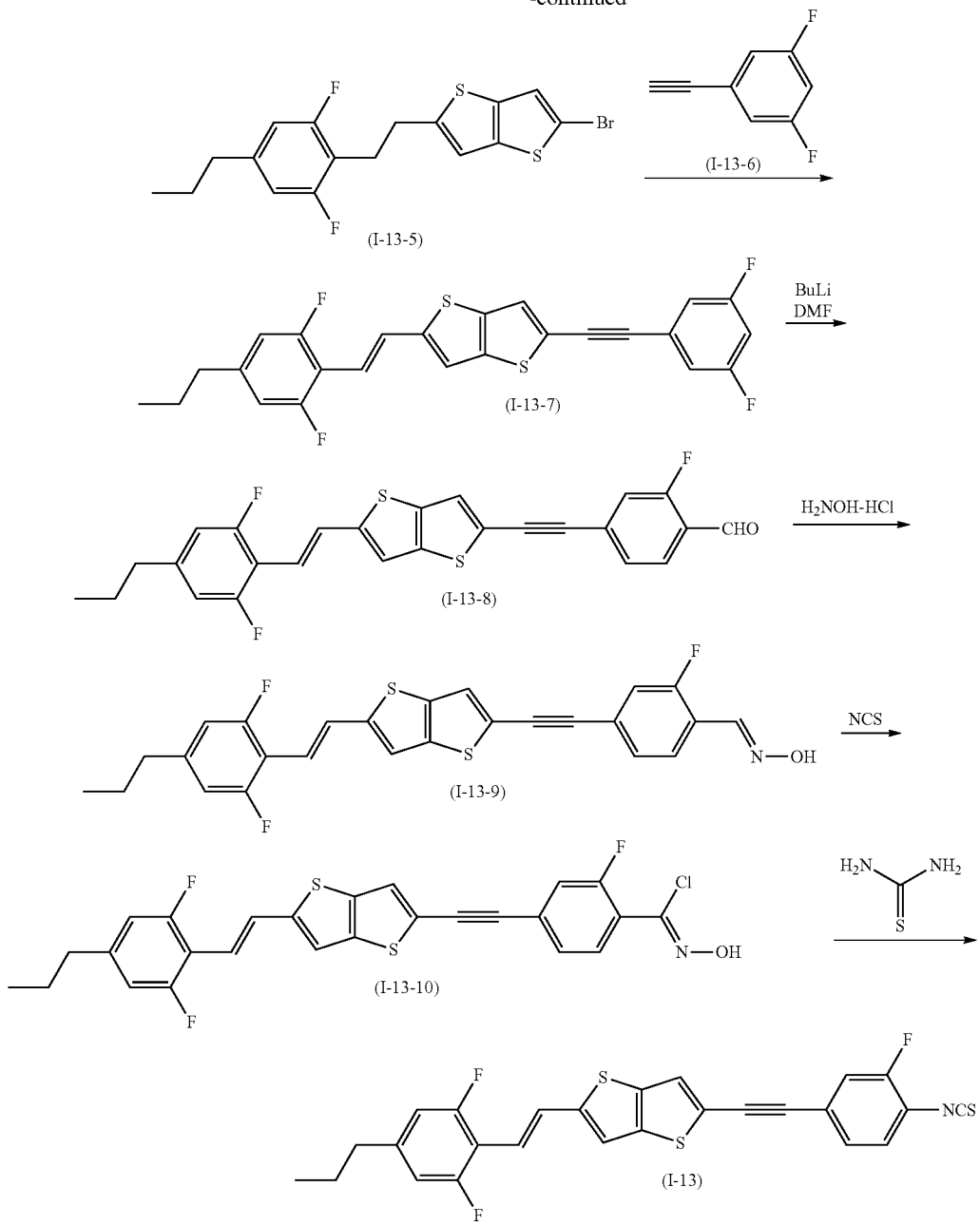

Under a nitrogen atmosphere, 7.0 g of a compound represented by the formula (I-13-1), 4.2 g of a compound represented by the formula (I-13-2), 5.1 g of potassium carbonate, 70 mL of N,N-dimethylacetamide, and 0.1 g of palladium (II) acetate were charged into a reaction vessel, and the mixture was heated and stirred at 120° C. for 5 hours. The reaction solution was poured into water and extraction was carried out with toluene. An organic layer was washed with water and brine, successively, and then purified by column chromatography (silica gel, toluene/hexane), and thereby, 6.1 g of a compound represented by the formula (I-13-3) was obtained.

Under a nitrogen atmosphere, 6.1 g of the compound represented by the formula (I-13-3), 4.2 g of potassium carbonate, 6.8 g of a compound represented by the formula (I-13-4), 68 mL of toluene, 34 mL of ethanol, 34 mL of water, and 0.4 g of bis(triphenylphosphine)palladium (II) dichloride were charged into a reaction vessel, and the mixture was heated and refluxed for 6 hours. The reaction solution was poured into water and extraction was carried out with toluene. An organic layer was washed with water and brine, successively, and then purified by column chromatography (silica gel, toluene/heptane) and recrystallization (toluene/ethanol), and thereby, 6.3 g of a compound represented by the formula (I-13-5) was obtained.

A compound represented by the formula (I-13) was produced by the same manner as in Example 6 except that the compound represented by the formula (I-6-7) was replaced with the compound represented by the formula (I-13-7).

MS(EI): m/z=513

Extrapolated value of refractive index anisotropy
Δn=0.53
(Example 14) Production of a Compound Represented by the Formula (I-14)
[Chemical formula 80]
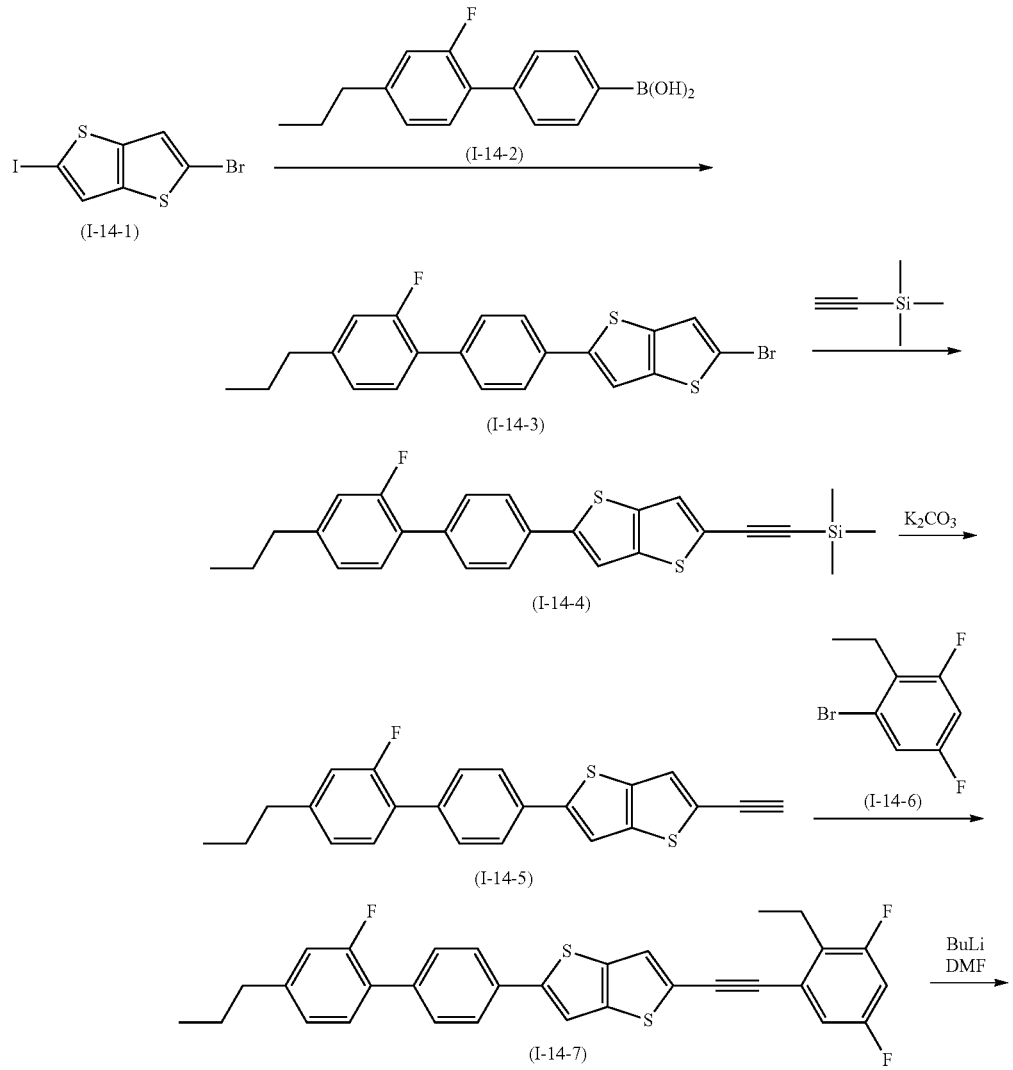
[Chemical formula 81]
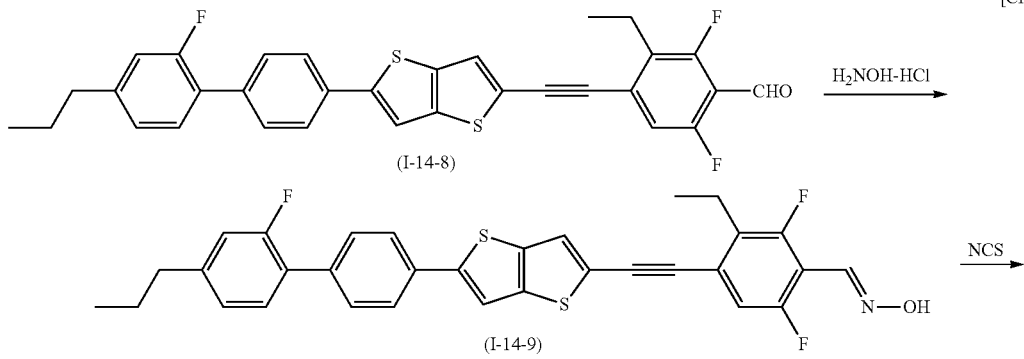

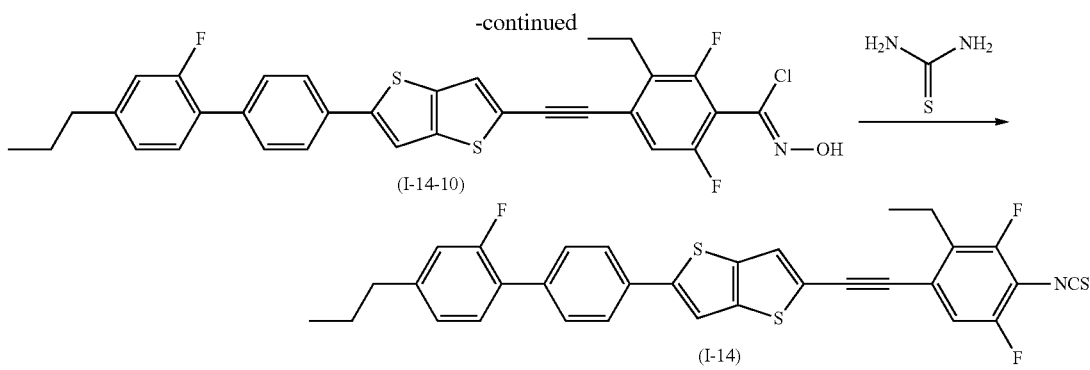

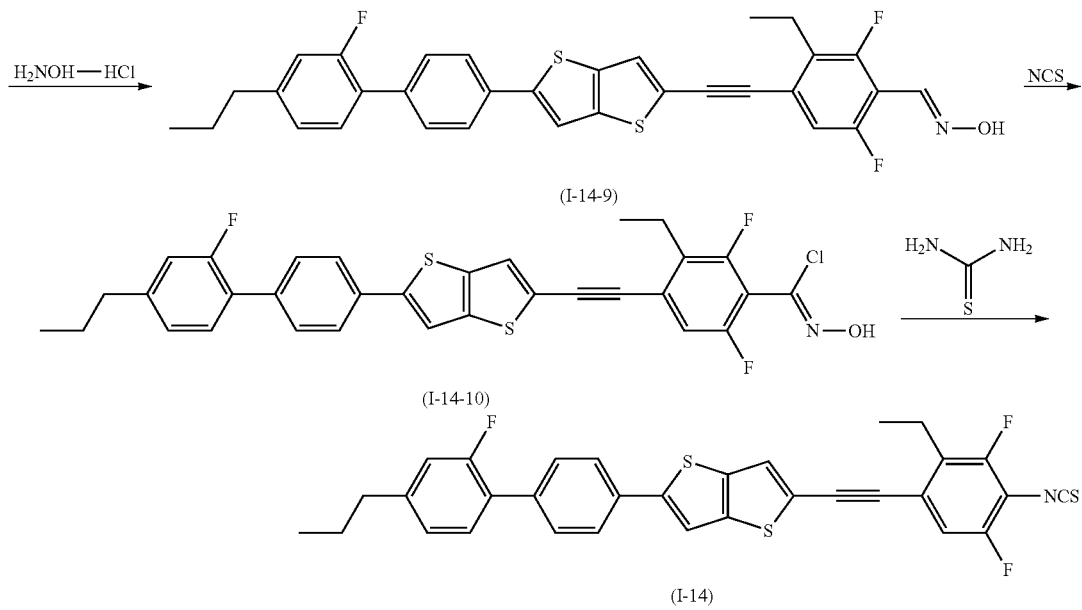

Under a nitrogen atmosphere, 7.0 g of a compound represented by the formula (I-14-1) and 4.2 g of potassium carbonate, 5.2 g of a compound represented by the formula (I-14-2), 56 mL of toluene, 28 mL of ethanol, 28 mL of water, and 0.2 g of bis(triphenylphosphine)palladium (II) dichloride were charged into a reaction vessel, and the mixture was heated and refluxed for 6 hours. The reaction solution was poured into water and extraction was carried out with toluene. An organic layer was washed with water and brine, successively, and then purified by column chromatography (silica gel, toluene/hexane) and recrystallization (toluene/ethanol), and thereby, 7.0 g of a compound represented by the formula (I-14-3) was obtained.

Under a nitrogen atmosphere, 7.0 g of the compound represented by the formula (I-14-3), 0.1 g of copper (I) iodide, 0.1 g of 2-dicyclohexylphosphino-2',4',6'-triisopropylbiphenyl [XPhos], 0.1 g of palladium (II) acetate, 37 mL of diisopropylamine, and 74 mL of N,N-dimethylformamide were charged into a reaction vessel. A solution prepared by dissolving 2.4 g of trimethylsilylacetylene in 7 mL of N,N-dimethylformamide was added dropwise with heating at 90° C., and the mixture was heated and stirred at 90° C. for 5 hours. The reaction solution was poured into water and extraction was carried out with toluene. An organic layer was washed with water and brine, successively, and then purified by column chromatography (silica gel, toluene/hexane) and activated charcoal treatment, and thereby, 5.8 g of a compound represented by the formula (I-14-4) was obtained.

In a reaction vessel, 5.8 g of the compound represented by the formula (I-14-4), 106 mL of methanol and 5.8 g of potassium carbonate were charged, and the mixture was stirred at room temperature for 8 hours. Water was added to the reaction solution, and extraction was carried out with toluene. An organic layer was washed with water and brine, successively, and then purified by column chromatography (silica gel, toluene/hexane), and thereby, 4.4 g of a compound represented by the formula (I-14-5) was obtained.

Under a nitrogen atmosphere, 4.4 g of the compound represented by the formula (I-14-5), 0.2 g of copper (I) iodide, 0.2 g of 2-dicyclohexylphosphino-2',4',6'-triisopropylbiphenyl [XPhos], 0.2 g of palladium (II) acetate, 25 mL of diisopropylamine, and 50 mL of N,N-dimethylformamide were charged into a reaction vessel. A solution prepared by dissolving 2.6 g of a compound represented by the formula (I-14-6) in 10 mL of N,N-dimethylformamide was added dropwise with heating at 90° C., and the mixture was heated and stirred at 90° C. for 5 hours. The reaction solution was poured into water and extraction was carried out with toluene. An organic layer was washed with 5% hydrochloric acid, water and brine, successively, and then purified by column chromatography (silica gel, toluene/hexane), activated carbon treatment and recrystallization (toluene/ethanol), and thereby, 4.8 g of a compound represented by the formula (I-14-7) was obtained.

A compound represented by the formula (I-14) was produced by the same method as in Example 6 except that the compound represented by the formula (I-6-7) was replaced with the compound represented by the formula (I-14-7).

MS(EI): m/z=573

Extrapolated value of refractive index anisotropy Δn=0.46

(Example 15) Production of a Compound Represented by the Formula (I-15)

[Chemical formula 82]

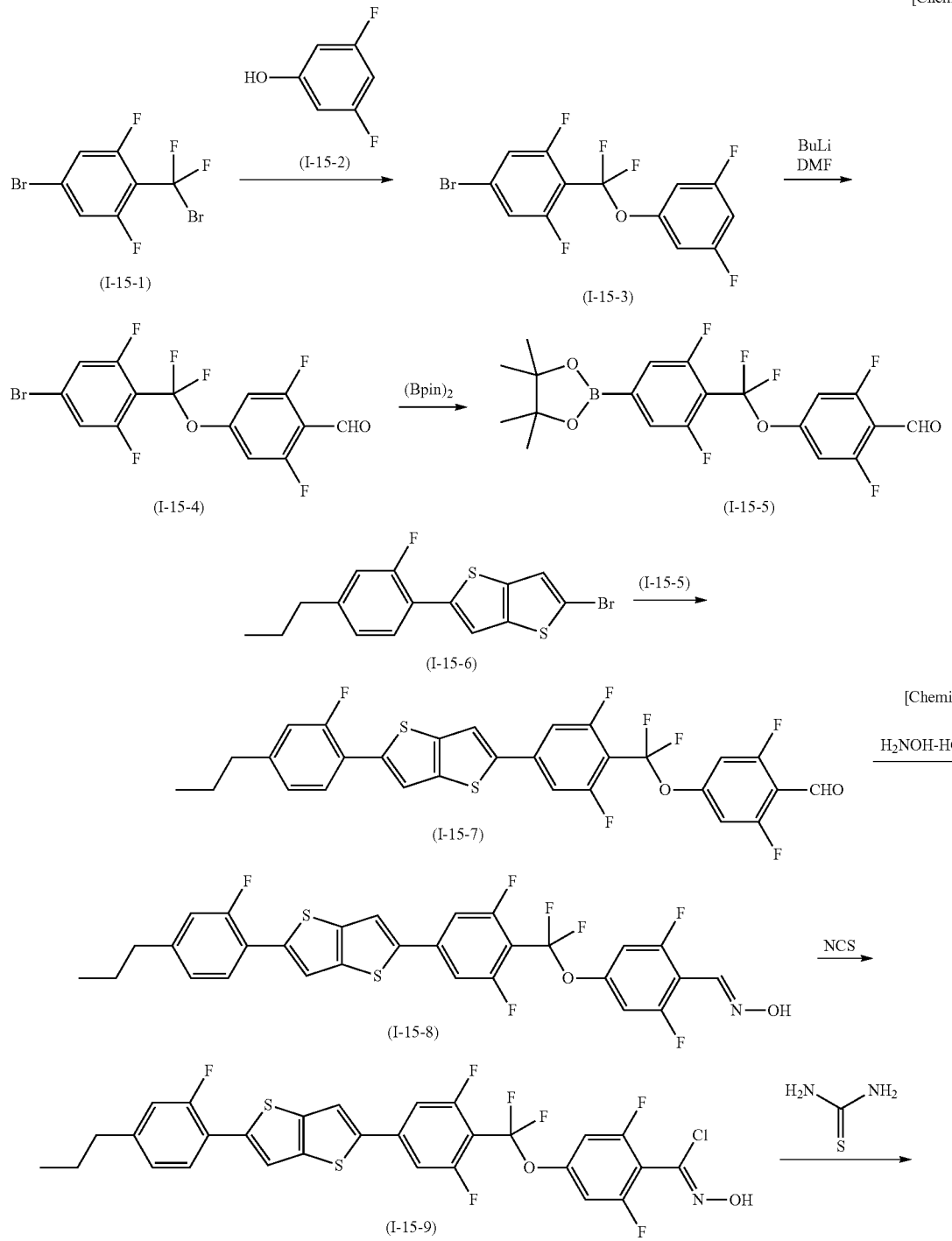

[Chemical formula 83]

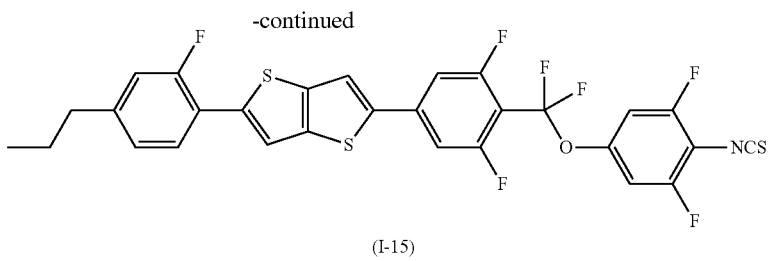

(I-15)

A compound represented by the formula (I-15-1) was produced by the method described in JP-A-2016-185913. Into a reaction vessel, 10.0 g of the compound represented by the formula (I-15-1), 4.0 g of a compound represented by the formula (I-15-2), 6.4 g of potassium carbonate, 0.5 g of tetrabutylammonium bromide, and 150 mL of N,N-dimethylformamide were charged, and the mixture was heated and stirred at 110° C. for 1 hour. After cooling to room temperature, water was added to the reaction solution, and extraction was carried out with toluene. An organic layer was washed with water and brine, successively, and then purified by column chromatography (silica gel, toluene/hexane), and thereby, 9.2 g of a compound represented by the formula (I-15-3) was obtained.

Under a nitrogen atmosphere, 9.2 g of the compound represented by the formula (I-15-3) and 92 mL of tetrahydrofuran were charged into a reaction vessel. At −70° C., 20.2 mL of a butyllithium/hexane solution (1.6 M) was added dropwise, and the mixture was stirred for 1 hour. At −70° C., 3.5 mL of N,N-dimethylformamide was added dropwise, and the mixture was stirred for 1 hour. 50 mL of 10% hydrochloric acid was added dropwise at 0° C., and the mixture was stirred at room temperature for 30 minutes. Toluene was added to the reaction solution for liquid separation treatment. An organic layer was washed with water and brine, successively, and then purified by column chromatography (silica gel, toluene/hexane), and thereby, 7.9 g of a compound represented by the formula (I-15-4) was obtained.

Under a nitrogen atmosphere, 7.9 g of the compound represented by the formula (I-15-4), 5.8 g of potassium acetate, 7.5 g of bis(pinacolato)diboron, 160 mL of dimethyl sulfoxide, and 0.3 g of [1,1'-bis(diphenylphosphino)ferrocene]palladium (II) dichloride dichloromethane adduct were charged into a reaction vessel, and the mixture was heated and stirred at 80° C. for 6 hours. The reaction solution was poured into water and extraction was carried out with toluene. An organic layer was washed with water and brine, successively, and then purified by column chromatography (alumina, toluene), and thereby, 7.1 g of a compound represented by the formula (I-15-5) was obtained.

Under a nitrogen atmosphere, 5.6 g of a compound represented by the formula (I-15-6) and 3.3 g of potassium carbonate, 7.1 g of the compound represented by the formula (I-15-5), 112 mL of toluene, 56 mL of ethanol, 56 mL of water, and 0.3 g of bis(triphenylphosphine)palladium (II) dichloride were charged into a reaction vessel, and the mixture was heated and refluxed for 6 hours. The reaction solution was poured into water and extraction was carried out with toluene. An organic layer was washed with water and brine, successively, and then purified by column chromatography (silica gel, toluene/hexane) and recrystallization (toluene/hexane), and thereby, 7.6 g of a compound represented by the formula (I-15-7) was obtained.

A compound represented by the formula (I-15) was produced by the same method as in Example 1 except that the compound represented by the formula (I-1-9) was replaced with the compound represented by the formula (I-15-7).

MS(EI): m/z=623

Extrapolated value of refractive index anisotropy Δn=0.38

Examples 16 to 45 and Comparative Examples 1 to 8

The following abbreviations are used to describe the liquid crystal compounds in the examples.

(Ring Structure)

[Chemical formula 84]

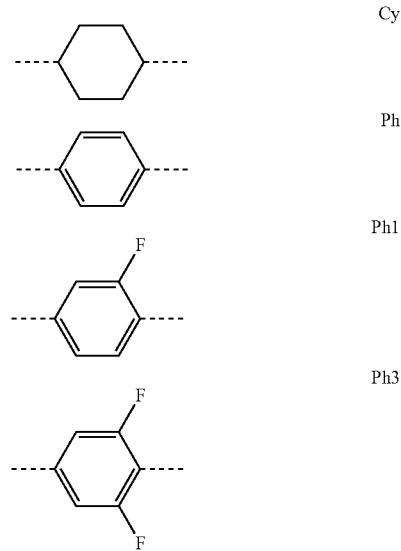

| (Side chain structure) | |
|---|---|
| 2- | $CH_3CH_2$— |
| 3- | $CH_3(CH_2)_2$— |
| 4- | $CH_3(CH_2)_3$— |
| 5- | $CH_3(CH_2)_4$— |
| -2 | —$CH_2CH_3$ |
| -3 | —$(CH_2)_2CH_3$ |
| -4 | —$(CH_2)_3CH_3$ |
| -5 | —$(CH_2)_4CH_3$ |
| —Cl | —Cl |

| (Linking group) | |
|---|---|
| — | Single bond |
| —T— | —C≡C— |

A base liquid crystal N composed of the following compounds was prepared.
(Base Liquid Crystal N)

| | | | |
|---|---|---|---|
| 2-Ph3 | T | PhPh-3 | 20.0% |
| 4-Ph3 | T | PhPh-3 | 36.0% |
| 3-Ph1Ph1Ph | Cl | | 10.0% |
| 5-Ph1Ph1Ph | Cl | | 20.0% |
| 5-Cy | | PhPh1Ph-2 | 7.0% |
| 5-CyPhPh1Ph-3 | | | 7.0% |

Compounds represented by formulas (I-1) to (I-15) described in Examples 1 to 15 were added to the base liquid crystal N to prepare the liquid crystal compositions (M-1) to (M-15) for evaluation. In addition, the compound represented by the formula (R-1) described in Non-Patent Literature 1, the compound represented by the formula (R-2) described in Patent Literature 1, and the compounds represented by the formulas (R-3) and (R-4) described in Patent Literature 2 were added to prepare liquid crystal compositions (RM-1) to (RM-4) for comparison.

[Chemical formula 85]

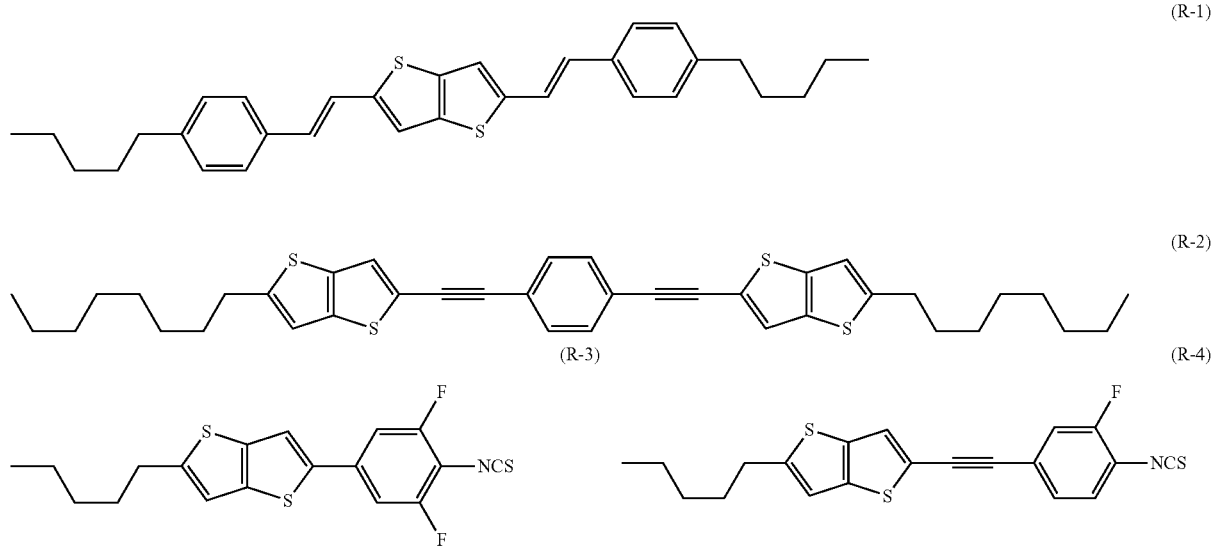

(R-1)

(R-2)

(R-3)

(R-4)

| (Liquid crystal composition (M-1)) | |
|---|---|
| Base liquid crystal N | 90.0% |
| Compound represented by formula (I-1) | 10.0% |
| (Liquid crystal composition (M-2)) | |
| Base liquid crystal N | 90.0% |
| Compound represented by formula (I-2) | 10.0% |
| (Liquid crystal composition (M-3)) | |
| Base liquid crystal N | 90.0% |
| Compound represented by formula (I-3) | 10.0% |
| (Liquid crystal composition (M-4)) | |
| Base liquid crystal N | 90.0% |
| Compound represented by formula (I-4) | 10.0% |
| (Liquid crystal composition (M-5)) | |
| Base liquid crystal N | 90.0% |
| Compound represented by formula (I-5) | 10.0% |
| (Liquid crystal composition (M-6)) | |
| Base liquid crystal N | 90.0% |
| Compound represented by formula (I-6) | 10.0% |
| (Liquid crystal composition (M-7)) | |
| Base liquid crystal N | 90.0% |
| Compound represented by formula (I-7) | 10.0% |
| (Liquid crystal composition (M-8)) | |
| Base liquid crystal N | 90.0% |
| Compound represented by formula (I-8) | 10.0% |
| (Liquid crystal composition (M-9)) | |
| Base liquid crystal N | 90.0% |
| Compound represented by formula (I-9) | 10.0% |
| (Liquid crystal composition (M-10)) | |
| Base liquid crystal N | 90.0% |
| Compound represented by formula (I-10) | 10.0% |
| (Liquid crystal composition (M-11)) | |
| Base liquid crystal N | 90.0% |
| Compound represented by formula (I-11) | 10.0% |
| (Liquid crystal composition (M-12)) | |
| Base liquid crystal N | 90.0% |
| Compound represented by formula (I-12) | 10.0% |
| (Liquid crystal composition (M-13)) | |
| Base liquid crystal N | 90.0% |
| Compound represented by formula (I-13) | 10.0% |

-continued

| (Liquid crystal composition (M-14)) | |
|---|---|
| Base liquid crystal N | 90.0% |
| Compound represented by formula (I-14) | 10.0% |
| (Liquid crystal composition (M-15)) | |
| Base liquid crystal N | 90.0% |
| Compound represented by formula (I-15) | 10.0% |
| (Liquid crystal composition (RM-1)) | |
| Base liquid crystal N | 90.0% |
| Compound represented by formula (R-1) | 10.0% |
| (Liquid crystal composition (RM-2)) | |
| Base liquid crystal N | 90.0% |
| Compound represented by formula (R-2) | 10.0% |
| (Liquid crystal composition (RM-3)) | |
| Base liquid crystal N | 90.0% |
| Compound represented by formula (R-3) | 10.0% |
| (Liquid crystal composition (RM-4)) | |
| Base liquid crystal N | 90.0% |
| Compound represented by formula (R-4) | 10.0% |

Each compound for evaluation was evaluated in terms of the storage stability. For storage stability, 2 mL of each prepared liquid crystal composition was sealed in a glass vial under an argon atmosphere and stored at 10° C. for 4 weeks, and then, the state thereof was visually evaluated. Evaluation results are shown in tables below.

TABLE 1

| | Liquid crystal composition | Storage stability |
|---|---|---|
| Example 16 | M-1 | Unchanged |
| Example 17 | M-2 | Unchanged |
| Example 18 | M-3 | Unchanged |
| Example 19 | M-4 | Unchanged |
| Example 20 | M-5 | Unchanged |
| Example 21 | M-6 | Unchanged |
| Example 22 | M-7 | Unchanged |
| Example 23 | M-8 | Unchanged |
| Example 24 | M-9 | Unchanged |
| Example 25 | M-10 | Unchanged |

TABLE 2

| | Liquid crystal composition | Storage stability |
|---|---|---|
| Example 26 | M-11 | Unchanged |
| Example 27 | M-12 | Unchanged |
| Example 28 | M-13 | Unchanged |
| Example 29 | M-14 | Unchanged |
| Example 30 | M-15 | Unchanged |
| Comparative Example 1 | RM-1 | Precipitation |
| Comparative Example 2 | RM-2 | Precipitation |
| Comparative Example 3 | RM-3 | Unchanged |
| Comparative Example 4 | RM-4 | Unchanged |

From the above results, it is found that the compounds of the present invention are less likely to cause precipitation when added to the liquid crystal composition, and have a high compatibility with the liquid crystal composition.

Next, the characteristic of each compound for evaluation in a high frequency region was evaluated. For the measurement, a transmission delay-mode cut back type strip-line method and a relative permittivity/dielectric loss tangent measuring device (manufactured by KEYCOM Corporation) were used. The dielectric constant anisotropy of each of the prepared liquid crystal compositions at 13.17 GHz and 20° C. was measured, and the dielectric constant anisotropy $\Delta\varepsilon$ (13.17 GHz) of each compound for evaluation was calculated by extrapolation. Evaluation results are shown in tables below.

TABLE 3

| | Compound for evaluation | $\Delta\varepsilon$ (13.17 GHz) |
|---|---|---|
| Example 31 | I-1 | 1.34 |
| Example 32 | I-2 | 1.48 |
| Example 33 | I-3 | 1.21 |
| Example 34 | I-4 | 1.32 |
| Example 35 | I-5 | 1.99 |
| Example 36 | I-6 | 1.18 |
| Example 37 | I-7 | 1.90 |
| Example 38 | I-8 | 1.15 |
| Example 39 | I-9 | 1.33 |
| Example 40 | I-10 | 1.17 |

TABLE 4

| | Compound for evaluation | $\Delta\varepsilon$ (13.17 GHz) |
|---|---|---|
| Example 41 | I-11 | 1.10 |
| Example 42 | I-12 | 1.62 |
| Example 43 | I-13 | 1.68 |
| Example 44 | I-14 | 1.28 |
| Example 45 | I-15 | 0.90 |
| Comparative Example 5 | R-1 | 0.01 |
| Comparative Example 6 | R-2 | 0.01 |
| Comparative Example 7 | R-3 | 0.63 |
| Comparative Example 8 | R-4 | 0.81 |

From the above results, it is found that all of the compounds of the present invention exhibit a large dielectric constant anisotropy in a high frequency region. Since the compounds of the present invention form a broad conjugated system via a ring structure and a linking group, it is considered that the compounds exhibit a large dielectric constant anisotropy in a high frequency region.

In addition, it was found that all of the liquid crystal compositions (M-1) to (M-15) containing the compounds of the present invention exhibited a material characteristic (qc) of 20 or more. Material characteristic (TE) is defined as follows.

$$\varepsilon_\perp = (3\varepsilon_{average} - \varepsilon_\parallel)/2$$

$$\tan \delta_\perp = (3\varepsilon_{average} \tan \delta_{average} - \varepsilon_\parallel \tan \delta_\parallel)/2\varepsilon_\perp$$

$$\text{Modulatability } (\tau) = (\varepsilon_\parallel - \varepsilon_\perp)/\varepsilon_\parallel$$

$$\text{Material characteristic } (\eta\varepsilon) = \tau/(\max(\tan \delta_\parallel, \tan \delta_\perp))$$

From the above results, the compounds of the present invention have a large refractive index anisotropy $\Delta n$ and a high compatibility with a liquid crystal composition, and exhibit a large dielectric constant anisotropy in a high frequency region; and therefore, they are useful as a material for devices of a high frequency shifter, a phased array antenna, an image recognition device, distance measuring equipment, a liquid crystal display device, a liquid crystal lens, a birefringent lens for displaying a stereoscopic image or the like.

The invention claimed is:

1. A compound represented by the following general formula (I),

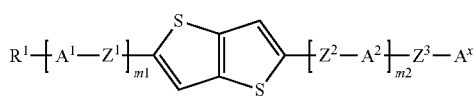
(I)

in the formula, $R^1$ represents a linear alkyl group having 1 to 20 carbon atoms, or a branched alkyl group having 3 to 20 carbon atoms, wherein one —$CH_2$— or two or more —$CH_2$—'s in the alkyl group are each independently and optionally substituted by —O—, with the proviso that oxygen atoms are not bonded to each other;

$A^1$ is represented by one of the following formulae (A-3), (A-4), (A-5), (A-6) and (A-7); and $A^2$ is represented by one of the following formulae (A-1), (A-3), (A-4), (A-5), (A-6) and (A-7)

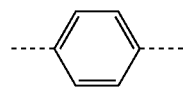
(A-1)

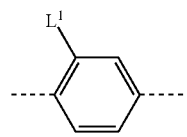
(A-3)

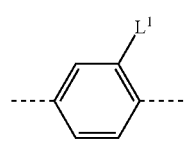
(A-4)

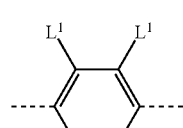
(A-5)

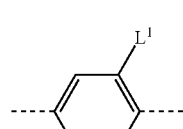
(A-6)

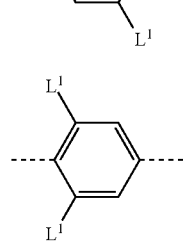
(A-7)

wherein the dashed line represents the bonding position, $L^1$ is a fluorine atom, a chlorine atom, a linear alkyl group having 1 to 10 carbon atoms in which —CH2- in the group may be substituted by —O—, or a branched or cyclic group having 3 to 10 carbon atoms represents an alkyl group, and when there are multiple L's, they may be the same or different;

when multiple $A^1$s are present, the $A^1$s are optionally the same or different;

$Z^1$, $Z^2$ and $Z^3$ each independently represent —CH=CH—, —CH=CH—, —$CF_2O$—, —$OCF_2$—, or a single bond; when multiple Z's are present, the Z's are optionally the same or different;

m1 represents an integer from 1 to 2, and m2 represents an integer from 0 to 1, and m1+m2 represents an integer from 1 to 3; and $A^x$ represents a group selected from the following formulas (Ax-1) and (Ax-2),

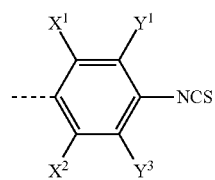
(Ax-1)

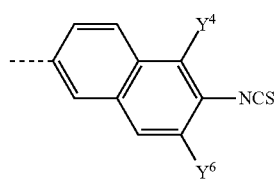
(Ax-2)

in the formulas, the broken line represents a bonding position, $X^1$ and $X^2$ each independently represent a hydrogen atom or an alkyl group having 1 to 8 carbon atoms, and $Y^1$, $Y^3$, $Y^4$ and $Y^6$ each independently represent a hydrogen atom, a fluorine atom, or a chlorine atom.

2. The compound according to claim 1, wherein, $A^{x1}$ is represented by formula (Ax-1-i)

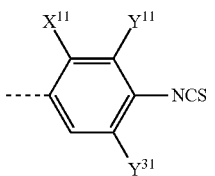
(Ax-1-i)

the broken line represents the bonding position, $X^{11}$ represents a hydrogen atom or an alkyl group having 1 to 8 carbon atoms, and $Y^{11}$ and $Y^{31}$ each independently represent a hydrogen atom, a fluorine atom or a chlorine atom.

3. The compound according to claim 1, wherein, in the general formula (I), $R^1$ is a linear alkyl group having 1 to 12 carbon atoms.

4. The compound according to claim 1, wherein the general formula (I), $A^1$ is (A-4) or (A-6).

5. The compound according to claim 1, wherein the general formula (I), $L^1$ is a fluorine atom or a linear alkyl group having 1 to 10 carbon atoms.

6. The compound according to claim 1, wherein the general formula (I), m1 is 1.

7. A composition comprising the compound according to claim 1.

8. A liquid crystal composition comprising the compound according to claim 1.

9. The liquid crystal composition according to claim 8, wherein the refractive index anisotropy is 0.15 or more.

10. The liquid crystal composition according to claim 8, wherein the dielectric constant anisotropy is 2 or more.

11. The liquid crystal composition according to claim 8, wherein the dielectric constant anisotropy is 2 or less.

12. A high-frequency phase shifter, a phased array antenna, an image recognition device, distance measuring equipment, a liquid crystal display device, a liquid crystal lens, or a birefringent lens for stereoscopic image display using the liquid crystal composition according to claim 8.

* * * * *